United States Patent
Babb et al.

(10) Patent No.: US 12,466,870 B2
(45) Date of Patent: Nov. 11, 2025

(54) NY-ESO-1 T CELL RECEPTORS AND METHODS OF USE THEREOF

(71) Applicant: Regeneron Pharmaceuticals, Inc., Tarrytown, NY (US)

(72) Inventors: Robert Babb, River Edge, NJ (US); Natalie Bowerman, Stamford, CT (US); Gang Chen, Yorktown Heights, NY (US); Cagan Gurer, Chappaqua, NY (US); Johanna Hansen, Greenwich, CT (US); Wen-Yi Lee, New Hyde Park, NY (US); Thomas Meagher, Yorktown Heights, NY (US); David Suh, Midland Park, NJ (US)

(73) Assignee: Regeneron Pharmaceuticals, Inc., Tarrytown, NY (US)

(\*) Notice: Subject to any disclaimer, the term of this patent is extended or adjusted under 35 U.S.C. 154(b) by 1216 days.

(21) Appl. No.: 17/287,643

(22) PCT Filed: Oct. 23, 2019

(86) PCT No.: PCT/US2019/057543
§ 371 (c)(1),
(2) Date: Apr. 22, 2021

(87) PCT Pub. No.: WO2020/086647
PCT Pub. Date: Apr. 30, 2020

(65) Prior Publication Data
US 2021/0403527 A1 Dec. 30, 2021

Related U.S. Application Data

(60) Provisional application No. 62/749,194, filed on Oct. 23, 2018.

(51) Int. Cl.
| | | |
|---|---|---|
| *C07K 14/725* | (2006.01) | |
| *A61K 38/00* | (2006.01) | |
| *A61K 40/11* | (2025.01) | |
| *A61K 40/32* | (2025.01) | |
| *A61K 40/42* | (2025.01) | |
| *C12N 5/0783* | (2010.01) | |

(52) U.S. Cl.
CPC .......... *C07K 14/7051* (2013.01); *A61K 40/11* (2025.01); *A61K 40/32* (2025.01); *A61K 40/4269* (2025.01); *C12N 5/0636* (2013.01); *A61K 38/00* (2013.01); *A61K 2239/48* (2023.05)

(58) Field of Classification Search
None
See application file for complete search history.

(56) References Cited

U.S. PATENT DOCUMENTS

| | | | |
|---|---|---|---|
| 8,008,438 B2 * | 8/2011 | Boulter | A61P 37/04 |
| | | | 530/350 |
| 2016/0024174 A1 | 1/2016 | Odunsi et al. | |
| 2016/0130319 A1 | 5/2016 | Li | |
| 2018/0298338 A1 | 10/2018 | Laugel et al. | |

FOREIGN PATENT DOCUMENTS

| | | | |
|---|---|---|---|
| JP | 2016-512435 A | 4/2016 | |
| JP | 2016-523268 A | 8/2016 | |
| WO | WO-2017/109496 A1 | 6/2017 | |
| WO | WO-2018132739 A2 * | 7/2018 | ......... A61K 39/4611 |
| WO | WO-2020/086647 A1 | 4/2020 | |

OTHER PUBLICATIONS

Alberts et al. Molecular Biology of the Cell. 4th edition. New York: Garland Science; 2002. The Shape and Structure of Proteins (Year: 2002).*
Alberts et al. Molecular Biology of the Cell. 4th edition. New York: Garland Science; 2002. The Shape and Structure of Proteins; Fig. 3-3 (Year: 2002).*
Pommie et al. 2004. J. Mol. Recognit., 17:17-32 (Year: 2004).*
ESA. How many stars are there in the Universe? www.esa.int/Science_Exploration/Space_Science/Herschel/How_many_stars_are_there_in_the_Universe (Year: 2024).*
Janeway et al., Immunobiology, 9th Ed., Garland Science, pp. 153-169, (2017) (Year: 2017).*
Garcia et al., Cell, vol. 122, 333-336, Aug. 12, 2005 (Year: 2005).*
Goyarts et al. Mol Immunol. Jul. 1998; 35(10):593-607 (Year: 1998).*
Alpha chain sequence alignment (Year: 2024).*
Schmid et al., "Evidence for a TCR Affinity Threshold Delimiting Maximal CD8 T Cell Function", The Journal of Immunology, vol. 184, No. 9, Mar. 29, 2010 (Mar. 29, 2010), pp. 4936-4946.
Derre et al., Distinct sets of alphabeta TCRs confer similar recognition of tumor antigen NY-ESO-1 157-165 by interacting with its central Met/Tr residues, Proc Natl Acad Sci USA, vol. 105, No. 39, Sep. 30, 2008 (Sep. 30, 2008), pp. 15010-15015.
International Search Report and Written opinion from PCT/US2019/057543, issued Dec. 20, 2019.

* cited by examiner

*Primary Examiner* — Anne M. Gussow
*Assistant Examiner* — Brianna K Swartwout
(74) *Attorney, Agent, or Firm* — McCarter & English, LLP; Marcie B. Clarke; Deborah L. Nagle

(57) ABSTRACT

The present invention provides isolated T cell receptors (TCRs) that specifically bind to an HLA-displayed New York Esophageal Squamous Cell Carcinoma-1 (NY-ESO-1) peptides, as well as therapeutic and diagnostic methods of using those isolated TCRs.

32 Claims, 11 Drawing Sheets

Specification includes a Sequence Listing.

NY-ESO-1 T CELL RECEPTORS AND METHODS OF USE THEREOF

RELATED APPLICATIONS

This application is a 35 U.S.C. § 371 national stage filing of International Application No. PCT/US2019/057543, filed on Oct. 23, 2019, which in turn claims the benefit of priority to U.S. Provisional Application No. 62/749,149, filed on Oct. 23, 2018. The entire contents of each of the aforementioned applications are incorporated herein by reference.

SEQUENCE LISTING

The instant application contains a Sequence Listing which has been filed electronically in ASCII format and is hereby incorporated by reference in its entirety. Said ASCII copy, created on Oct. 21, 2019, is named 118003_10420_SL.txt and is 74,556 bytes in size.

FIELD OF THE INVENTION

The present disclosure is related to antigen-binding proteins that specifically bind to an HLA-displayed New York esophageal squamous cell carcinoma 1 (NY-ESO-1) peptide, and therapeutic and diagnostic methods of using those binding proteins.

BACKGROUND OF THE INVENTION

T cell receptors (TCRs) are membrane bound heterodimers comprising an α and β chain resembling an immunoglobulin variable (V) and constant (C) region. The TCR α chain includes a covalently linked V-α and C-α chain, whereas the β chain includes a V-μ chain covalently linked to a C-μ chain. The V-α and V-μ chains form a pocket or cleft that can bind an antigen in the context of a major histocompatibility complex (MHC) (known in humans as an HLA complex). (Davis *Ann. Rev. of Immunology* 3: 537 (1985); *Fundamental Immunology* 3rd Ed., W. Paul Ed. Rsen Press LTD. New York (1993)).

TCRs are primary effectors of the immune system that have unique advantages as a platform for developing therapeutics. While antibody therapeutics are limited to recognition of pathogens in the blood and extracellular spaces, or to protein targets on the cell surface, T cell receptors can recognize antigens displayed with MHC molecules on the surface of cells, including antigens derived from intracellular proteins. Depending on the subtype of T cells that recognize displayed antigen and become activated, TCRs can participate in controlling various immune responses. For instance, T cells are involved in regulation of the humoral immune response through induction of differentiation of B cells into antibody producing cells. In addition, activated T cells act to initiate cell-mediated immune responses. Thus, TCRs can recognize additional targets not available to antibodies. In addition, TCRs have been reported to mediate cell killing, increase B cell proliferation, and impact the development and severity of various disorders including cancer, allergies, viral infections and autoimmune disorders.

In view of the function of TCRs, antigen-specific TCRs have been evaluated for use in immunotherapy for their ability to redirect T cells to tumors expressing the antigen. TCRs will bind to a small peptide, only 8-12 amino acids in length, which are bound on the surface of a target cell by the Major Histocompatibility Complex (MHC). TCRs can therefore recognize intracellular antigens derived from cancer or viral proteins because these antigens are processed and displayed as peptides in the context of the surface MHC. Hence, TCRs can recognize additional internal cell targets not available to antibodies or therapies that cannot penetrate the cell.

However, the challenge of the industry is to engineer TCRs that lack immunogenicity when administered to a patient and have fine specificity to the particular peptide antigen of interest, without cross-reacting to other peptides on MHC or similar epitopes found in the natural protein repertoire.

NY-ESO-1 or New York esophageal squamous cell carcinoma 1 is a well-known cancer-testis antigen (CTAs) with re-expression in numerous cancer types. Its ability to elicit spontaneous humoral and cellular immune responses, together with its restricted expression pattern, have rendered it a good candidate target for cancer immunotherapy.

Although several vaccines targeting NY-ESO-1 have been developed, few complete humoral and cellular immune responses have been obtained. Several patient-derived NY-ESO-1 TCRs have been developed but have been found to be immunogenic when administered to a patient and cross-react to other peptides on MHC or similar epitopes found in the natural protein repertoire. Additionally, since patient-derived TCRs against most tumor antigens are self-antigens, TCRs targeting these antigens are often either deleted or possess suboptimal affinity, due primarily to immunological tolerance.

Accordingly, there is an unmet need in the art for new targeting agents based on T cell receptors that specifically bind to NY-ESO-1 antigens, as well as methods for producing and using such agents in therapeutic and diagnostic settings.

BRIEF SUMMARY OF THE INVENTION

The present invention provides T cell receptors (TCRs) that were generated against a NY-ESO-1 peptide antigen in the context of MHC (HLA-A2). The unique TCR sequences identified have shown specific binding to the small peptide NY-ESO-1 presented in the groove of an HLA molecule, and exhibited activation of T cells in a reporter assay. Furthermore, no cross-reactivity was found to other "like" peptides, as shown by a prediction algorithm and subsequent cross-reactivity (specificity) assay to test the TCRs against predicted cross-reactive peptides.

Accordingly, in one aspect, the present invention provides isolated T cell receptors (TCRs) that bind specifically to an HLA-A2 presented cancer testis antigen New York Esophageal Squamous Cell Carcinoma-1 (NY-ESO-1) peptide comprising the amino acid sequence of SLLMWITQC (SEQ ID NO:111) (NY-ESO-1 (157-165)), wherein the TCR has a property selected from the group consisting of: (a) does not specifically bind to cells expressing predicted off-target peptides but not an HLA-A2 presented NY-ESO-1 peptide comprising the amino acid sequence of SEQ ID NO: 111, as determined by luminescence assay; and (b) activates a T cell response two times greater than a patient-derived NY-ESO-1-specific TCR.

In some embodiments, the TCR activates a T cell response about two times greater, or about three times greater, or about four times greater than a patient-derived NY-ESO-1-specific TCR as determined by a TCR-mediated T cell signaling luminescent bioassay.

The TCR may include at least one TCR alpha chain variable domain and/or at least one beta chain variable domain. In some embodiments, the TCR comprises a TCR alpha chain variable domain and a TCR beta chain variable domain.

In some embodiments, the alpha chain variable domain comprises complementary determining regions (CDR) 1, CDR2, and CDR3, wherein the CDR3 region comprises the amino acid sequence of Formula I (SEQ ID NO: 118):

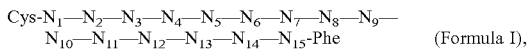

$$\text{Cys-}N_1\text{—}N_2\text{—}N_3\text{—}N_4\text{—}N_5\text{—}N_6\text{—}N_7\text{—}N_8\text{—}N_9\text{—}N_{10}\text{—}N_{11}\text{—}N_{12}\text{—}N_{13}\text{—}N_{14}\text{—}N_{15}\text{-Phe} \quad \text{(Formula I),}$$

wherein
$N_1$ is a nonpolar amino acid;
$N_2$ is Leu, Tyr, Val, or Ala;
$N_3$ is Arg, Asn, Thr, or Ser;
$N_4$ is Pro, Ser, Glu, Ile, Gly, Met, Lys, or Thr;
$N_5$, which may or may not be present, is Lys;
$N_6$, which may or may not be present in Asp, Ala, Gly, Leu, or Asn;
$N_7$ is Ser, Asn, Ala, Tyr, or Thr;
$N_8$, which may or may not be present, is Ser or Gly;
$N_9$, which may or may not be present, is Gly;
$N_{10}$, which may or may not be present, is Gly or Ser;
$N_{11}$, which may or may not be present, is Trp, Gly, Ser, Gln, Ala, or Pro;
$N_{12}$ is Gly, Tyr, Asn, Gln, or Ser;
$N_{13}$ is Lys, Ala, Asp, Ile, or Asn;
$N_{14}$ is a nonpolar amino acid; and
$N_{15}$ is Gln, Asn, Arg, Thr, Val, Ile, or Ser.
In some embodiments, $N_1$ is Ala or Ile. In some embodiments, $N_{14}$ is Phe, Leu, Met, or Pro.

In some embodiments, the beta chain variable domain comprises complementary determining regions (CDR) 1, CDR2, and CDR3, wherein the CDR3 region comprises amino acid sequence of Formula II (SEQ ID NO: 119):

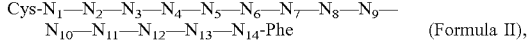

$$\text{Cys-}N_1\text{—}N_2\text{—}N_3\text{—}N_4\text{—}N_5\text{—}N_6\text{—}N_7\text{—}N_8\text{—}N_9\text{—}N_{10}\text{—}N_{11}\text{—}N_{12}\text{—}N_{13}\text{—}N_{14}\text{-Phe} \quad \text{(Formula II),}$$

wherein
$N_1$ and $N_2$ are each independently Ala or Ser;
$N_3$ is Ser, Met, or Lys;
$N_4$ is Tyr, Trp, His, Leu, Thr, Glu or Gln;
$N_5$ is Ser, Ala, Thr, Gly, Val, or Arg;
$N_6$, which may or may not be present, is Gly, His, Asp, Thr, Pro, Met, or Ser;
$N_7$, which may or may not be present, is Gly, Tyr, Asn, or Pro;
$N_8$, which may or may not be present, is Y;
$N_9$, which may or may not be present, is N;
$N_{10}$, which may or may not be present, is a polar amino acid;
$N_{11}$ is Pro, Glu, Gly, or Asp;
$N_{12}$, which may or may not be present, is Glu;
$N_{13}$ is Leu, Ala, Gln, or Tyr; and
$N_{14}$ is His, Phe, or Thr.
In some embodiments, $N_{10}$ is Ser, Thr, Gln, or Tyr.
In some embodiments, the CDR1 of the alpha chain variable domain comprises any one of the CDR1 amino acid sequences set forth in Table 1 and the CDR2 of the alpha chain variable domain independently comprises any one of the CDR2 amino acid sequences set forth in Table 1.

In some embodiments, the CDR1 of the beta chain variable domain comprises any one of the CDR1 amino acid sequences set forth in Table 1 and the CDR2 of the beta chain variable domain independently comprises any one of the CDR2 amino acid sequences set forth in Table 1.

In some embodiments, the isolated TCR comprises alpha chain variable domain CDR1, CDR2 and CDR3 contained within any one of the alpha chain variable domain sequences listed in Table 3; and beta chain variable domain CDR1, CDR2 and CDR3 contained within any one of the beta chain variable domain sequences listed in Table 3.

In some embodiments, the isolated TCR comprises an alpha chain variable domain having an amino acid sequence that has at least 85% amino acid identity to the entire amino acid sequence of any one of the amino acid sequences of the alpha chain variable domain amino acid sequences listed in Table 3.

In some embodiments, the isolated TCR comprises a beta chain variable domain having an amino acid sequence that has at least 85% amino acid identity to the entire amino acid sequence of any one of the amino acid sequences of the beta chain variable domain amino acid sequences listed in Table 3.

In some embodiments, the isolated TCR comprises: (a) an alpha chain variable domain having an amino acid sequence that has at least 85% amino acid identity to the entire amino acid sequence of any one of the amino acid sequences of the alpha chain variable domain amino acid sequences listed in Table 3; and (b) a beta chain variable domain having an amino acid sequence that has at least 85% amino acid identity to the entire amino acid sequence of any one of the amino acid sequences of the beta chain variable domain amino acid sequences listed in Table 3.

In some embodiments, the isolated TCR comprises
(a) an alpha chain variable domain CDR1 domain having an amino acid sequence selected from the group consisting of SEQ ID NOs: 4, 14, 24, 34, 44, 54, 64, 74, 84, 94, and 104;
(b) an alpha chain variable domain CDR2 domain having an amino acid sequence selected from the group consisting of SEQ ID NOs: 5, 15, 25, 35, 45, 55, 65, 75, 85, 95, and 105;
(c) an alpha chain variable domain CDR3 domain having an amino acid sequence selected from the group consisting of SEQ ID NOs: 6, 16, 26, 36, 46, 56, 66, 76, 86, 96, and 106;
(d) a beta chain variable domain CDR1 having an amino acid sequence selected from the group consisting of SEQ ID NOs: 1, 11, 21, 31, 41, 51, 61, 71, 81, 91, and 101;
(e) a beta chain variable domain CDR2 having an amino acid sequence selected from the group consisting of SEQ ID NOs: 2, 12, 22, 32, 42, 52, 62, 72, 82, 92, and 102; and
(f) a beta chain variable domain CDR3 having an amino acid sequence selected from the group consisting of SEQ ID NOs: 3, 13, 23, 33, 43, 54, 63, 73, 83, 93, and 103.

In some embodiments, the isolated TCR comprises an alpha chain variable domain/beta chain variable domain amino acid sequence pair selected from the group consisting of SEQ ID NOs: 9/7; 19/17; 29/27; 39/37; 49/47; 59; 57; 69/67; 79/77; 89/87; 99/97; and 109/107.

The present invention also provides isolated TCRs that compete for binding to any of the isolated TCRs disclosed herein.

In some embodiments, the isolated TCRs of the invention further comprise a detectable moiety.

The present invention further provides pharmaceutical compositions comprising the isolated TCR of the invention and a pharmaceutically acceptable carrier or diluent; and isolated cells presenting the TCR of the invention.

In some embodiments, the present invention provides an isolated polynucleotide molecule comprising a polynucleotide sequence that encodes an alpha chain variable domain of the isolated TCRs of the invention.

In another embodiment, the present invention provides an isolated polynucleotide molecule comprising a polynucleotide sequence that encodes a beta chain variable domain of the isolated TCRs of the invention.

The present invention also provides vectors comprising the polynucleotide molecules of the invention; and cells expressing the vectors of the invention.

In one aspect, the present invention provides a method of treating a subject having an NY-ESO-1-associated disease or disorder, comprising administering to the subject a therapeutically effective amount of the isolated TCRs of the invention, the pharmaceutical compositions of the invention, or a plurality of the cells of the invention, thereby treating the subject.

In some embodiments, the NY-ESO-1-associated disease or disorder is NY-ESO-1-associated cancer, such as a liposarcoma, a neuroblastoma, a myeloma, a metastatic melanoma, a synovial sarcoma, a bladder cancer, an esophageal cancer, a hepatocellular cancer, a head and neck cancer, a non-small cell lung cancer, an ovarian cancer, a prostate cancer, a breast cancer, astrocytic tumor, glioblastoma multiforme, anaplastic astrocytoma, brain tumor, fallopian tube cancer, ovarian epithelial cancer, primary peritoneal cavity cancer, advanced solid tumors, soft tissue sarcoma, melanoma, a sarcoma, myelodysplastic syndrome, acute myeloid leukemia, Hodgkin lymphoma, non-Hodgkin lymphoma, Hodgkin disease, multiple myeloma, synovial sarcoma, metastatic solid tumors, esophageal cancer, rhabdomyosarcoma, advanced myxoid, round cell liposarcoma, metastatic melanoma, or recurrent non-small cell lung cancer. In some embodiments, the NY-ESO-1-associated cancer is a liposarcoma, a neuroblastoma, a myeloma, a metastatic melanoma, a synovial sarcoma, a bladder cancer, an esophageal cancer, a hepatocellular cancer, a head and neck cancer, a non-small cell lung cancer, an ovarian cancer, a prostate cancer, or a breast cancer.

In some embodiments, the isolated TCR, the pharmaceutical composition, or the plurality of cells is administered to the subject in combination with a second therapeutic agent.

In some embodiments, the isolated TCR, the pharmaceutical composition, or the plurality of cells is administered subcutaneously, intravenously, intradermally, intraperitoneally, orally, intramuscularly or intracranially to the subject.

In one aspect, the present invention provides an isolated nucleic acid molecule encoding a T cell receptor (TCR), wherein the TCR binds specifically to an HLA-A2 presented cancer testis antigen New York Esophageal Squamous Cell Carcinoma-1 (NY-ESO-1) peptide comprising the amino acid sequence of SLLMWITQC (SEQ ID NO:111) (NY-ESO-1 (157-165)), wherein the TCR has a property selected from the group consisting of: (a) does not specifically bind to cells expressing predicted off-target peptides but not an HLA-A2 presented NY-ESO-1 peptide comprising the amino acid sequence of SEQ ID NO: 111, as determined by luminescence assay; and (b) activates a T cell response about two times greater than a patient-derived NY-ESO-1-specific TCR.

In some embodiments, the TCR activates a T cell response about two times greater, or about three times greater, or about four times greater than a patient-derived NY-ESO-1-specific TCR as determined by a TCR-mediated T cell signaling luminescent bioassay.

In some embodiments, the isolated nucleic acid molecule encodes at least one TCR alpha chain variable domain and/or at least one beta chain variable domain.

In some embodiments, the TCR comprises alpha chain variable domain complementary determining regions (CDR) 1, CDR2, and CDR3 contained within any one of the alpha chain variable domain sequences listed in Table 3; and beta chain variable domain CDR1, CDR2 and CDR3 contained within any one of the beta chain variable domain sequences listed in Table 3.

In some embodiments, the isolated TCR comprises alpha chain variable domain having an amino acid sequence that has at least 85% amino acid identity to the entire amino acid sequence of any one of the amino acid sequences of the alpha chain variable domain amino acid sequences listed in Table 3.

In some embodiments, the isolated TCR comprises beta chain variable domain having an amino acid sequence that has at least 85% amino acid identity to the entire amino acid sequence of any one of the amino acid sequences of the beta chain variable domain amino acid sequences listed in Table 3.

In some embodiments, the isolated TCR comprises (a) an alpha chain variable domain having an amino acid sequence that has at least 85% amino acid identity to the entire amino acid sequence of any one of the amino acid sequences of the alpha chain variable domain amino acid sequences listed in Table 3; and (b) a beta chain variable domain having an amino acid sequence that has at least 85% amino acid identity to the entire amino acid sequence of any one of the amino acid sequences of the beta chain variable domain amino acid sequences listed in Table 3.

In some embodiments, the isolated antigen-binding protein comprises
(a) an alpha chain variable domain CDR1 having an amino acid sequence selected from the group consisting of SEQ ID NOs: 4, 14, 24, 34, 44, 54, 64, 74, 84, 94, and 104;
(b) an alpha chain variable domain CDR2 having an amino acid sequence selected from the group consisting of SEQ ID NOs: 5, 15, 25, 35, 45, 55, 65, 75, 85, 95, and 105;
(c) an alpha chain variable domain CDR3 having an amino acid sequence selected from the group consisting of SEQ ID NOs: 6, 16, 26, 36, 46, 56, 66, 76, 86, 96, and 106;
(d) a beta chain variable domain CDR1 having an amino acid sequence selected from the group consisting of SEQ ID NOs: 1, 11, 21, 31, 41, 51, 61, 71, 81, 91, and 101;
(e) a beta chain variable domain CDR2 having an amino acid sequence selected from the group consisting of SEQ ID NOs: 2, 12, 22, 32, 42, 52, 62, 72, 82, 92, and 102; and
(f) a beta chain variable domain CDR3 having an amino acid sequence selected from the group consisting of SEQ ID NOs: 3, 13, 23, 33, 43, 54, 63, 73, 83, 93, and 103.

In some embodiments, the isolated TCR comprises an alpha chain variable domain/beta chain variable domain amino acid sequence pair selected from the group consisting of SEQ ID NOs: 9/7; 19/17; 29/27; 39/37; 49/47; 59; 57; 69/67; 79/77; 89/87; 99/97; and 109/107.

The present invention also provides vectors comprising the isolated nucleic acid molecule of the invention; and isolated cells comprising the vectors of the invention.

In one aspect, the present invention provides a method of treating a subject having a NY-ESO-1-associated disease or disorder, comprising administering to the subject a plurality of the cells comprising the vectors of the invention, thereby treating the subject.

In some embodiments, the NY-ESO-1-associated disease or disorder is NY-ESO-associated cancer.

In some embodiments, the NY-ESO-1-associated cancer is a liposarcoma, a neuroblastoma, a myeloma, a metastatic melanoma, a synovial sarcoma, a bladder cancer, an esophageal cancer, a hepatocellular cancer, a head and neck cancer, a non-small cell lung cancer, an ovarian cancer, a prostate cancer, a breast cancer, astrocytic tumor, glioblastoma multiforme, anaplastic astrocytoma, brain tumor, fallopian tube cancer, ovarian epithelial cancer, primary peritoneal cavity cancer, advanced solid tumors, soft tissue sarcoma, melanoma, a sarcoma, myelodysplastic syndrome, acute myeloid leukemia, Hodgkin lymphoma, non-Hodgkin lymphoma, Hodgkin disease, multiple myeloma, synovial sarcoma, metastatic solid tumors, esophageal cancer, rhabdomyosarcoma, advanced myxoid, round cell liposarcoma, metastatic melanoma, or recurrent non-small cell lung cancer. In some embodiments, the NY-ESO-1-associated cancer is a liposarcoma, a neuroblastoma, a myeloma, a metastatic melanoma, a synovial sarcoma, a bladder cancer, an esophageal cancer, a hepatocellular cancer, a head and neck cancer, a non-small cell lung cancer, an ovarian cancer, a prostate cancer, or a breast cancer.

In some embodiments, the plurality of cells is administered to the subject in combination with a second therapeutic agent.

The present invention provides an isolated T cell receptor (TCR) that binds specifically to an HLA-A2 presented cancer testis antigen New York Esophageal Squamous Cell Carcinoma-1 (NY-ESO-1) peptide comprising the amino acid sequence of SLLMWITQC (SEQ ID NO:111) (NY-ESO-1 (157-165)), wherein the TCR has a property selected from the group consisting of: (a) does not specifically bind to cells expressing predicted off-target peptides but not an HLA-A2 presented NY-ESO-1 peptide comprising the amino acid sequence of SEQ ID NO: 111, as determined by luminescence assay; and (b) activates a T cell response having a signal to noise ratio greater than or equal to a patient-derived NY-ESO-1-specific TCR as determined by a TCR-mediated T cell signaling luminescent bioassay.

In some embodiments, the TCR activates a T cell response about two times greater, or about three times greater, or about four times greater than a patient-derived NY-ESO-1-specific TCR as determined by a TCR-mediated T cell signaling luminescent bioassay. In some embodiments, the TCR comprises at least one TCR alpha chain variable domain and/or at least one beta chain variable domain. In some embodiments, the TCR comprises a TCR alpha chain variable domain and a TCR beta chain variable domain. In some embodiments, the alpha chain variable domain comprises complementary determining regions (CDR) 1, CDR2, and CDR3, wherein the CDR3 region comprises the amino acid sequence of Formula I:

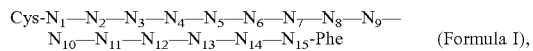
(Formula I), wherein
$N_1$ is a nonpolar amino acid;
$N_2$ is Leu, Tyr, Val, or Ala;
$N_3$ is Arg, Asn, Thr, or Ser;
$N_4$ is Pro, Ser, Glu, Ile, Gly, Met, Lys, or Thr;
$N_5$, which may or may not be present, is Lys;
$N_6$, which may or may not be present in Asp, Ala, Gly, Leu, or Asn;
$N_7$ is Ser, Asn, Ala, Tyr, or Thr;
$N_8$, which may or may not be present, is Ser or Gly;
$N_9$, which may or may not be present, is Gly;
$N_{10}$, which may or may not be present, is Gly or Ser;
$N_{11}$, which may or may not be present, is Trp, Gly, Ser, Gln, Ala, or Pro;
$N_{12}$ is Gly, Tyr, Asn, Gln, or Ser;
$N_{13}$ is Lys, Ala, Asp, Ile, or Asn;
$N_{14}$ is a nonpolar amino acid; and
$N_{15}$ is Gln, Asn, Arg, Thr, Val, Ile, or Ser.

In some embodiments, $N_1$ is Ala or Ile. In some embodiments, $N_{14}$ is Phe, Leu, Met, or Pro. In some embodiments, the beta chain variable domain comprises complementary determining regions (CDR) 1, CDR2, and CDR3, wherein the CDR3 region comprises amino acid sequence of Formula II:

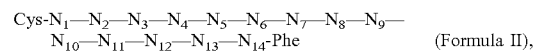
(Formula II), wherein
$N_1$ and $N_2$ are each independently Ala or Ser;
$N_3$ is Ser, Met, or Lys;
$N_4$ is Tyr, Trp, His, Leu, Thr, Glu or Gln;
$N_5$ is Ser, Ala, Thr, Gly, Val, or Arg;
$N_6$, which may or may not be present, is Gly, His, Asp, Thr, Pro, Met, or Ser;
$N_7$, which may or may not be present, is Gly, Tyr, Asn, or Pro;
$N_8$, which may or may not be present, is Y;
$N_9$, which may or may not be present, is N;
$N_{10}$, which may or may not be present, is a polar amino acid;
$N_{11}$ is Pro, Glu, Gly, or Asp;
$N_{12}$, which may or may not be present, is Glu;
$N_{13}$ is Leu, Ala, Gln, or Tyr; and
$N_{14}$ is His, Phe, or Thr.

In some embodiments, $N_{10}$ is Ser, Thr, Gln, or Tyr. In some embodiments, the CDR1 of the alpha chain variable domain comprises any one of the CDR1 amino acid sequences set forth in Table 1 and the CDR2 of the alpha chain variable domain independently comprises any one of the CDR2 amino acid sequences set forth in Table 1. In some embodiments, the CDR1 of the beta chain variable domain comprises any one of the CDR1 amino acid sequences set forth in Table 1 and the CDR2 of the beta chain variable domain independently comprises any one of the CDR2 amino acid sequences set forth in Table 1. In some embodiments, the isolated TCR comprises alpha chain variable domain CDR1, CDR2 and CDR3 contained within any one of the alpha chain variable domain sequences listed in Table 3; and beta chain variable domain CDR1, CDR2 and CDR3 contained within any one of the beta chain variable domain sequences listed in Table 3. In some embodiments, the isolated TCR comprises an alpha chain variable domain having an amino acid sequence that has at least 85% amino acid identity to the entire amino acid sequence of any one of the amino acid sequences of the alpha chain variable domain amino acid sequences listed in Table 3. In some embodiments, the isolated TCR comprises a beta chain variable domain having an amino acid sequence that has at least 85% amino acid identity to the entire amino acid sequence of any one of the amino acid sequences of the beta chain variable domain amino acid sequences listed in Table 3. In some embodiments, the isolated TCR comprises: (a) an alpha chain variable domain having an amino acid sequence that has at least 85% amino acid identity to the entire amino acid sequence of any one of the amino acid sequences of the alpha chain variable domain amino acid sequences listed in Table 3; and (b) a beta chain variable domain having an amino acid sequence that has at least 85% amino acid identity to the entire amino acid sequence of any one of the amino acid sequences of the beta chain variable domain amino acid sequences listed in Table 3. In some embodiments, the isolated TCR comprises:

(a) an alpha chain variable domain CDR1 domain having an amino acid sequence selected from the group consisting of SEQ ID NOs: 4, 14, 24, 34, 44, 54, 64, 74, 84, 94, and 104;

(b) an alpha chain variable domain CDR2 domain having an amino acid sequence selected from the group consisting of SEQ ID NOs: 5, 15, 25, 35, 45, 55, 65, 75, 85, 95, and 105;

(c) an alpha chain variable domain CDR3 domain having an amino acid sequence selected from the group consisting of SEQ ID NOs: 6, 16, 26, 36, 46, 56, 66, 76, 86, 96, and 106;

(d) a beta chain variable domain CDR1 having an amino acid sequence selected from the group consisting of SEQ ID NOs: 1, 11, 21, 31, 41, 51, 61, 71, 81, 91, and 101;

(e) a beta chain variable domain CDR2 having an amino acid sequence selected from the group consisting of SEQ ID NOs: 2, 12, 22, 32, 42, 52, 62, 72, 82, 92, and 102; and (f) a beta chain variable domain CDR3 having an amino acid sequence selected from the group consisting of SEQ ID NOs: 3, 13, 23, 33, 43, 54, 63, 73, 83, 93, and 103.

In some embodiments, the isolated TCR comprises an alpha chain variable domain/beta chain variable domain amino acid sequence pair selected from the group consisting of SEQ ID NOs: 9/7; 19/17; 29/27; 39/37; 49/47; 59; 57; 69/67; 79/77; 89/87; 99/97; and 109/107.

In some embodiments, the present disclosure provides an isolated TCR that competes for binding to an isolated TCR described above. In some embodiments, the present disclosure provides an isolated TCR that further comprises a detectable moiety.

The present invention provides a pharmaceutical composition comprising an isolated TCR described above and a pharmaceutically acceptable carrier or diluent. The present invention provides an isolated cell presenting a TCR described above. The present invention provides a polynucleotide molecule comprising a polynucleotide sequence that encodes an alpha chain variable domain of an isolated TCR as described above. The present invention provides a polynucleotide molecule comprising a polynucleotide sequence that encodes a beta chain variable domain of an isolated TCR as described above. The present invention provides a vector comprising that polynucleotide molecule. The present invention provides a cell expressing that vector.

The present invention provides a method of treating a subject having an NY-ESO-1-associated disease or disorder, comprising administering to the subject a therapeutically effective amount of an isolated TCR, pharmaceutical composition, or plurality of cells as described above, thereby treating the subject.

In some embodiments, the NY-ESO-1-associated disease or disorder is NY-ESO-1-associated cancer. In some embodiments, the NY-ESO-1-associated cancer is a liposarcoma, a neuroblastoma, a myeloma, a metastatic melanoma, a synovial sarcoma, a bladder cancer, an esophageal cancer, a hepatocellular cancer, a head and neck cancer, a non-small cell lung cancer, an ovarian cancer, a prostate cancer, a breast cancer, astrocytic tumor, glioblastoma multiforme, anaplastic astrocytoma, brain tumor, fallopian tube cancer, ovarian epithelial cancer, primary peritoneal cavity cancer, advanced solid tumors, soft tissue sarcoma, melanoma, a sarcoma, myelodysplastic syndrome, acute myeloid leukemia, Hodgkin lymphoma, non-Hodgkin lymphoma, Hodgkin disease, multiple myeloma, synovial sarcoma, metastatic solid tumors, esophageal cancer, rhabdomyosarcoma, advanced myxoid, round cell liposarcoma, metastatic melanoma, or recurrent non-small cell lung cancer. In some embodiments, the isolated TCR, the pharmaceutical composition, or the plurality of cells is administered to the subject in combination with a second therapeutic agent. In some embodiments, the isolated TCR, the pharmaceutical composition, or the plurality of cells is administered subcutaneously, intravenously, intradermally, intraperitoneally, orally, intramuscularly or intracranially to the subject.

The present invention provides a polynucleotide molecule encoding a T cell receptor (TCR), wherein the TCR binds specifically to an HLA-A2 presented cancer testis antigen New York Esophageal Squamous Cell Carcinoma-1 (NY-ESO-1) peptide comprising the amino acid sequence of SLLMWITQC (SEQ ID NO:111) (NY-ESO-1 (157-165)), wherein the TCR has a property selected from the group consisting of: (a) does not specifically bind to cells expressing predicted off-target peptides but not an HLA-A2 presented NY-ESO-1 peptide comprising the amino acid sequence of SEQ ID NO: 111, as determined by luminescence assay; and (b) activates a T cell response about two times greater than a patient-derived NY-ESO-1-specific TCR as determined by a TCR-mediated T cell signaling luminescent bioassay.

In some embodiments, the polynucleotide molecule encodes at least one TCR alpha chain variable domain and/or at least one beta chain variable domain. In some embodiments, the TCR comprises alpha chain variable domain complementary determining regions (CDR) 1, CDR2, and CDR3 contained within any one of the alpha chain variable domain sequences listed in Table 3; and beta chain variable domain CDR1, CDR2 and CDR3 contained within any one of the beta chain variable domain sequences listed in Table 3. In some embodiments, the isolated TCR comprises alpha chain variable domain having an amino acid sequence that has at least 85% amino acid identity to the entire amino acid sequence of any one of the amino acid sequences of the alpha chain variable domain amino acid sequences listed in Table 3. In some embodiments, the isolated TCR comprises beta chain variable domain having an amino acid sequence that has at least 85% amino acid identity to the entire amino acid sequence of any one of the amino acid sequences of the beta chain variable domain amino acid sequences listed in Table 3. In some embodiments, the isolated TCR comprises (a) an alpha chain variable domain having an amino acid sequence that has at least 85% amino acid identity to the entire amino acid sequence of any one of the amino acid sequences of the alpha chain variable domain amino acid sequences listed in Table 3; and (b) a beta chain variable domain having an amino acid sequence that has at least 85% amino acid identity to the entire amino acid sequence of any one of the amino acid sequences of the beta chain variable domain amino acid sequences listed in Table 3. In some embodiments, the isolated antigen-binding protein comprises (a) an alpha chain variable domain CDR1 having an amino acid sequence selected from the group consisting of SEQ ID NOs: 4, 14, 24, 34, 44, 54, 64, 74, 84, 94, and 104;

(b) an alpha chain variable domain CDR2 having an amino acid sequence selected from the group consisting of SEQ ID NOs: 5, 15, 25, 35, 45, 55, 65, 75, 85, 95, and 105;

(c) an alpha chain variable domain CDR3 having an amino acid sequence selected from the group consisting of SEQ ID NOs: 6, 16, 26, 36, 46, 56, 66, 76, 86, 96, and 106;

(d) a beta chain variable domain CDR1 having an amino acid sequence selected from the group consisting of SEQ ID NOs: 1, 11, 21, 31, 41, 51, 61, 71, 81, 91, and 101;

(e) a beta chain variable domain CDR2 having an amino acid sequence selected from the group consisting of SEQ ID NOs: 2, 12, 22, 32, 42, 52, 62, 72, 82, 92, and 102; and (f) a beta chain variable domain CDR3 having an amino acid sequence selected from the group consisting of SEQ ID NOs: 3, 13, 23, 33, 43, 54, 63, 73, 83, 93, and 103.

In some embodiments, the isolated TCR comprises an alpha chain variable domain/beta chain variable domain amino acid sequence pair selected from the group consisting of SEQ ID NOs: 9/7; 19/17; 29/27; 39/37; 49/47; 59; 57; 69/67; 79/77; 89/87; 99/97; and 109/107.

The present invention provides a vector comprising the polynucleotide molecule as described above. The present invention provides an isolated cell comprising that vector. The invention provides a method of treating a subject having a NY-ESO-1-associated disease or disorder, comprising administering to the subject a plurality of those cells, thereby treating the subject. In some embodiments, the NY-ESO-1-associated disease or disorder is NY-ESO-associated cancer. In some embodiments, the NY-ESO-associated cancer is a liposarcoma, a neuroblastoma, a myeloma, a metastatic melanoma, a synovial sarcoma, a bladder cancer, an esophageal cancer, a hepatocellular cancer, a head and neck cancer, a non-small cell lung cancer, an ovarian cancer, a prostate cancer, a breast cancer, astrocytic tumor, glioblastoma multiforme, anaplastic astrocytoma, brain tumor, fallopian tube cancer, ovarian epithelial cancer, primary peritoneal cavity cancer, advanced solid tumors, soft tissue sarcoma, melanoma, a sarcoma, myelodysplastic syndrome, acute myeloid leukemia, Hodgkin lymphoma, non-Hodgkin lymphoma, Hodgkin disease, multiple myeloma, synovial sarcoma, metastatic solid tumors, esophageal cancer, rhabdomyosarcoma, advanced myxoid, round cell liposarcoma, metastatic melanoma, or recurrent non-small cell lung cancer. In some embodiments, the plurality of cells is administered to the subject in combination with a second therapeutic agent.

The present invention provides a T cell receptor (TCR) that binds specifically to an HLA-A2 presented cancer testis antigen New York Esophageal Squamous Cell Carcinoma-1 (NY-ESO-1) peptide comprising the amino acid sequence of SLLMWITQC (SEQ ID NO:111) (NY-ESO-1 (157-165)), wherein the TCR comprises a complementary determining region 3 (CDR3) contained with an alpha chain variable domain of any one of SEQ ID NOs: 9, 19, 29, 39, 49, 59, 69, 79, 89, 99, and 109.

The present invention provides a T cell receptor (TCR) that binds specifically to an HLA-A2 presented cancer testis antigen New York Esophageal Squamous Cell Carcinoma-1 (NY-ESO-1) peptide comprising the amino acid sequence of SLLMWITQC (SEQ ID NO:111) (NY-ESO-1 (157-165)), wherein the TCR comprises a complementary determining region 3 (CDR3) contained within a beta chain variable domain of any one of SEQ ID NOs: 7, 17, 27, 37, 47, 57, 67, 77, 87, 97, and 107.

In some embodiments, the alpha chain variable domain further comprises a CDR1 and a CDR2, wherein the CDR1 comprises any one of the alpha chain variable domain CDR1 amino acid sequences set forth in Table 1 and the CDR2 independently comprises any one of the alpha chain variable domain CDR2 amino acid sequences set forth in Table 1. In some embodiments, the beta chain variable domain further comprises a CDR1 and a CDR2, wherein the CDR1 comprises any one of the beta chain variable CDR1 amino acid sequences set forth in Table 1 and the CDR2 independently comprises any one of the beta chain variable domain CDR2 amino acid sequences set forth in Table 1. In some embodiments, the TCR comprises at least one TCR alpha chain variable domain and/or at least one beta chain variable domain. In some embodiments, the TCR comprises a TCR alpha chain variable domain and a TCR beta chain variable domain. In some embodiments, the TCR comprises alpha chain variable domain CDR1, CDR2 and CDR3 contained within any one of the alpha chain variable domain amino acid sequences listed in Table 3; and beta chain variable domain CDR1, CDR2 and CDR3 contained within any one of the beta chain variable domain amino acid sequences listed in Table 3.

In some embodiments, the TCR comprises an alpha chain variable domain having an amino acid sequence that has at least 85% amino acid identity to the entire amino acid sequence of any one of the amino acid sequences of the alpha chain variable domain amino acid sequences listed in Table 3. In some embodiments, the TCR comprises a beta chain variable domain having an amino acid sequence that has at least 85% amino acid identity to the entire amino acid sequence of any one of the amino acid sequences of the beta chain variable domain amino acid sequences listed in Table 3. In some embodiments, the TCR comprises: (a) an alpha chain variable domain having an amino acid sequence that has at least 85% amino acid identity to the entire amino acid sequence of any one of the amino acid sequences of the alpha chain variable domain amino acid sequences listed in Table 3; and (b) a beta chain variable domain having an amino acid sequence that has at least 85% amino acid identity to the entire amino acid sequence of any one of the amino acid sequences of the beta chain variable domain amino acid sequences listed in Table 3. In some embodiments, the TCR comprises:

(a) an alpha chain variable domain CDR1 domain having an amino acid sequence selected from the group consisting of SEQ ID NOs: 4, 14, 24, 34, 44, 54, 64, 74, 84, 94, and 104;

(b) an alpha chain variable domain CDR2 domain having an amino acid sequence selected from the group consisting of SEQ ID NOs: 5, 15, 25, 35, 45, 55, 65, 75, 85, 95, and 105;

(c) an alpha chain variable domain CDR3 domain having an amino acid sequence selected from the group consisting of SEQ ID NOs: 6, 16, 26, 36, 46, 56, 66, 76, 86, 96, and 106;

(d) a beta chain variable domain CDR1 having an amino acid sequence selected from the group consisting of SEQ ID NOs: 1, 11, 21, 31, 41, 51, 61, 71, 81, 91, and 101;

(e) a beta chain variable domain CDR2 having an amino acid sequence selected from the group consisting of SEQ ID NOs: 2, 12, 22, 32, 42, 52, 62, 72, 82, 92, and 102; and (f) a beta chain variable domain CDR3 having an amino acid sequence selected from the group consisting of SEQ ID NOs: 3, 13, 23, 33, 43, 53, 63, 73, 83, 93, and 103.

In some embodiments, the TCR comprises an alpha chain variable domain/beta chain variable domain amino acid sequence pair selected from the group consisting of SEQ ID NOs: 9/7, 19/17, 29/27, 39/37, 49/47, 59/57, 69/67, 79/77, 89/87, 99/97, and 109/107. In some embodiments, the TCR further comprises a detectable moiety.

In some embodiments, the TCR has an on-target binding/off-target binding value of greater than 5, greater than 10, greater than 15, greater than 20, greater than 50, greater than 100, greater than 200, greater than 300, greater than 400, greater than 500, greater than 600, greater than 700, greater than 800, greater than 900, or greater than 1000. In some embodiments, the TCR has an on-target binding/off-target binding value of greater than 10. In some embodiments, the TCR has an on-target binding/off-target binding value of greater than 500.

The present invention provides a TCR that competes for binding to TCR as described above.

The present invention provides a pharmaceutical composition comprising a TCR as described herein and a pharmaceutically acceptable carrier or diluent. The present invention provides an isolated cell presenting a TCR as described herein. The present invention provides a polynucleotide molecule comprising a polynucleotide sequence that encodes an alpha chain variable domain of a TCR described herein. The present invention provides a polynucleotide molecule comprising a polynucleotide sequence that encodes a beta chain variable domain of a TCR as described herein. The present invention provides a vector comprising the alpha chain or beta chain polynucleotide sequence. The present invention provides an isolated cell expressing that vector.

The present invention provides a method of treating a subject having an NY-ESO-1-associated disease or disorder, comprising administering to the subject a therapeutically effective amount of a TCR as described herein, a pharmaceutical composition as described herein, or an isolated cell as described herein, thereby treating the subject.

In some embodiments, the NY-ESO-1-associated disease or disorder is NY-ESO-1-associated cancer. In some embodiments, the NY-ESO-1-associated cancer is a liposarcoma, a neuroblastoma, a myeloma, a metastatic melanoma, a synovial sarcoma, a bladder cancer, an esophageal cancer, a hepatocellular cancer, a head and neck cancer, a non-small cell lung cancer, an ovarian cancer, a prostate cancer, a breast cancer, astrocytic tumor, glioblastoma multiforme, anaplastic astrocytoma, brain tumor, fallopian tube cancer, ovarian epithelial cancer, primary peritoneal cavity cancer, advanced solid tumors, soft tissue sarcoma, melanoma, a sarcoma, myelodysplastic syndrome, acute myeloid leukemia, Hodgkin lymphoma, non-Hodgkin lymphoma, Hodgkin disease, multiple myeloma, synovial sarcoma, metastatic solid tumors, esophageal cancer, rhabdomyosarcoma, advanced myxoid, round cell liposarcoma, metastatic melanoma, or recurrent non-small cell lung cancer. In some embodiments, the TCR, the pharmaceutical composition, or the cell is administered to the subject in combination with a second therapeutic agent. In some embodiments, the administering is parenteral.

The present invention provides a polynucleotide molecule encoding a T cell receptor (TCR), wherein the TCR binds specifically to an HLA-A2 presented cancer testis antigen NY-ESO-1 peptide comprising the amino acid sequence of SLLMWITQC (SEQ ID NO:111) (NY-ESO-1 (157-165)), wherein the TCR has a property selected from the group consisting of: (a) does not specifically bind to cells expressing predicted off-target peptides but not an HLA-A2 presented NY-ESO-1 peptide comprising the amino acid sequence of SEQ ID NO: 111, as determined by luminescence assay; (b) does not bind to cells expressing predicted off-target peptides as determined by a flow cytometry assay; (c) activates a T cell response about two times greater than a patient-derived NY-ESO-1-specific TCR as determined by a TCR-mediated T cell signaling luminescent bioassay; and (d) activates a T cell response about two times greater than an affinity-matured (e.g., by phage display) NY-ESO-1-specific TCR as determined by a TCR-mediated T cell signaling luminescent bioassay. In some embodiments, the polynucleotide molecule encodes at least one TCR alpha chain variable domain and/or at least one beta chain variable domain. In some embodiments, the TCR comprises alpha chain variable domain complementary determining regions (CDR) 1, CDR2, and CDR3 contained within any one of the alpha chain variable domain sequences listed in Table 3; and beta chain variable domain CDR1, CDR2 and CDR3 contained within any one of the beta chain variable domain sequences listed in Table 3. In some embodiments, the TCR comprises an alpha chain variable domain having an amino acid sequence that has at least 85% amino acid identity to the entire amino acid sequence of any one of the amino acid sequences of the alpha chain variable domain amino acid sequences listed in Table 3. In some embodiments, the TCR comprises a beta chain variable domain having an amino acid sequence that has at least 85% amino acid identity to the entire amino acid sequence of any one of the amino acid sequences of the beta chain variable domain amino acid sequences listed in Table 3. In some embodiments, the TCR comprises (a) an alpha chain variable domain having an amino acid sequence that has at least 85% amino acid identity to the entire amino acid sequence of any one of the amino acid sequences of the alpha chain variable domain amino acid sequences listed in Table 3; and (b) a beta chain variable domain having an amino acid sequence that has at least 85% amino acid identity to the entire amino acid sequence of any one of the amino acid sequences of the beta chain variable domain amino acid sequences listed in Table 3. In some embodiments, the TCR comprises (a) an alpha chain variable domain CDR1 domain having an amino acid sequence selected from the group consisting of SEQ ID NOs: 4, 14, 24, 34, 44, 54, 64, 74, 84, 94, and 104;

(b) an alpha chain variable domain CDR2 domain having an amino acid sequence selected from the group consisting of SEQ ID NOs: 5, 15, 25, 35, 45, 55, 65, 75, 85, 95, and 105;

(c) an alpha chain variable domain CDR3 domain having an amino acid sequence selected from the group consisting of SEQ ID NOs: 6, 16, 26, 36, 46, 56, 66, 76, 86, 96, and 106;

(d) a beta chain variable domain CDR1 having an amino acid sequence selected from the group consisting of SEQ ID NOs: 1, 11, 21, 31, 41, 51, 61, 71, 81, 91, and 101;

(e) a beta chain variable domain CDR2 having an amino acid sequence selected from the group consisting of SEQ ID NOs: 2, 12, 22, 32, 42, 52, 62, 72, 82, 92, and 102; and (f) a beta chain variable domain CDR3 having an amino acid sequence selected from the group consisting of SEQ ID NOs: 3, 13, 23, 33, 43, 53, 63, 73, 83, 93, and 103.

In some embodiments, the TCR comprises an alpha chain variable domain/beta chain variable domain amino acid sequence pair selected from the group consisting of SEQ ID NOs: 9/7, 19/17, 29/27, 39/37, 49/47, 59/57, 69/67, 79/77, 89/87, 99/97, and 109/107.

In some embodiments, the TCR comprises
(a) an alpha chain variable domain CDR1 encoded by a nucleic acid sequence selected from the group consisting of SEQ ID NOs:124, 130, 137, 145, and 156;
(b) an alpha chain variable domain CDR2 encoded by a nucleic acid sequence selected from the group consisting of SEQ ID NOs: 125, 131, 138, 146, and 157;
(c) an alpha chain variable domain CDR3 encoded by a nucleic acid sequence selected from the group consisting of SEQ ID NOs: 126, 132, 135, 139, 147, 149, 158, 160, and 161;
(d) a beta chain variable domain CDR1 encoded by a nucleic acid sequence selected from the group consisting of SEQ ID NOs: 121, 127, 133, 140, 142, 150, and 153;
(e) a beta chain variable domain CDR2 encoded by a nucleic acid sequence selected from the group consisting of SEQ ID NOs: 122, 128, 143, 151, and 154; and
(f) a beta chain variable domain CDR3 encoded by a nucleic acid sequence selected from the group consisting of SEQ ID NOs: 123, 129, 134, 136, 141, 144, 148, 152, 155, 159.

In some embodiments, the TCR comprises an alpha chain variable domain/beta chain variable domain nucleic acid sequence pair selected from the group consisting of SEQ ID NOs: 10/8, 20/18, 30/28, 40/38, 50/48, 60/58, 70/68, 80/78, 90/88, 100/98, and 110/108.

The present invention provides a vector comprising the polynucleotide sequence of a polynucleotide molecule described herein. The present invention provides an isolated cell comprising that vector. The present invention provides a method of treating a subject having an NY-ESO-1-associated disease or disorder, comprising administering to the subject that cell. In some embodiments, the NY-ESO-1-associated disease or disorder is NY-ESO-1-associated cancer. In some embodiments, the NY-ESO-1-associated cancer is a liposarcoma, a neuroblastoma, a myeloma, a metastatic melanoma, a synovial sarcoma, a bladder cancer, an esophageal cancer, a hepatocellular cancer, a head and neck cancer, a non-small cell lung cancer, an ovarian cancer, a prostate cancer, a breast cancer, astrocytic tumor, glioblastoma multiforme, anaplastic astrocytoma, brain tumor, fallopian tube cancer, ovarian epithelial cancer, primary peritoneal cavity cancer, advanced solid tumors, soft tissue sarcoma, melanoma, a sarcoma, myelodysplastic syndrome, acute myeloid leukemia, Hodgkin lymphoma, non-Hodgkin lymphoma, Hodgkin disease, multiple myeloma, synovial sarcoma, metastatic solid tumors, esophageal cancer, rhabdomyosarcoma, advanced myxoid, round cell liposarcoma, metastatic melanoma, or recurrent non-small cell lung cancer. In some embodiments, the cell is administered to the subject in combination with a second therapeutic agent.

In some embodiments, a cell as described herein is a primary cell, such as a primary lymphocyte (e.g., a primary T lymphocyte).

The present invention is further illustrated by the following detailed description and drawings.

BRIEF DESCRIPTION OF THE DRAWINGS

FIG. 2A shows specificity with respect to the EARS2:306-313 off-target peptide. FIG. 2B shows specificity with respect to the MAGEH1:90-98 off-target peptide. FIG. 2C shows specificity with respect to the FBXL22:4-12 off-target peptide. FIG. 2D shows specificity with respect to the URB11:1853-1861 off-target peptide. FIG. 2E shows specificity with respect to the LV9-5 mucin off-target peptide. FIGS. 2A-2E disclose SEQ ID NOs: 111, 114, 111, 115, 111, 116, 111, 117, 111 and 120, respectively, in order of appearance.

FIG. 5A shows data at Day 9 of expansion pre-sorting and immediately post-sorting. FIG. 5B shows data following expansion for 12 days post-sorting.

DETAILED DESCRIPTION OF THE INVENTION

Figure 1:
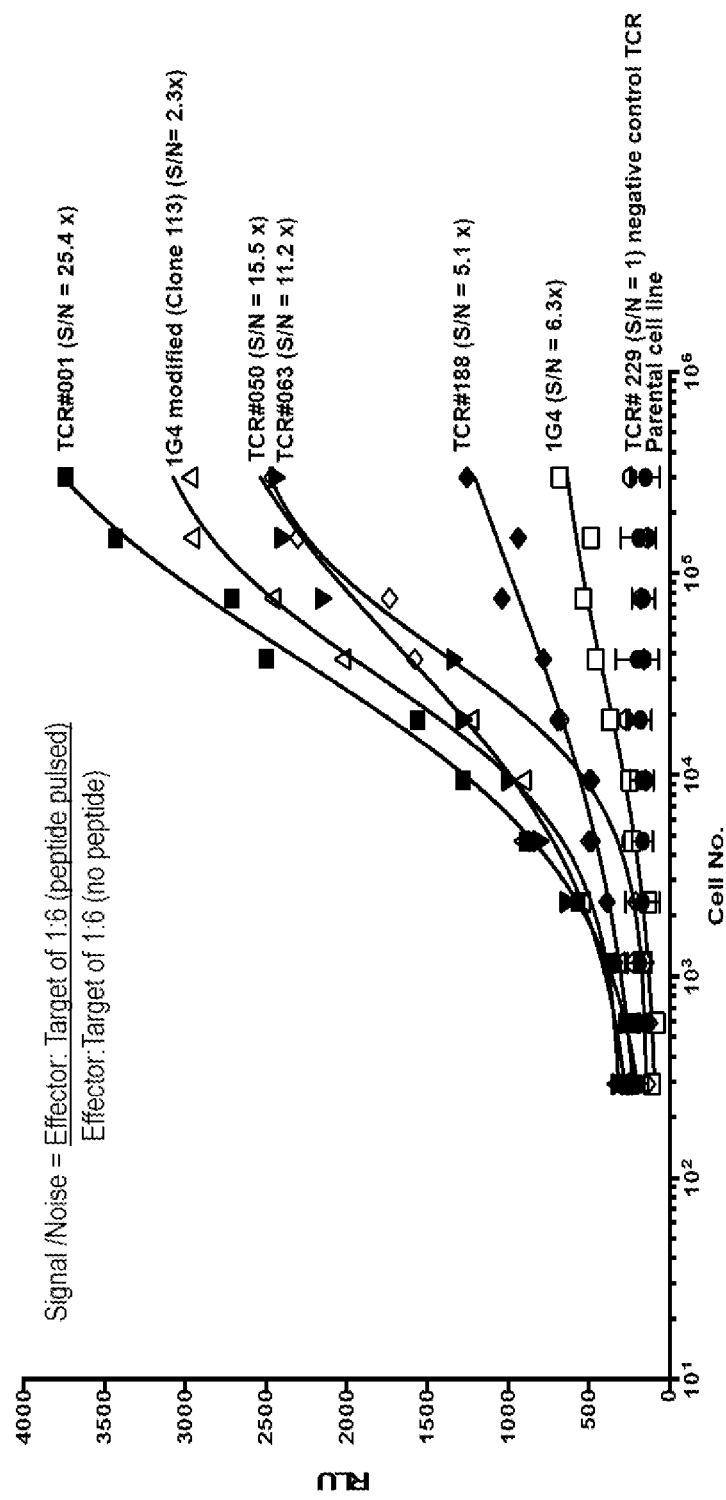
FIG. 1 depicts the activity of the indicated TCRs as determined by luminescence assay. Reporter T cells expressing HLA-A2/NY-ESO-1 (157-165) specific TCRs were co-cultured with HLA-A2+ APCs presenting the NY-ESO-1 peptide. VelociT™ derived TCRs activated T cells stronger than the patient-derived NY-ESO specific 1 G4 control TCR.
Figure 2A:
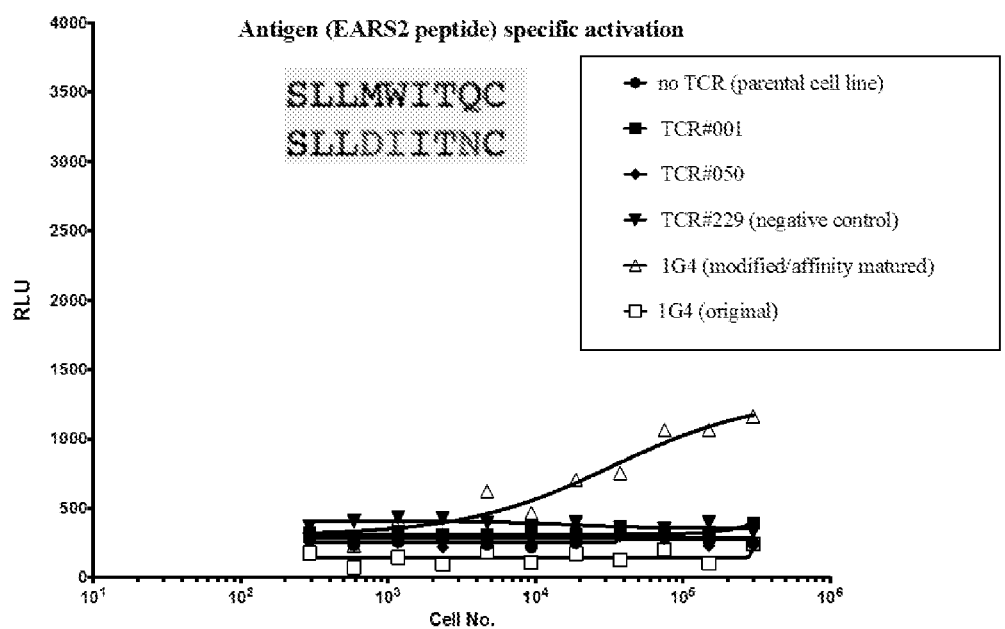
FIG. 2A, FIG. 2B, FIG. 2C, FIG. 2D, and FIG. 2E depict the specificity of the indicated TCRs as determined by luminescence assay.
Figure 2B:
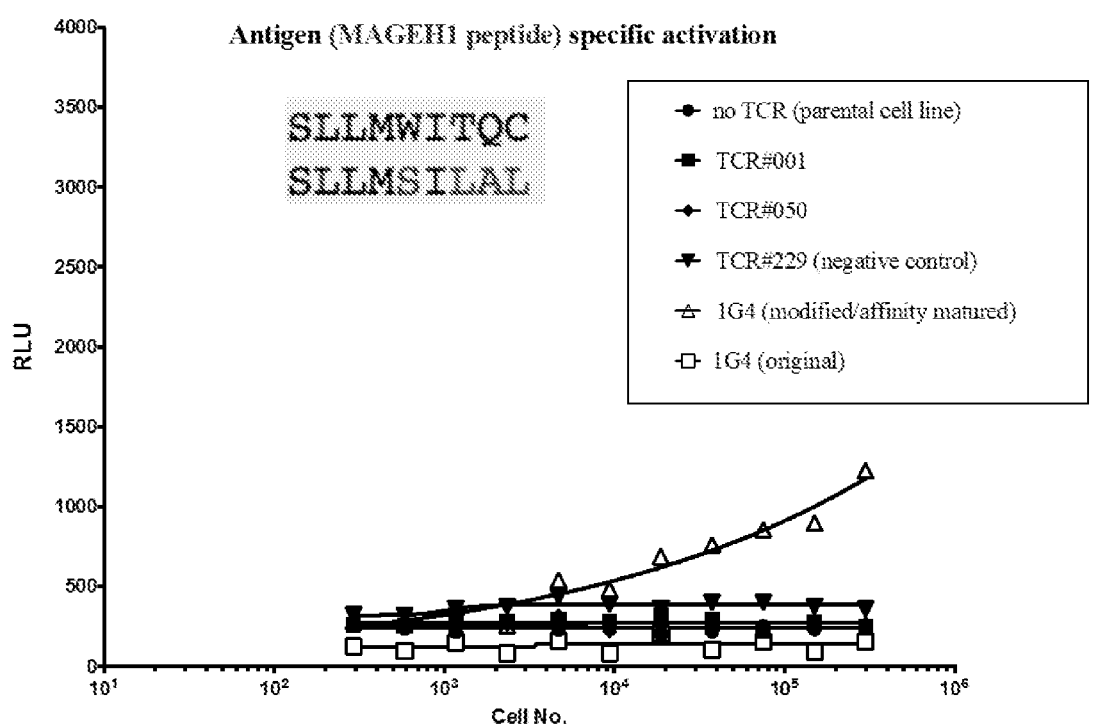
Figure 2C:
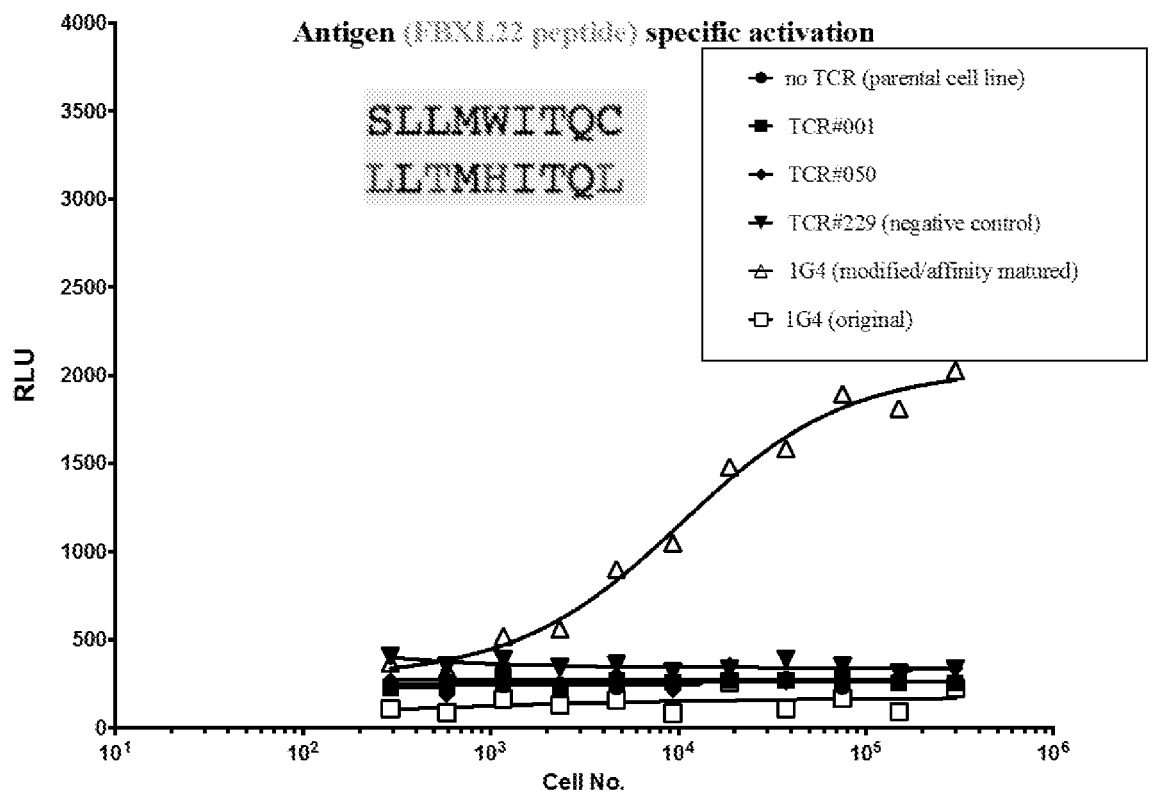
Figure 2D:
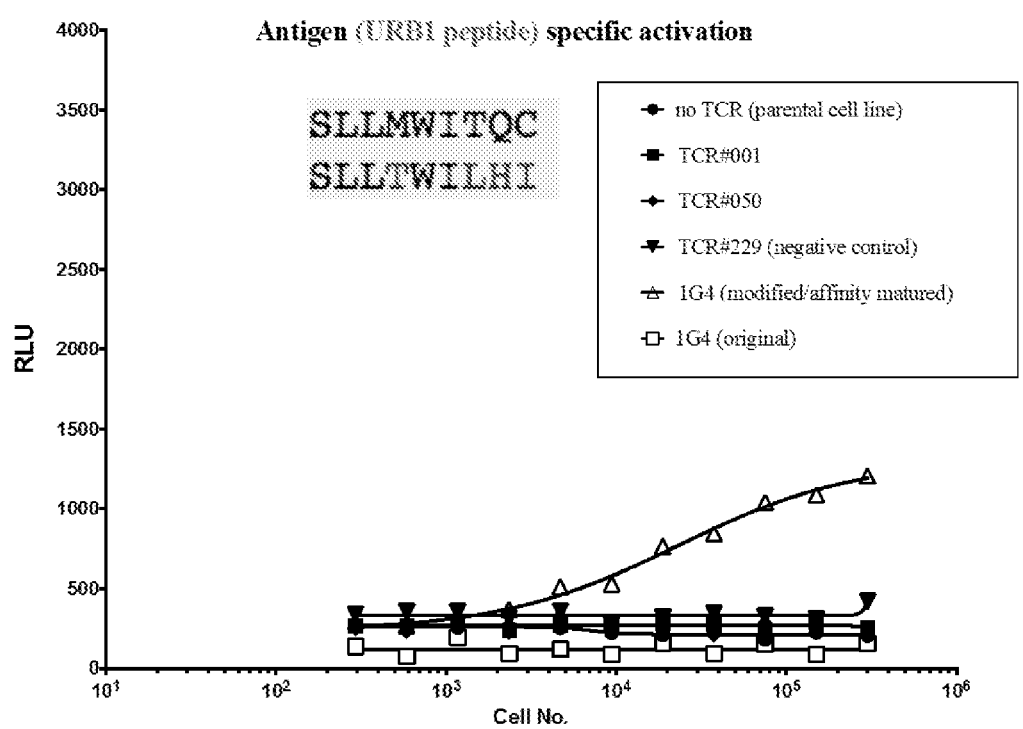
Figure 2E:
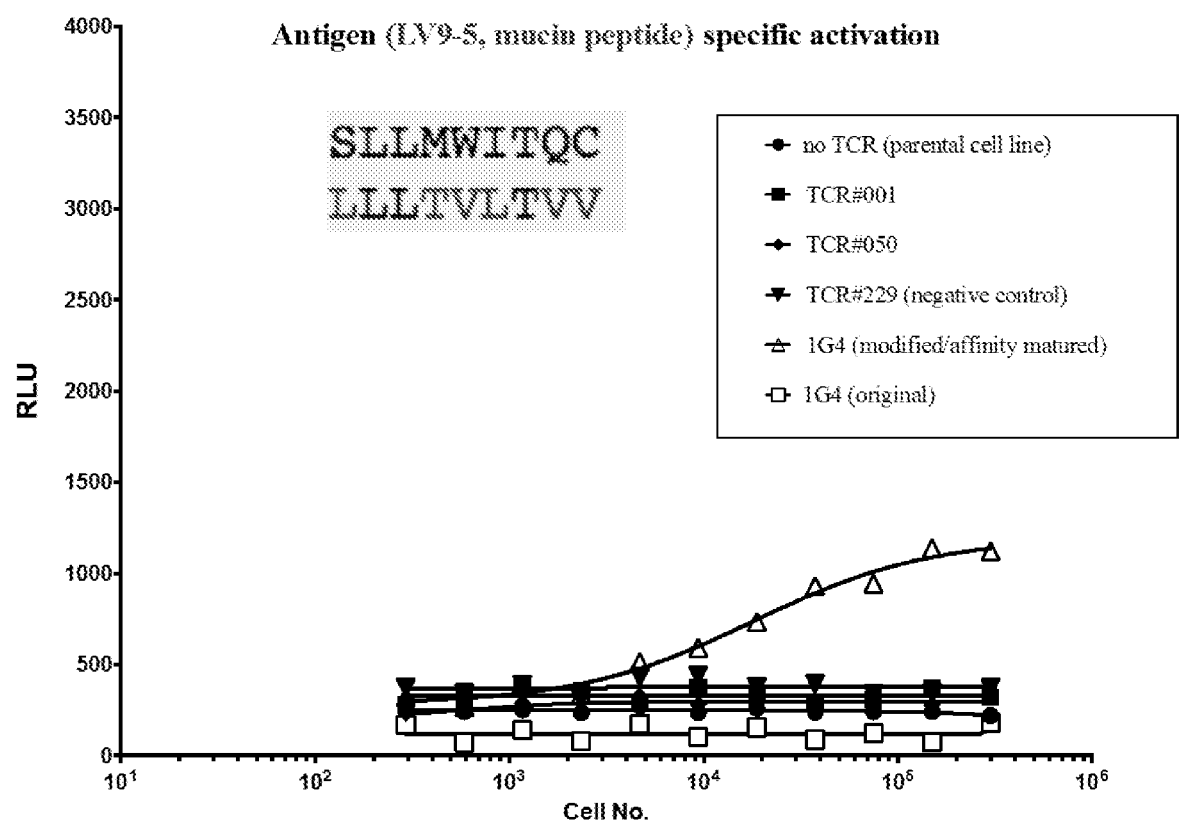

The present invention provides T cell receptors (TCRs) that were generated against an NY-ESO-1 peptide antigen in the context of MHC (HLA-A2). The unique TCR sequences identified have shown specific binding to the small peptide NY-ESO-1 presented in the groove of an HLA molecule and exhibited activation of T cells in a reporter assay. Furthermore, no cross-reactivity was found to other "like" peptides, as shown by a prediction algorithm and subsequent cross-reactivity (specificity) assay that assessed the TCRs against predicted cross-reactive peptides.

I. Definitions

In order that the present invention may be more readily understood, certain terms are first defined. In addition, it should be noted that whenever a value or range of values of a parameter are recited, it is intended that values and ranges intermediate to the recited values are also part of this invention.

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" in various places in the specification are not necessarily all referring to the same embodiment.

The articles "a" and "an" are used herein to refer to one or to more than one (i.e., to at least one) of the grammatical object of the article. By way of example, "an element" means one element or more than one element.

The term "comprising" or "comprises" is used herein in reference to compositions, methods, and respective component(s) thereof, that are essential to the disclosure, yet open to the inclusion of unspecified elements, whether essential or not.

The term "consisting of" refers to compositions, methods, and respective components thereof as described herein, which are exclusive of any element not recited in that description of the embodiment.

The term "T cell receptor" (TCR), as used herein, refers to an immunoglobulin superfamily member having a variable binding domain, a constant domain, a transmembrane region, and a short cytoplasmic tail; see, e.g., Janeway et al., *Immunobiology: The Immune System in Health and Disease*, 3rd Ed., Current Biology Publications, p. 4:33, 1997) capable of specifically binding to an antigen peptide bound to a MHC receptor. A TCR can be found on the surface of a cell and generally is comprised of a heterodimer having α and β chains (also known as TCRα and TCRβ, respectively), or γ and δ chains (also known as TCRγ and TCRδ, respectively). Like immunoglobulins, the extracellular portion of TCR chains (e.g., α-chain, β-chain) contain two immunoglobulin regions, a variable region (e.g., TCR variable α region or Vα and TCR variable β region or Vβ; typically amino acids 1 to 116 based on Kabat numbering at the N-terminus), and one constant region (e.g., TCR constant domain α or Cα and typically amino acids 117 to 259 based on Kabat, TCR constant domain β or Cβ, typically amino acids 117 to 295 based on Kabat) adjacent to the cell membrane. Also like immunoglobulins, the variable domains contain complementary determining regions (CDRs) separated by framework regions (FRs). In certain embodiments, a TCR is found on the surface of T cells (or T lymphocytes) and associates with the CD3 complex. The source of a TCR of the present disclosure may be from various animal species, such as a human, mouse, rat, rabbit or other mammal. In preferred embodiments, the source of a TCR of the present invention is a mouse genetically engineered to produce TCRs comprising human alpha and beta chains (see, e.g., PCT Publication No. WO 2016/164492, the entire contents of which is incorporated herein by reference).

The term "variable region" (variable region of an alpha chain (Vα), variable region of a beta chain (Vβ)) as used herein denotes each of the alpha and beta chains which is involved directly in binding the TCR to the antigen.

The "constant region" of the alpha chain and of the beta chain are not involved directly in binding of a TCR to an antigen, but exhibit various effector functions.

The term "antigen" as used herein is meant any substance that causes the immune system to produce antibodies or specific cell-mediated immune responses against it. A disease-associated antigen is any substance that is associated with any disease that causes the immune system to produce antibodies or a specific-cell mediated response against it.

The term "NY-ESO-1" or "New York esophageal squamous cell carcinoma 1" refers to the well-known cancer-testis antigen (CTAs) that is re-expressed in numerous cancer types.

The nucleotide and amino acid sequence of full-length NY-ESO-1 is provided in GenBank as accession number NM_001327.2 (SEQ ID NOs:112 and 113, respectively). Numbering of particular NY-ESO-1 nucleotide bases and amino acids is with respect to SEQ ID NOs: 112 or 113, respectively, or to a corresponding location in another NY-ESO-1 sequence (e.g., a sequence aligned with SEQ ID NO: 112 or 113). As used herein, numbering can be indicated in parentheses (e.g., NY-ESO-1 (157-165)), subscript (e.g., NY-ESO-1$_{157-165}$), or other formats indicating numbering. The term "NY-ESO-1" includes recombinant NY-ESO-1 or a fragment thereof. The term also encompasses NY-ESO-1 or a fragment thereof coupled to, for example, histidine tag, mouse or human Fc, or a signal sequence such as ROR1. In certain embodiments, the term comprises NY-ESO-1 or a fragment thereof in the context of HLA-A2, linked to HLA-A2 or as displayed by HLA-A2.

The term "HLA" refers to the human leukocyte antigen (HLA) system or complex, which is a gene complex encoding the major histocompatibility complex (MHC) proteins in humans. These cell-surface proteins are responsible for the regulation of the immune system in humans. HLAs corresponding to MHC class I (A, B, and C) present peptides from inside the cell.

The term "HLA-A" refers to the group of human leukocyte antigens (HLA) that are coded for by the HLA-A locus. HLA-A is one of three major types of human MHC class I cell surface receptors. The receptor is a heterodimer, and is composed of a heavy α chain and smaller β chain. The α chain is encoded by a variant HLA-A gene, and the β chain (p32-microglobulin) is an invariant β2 microglobulin molecule.

The term "HLA-A2" (which may also be referred to as HLA-A*0201 or HLA-A*02:01) is one particular class I major histocompatibility complex (MHC) allele group at the HLA-A locus; the α chain is encoded by the HLA-A*02 gene and the β chain is encoded by the 32-microglobulin or β2M locus.

The term "specifically binds," or "binds specifically to", or the like, means that TCR forms a complex with an antigen that is relatively stable under physiologic conditions. Specific binding can be characterized by an equilibrium dissociation constant of at least about $1\times10^{-6}$ M or less, for example, $1\times10^{-8}$ M or less (e.g., a smaller $K_D$ denotes a tighter binding). Methods for determining whether two molecules specifically bind are well known in the art and include, for example, equilibrium dialysis, surface plasmon resonance, and the like. As described herein, the TCRs of the invention bind specifically to an HLA-A2 presented cancer testis antigen New York Esophageal Squamous Cell Carcinoma-1 (NY-ESO-1) peptide, e.g., a peptide comprising amino acid residues 157-165 of NY-ESO-1.

The term "off-target peptide" refers to a peptide that differs by 1, 2, 3, 4, 5 or more amino acids from a target peptide (e.g., NY-ESO-1 (157-165) peptide). In certain embodiments, the term includes a peptide that differs by less than or equal to 3 amino acids than the target peptide. For example, for a 9-mer peptide, if 1, 2, or 3 amino acids are not identical to the target peptide, it is considered an "off-target" peptide. In certain embodiments, amino acid identity is expressed in terms of 'degree of similarity' (DoS). If 6 or more amino acids within a 9-mer peptide are identical, the DoS is 6. In certain embodiments, a peptide with DoS s 6 is considered an "off-target" peptide. The term "off-target" peptide also refers to a peptide that is similar to the target peptide based on sequence homology, is predicted to bind to HLA-A2 and is comprised in a protein that is expressed in essential, normal tissues. Accordingly, in some embodiments a TCR of the present disclosure can bind to an HLA-A2-presented NY-ESO-1 peptide (e.g., a peptide comprising amino acid residues 157-165 of NY-ESO-1) with an affinity corresponding to a $K_D$ value that is at least ten-fold lower than its affinity for binding to an off-target peptide.

The term "isolated" refers to a composition, compound, substance, or molecule altered by the hand of man from the natural state. For example, a composition or substance that occurs in nature is isolated if it has been changed or removed from its original environment, or both. For example, a polynucleotide or a polypeptide naturally present in a living animal is not isolated, but the same polynucleotide or polypeptide separated from the coexisting materials of its natural state is isolated, as the term is employed herein.

The term "recombinant", as used herein, refers to TCRs of the invention created, expressed, isolated or obtained by technologies or methods known in the art as recombinant DNA technology which include, e.g., DNA splicing and transgenic expression. The term refers to TCRs expressed in a non-human mammal (including transgenic non-human mammals, e.g., transgenic mice), or a cell (e.g., CHO cells) expression system or isolated from a recombinant combinatorial human antibody library.

As used herein, the terms "polynucleotide" and "nucleic acid molecule" are used interchangeably to refer to polymeric forms of nucleotides of any length. The polynucleotides may contain deoxyribonucleotides, ribonucleotides, and/or their analogs. Nucleotides may have any three-dimensional structure, and may perform any function, known or unknown. The term "polynucleotide" includes, for example, single-, double-stranded and triple helical molecules, a gene or gene fragment, exons, introns, mRNA, tRNA, rRNA, ribozymes, antisense molecules, cDNA, recombinant polynucleotides, branched polynucleotides, aptamers, plasmids, vectors, isolated DNA of any sequence, isolated RNA of any sequence, nucleic acid probes, and primers. A nucleic acid molecule may also comprise modified nucleic acid molecules (e.g., comprising modified bases, sugars, and/or internucleotide linkers).

The term "polypeptide" is meant to refer to any polymer preferably consisting essentially of any of the 20 natural amino acids regardless of its size. Although the term "protein" is often used in reference to relatively large proteins, and "peptide" is often used in reference to small polypeptides, use of these terms in the field often overlaps. The term "polypeptide" refers generally to proteins, polypeptides, and peptides unless otherwise noted. Peptides useful in accordance with the present disclosure in general will be generally between about 0.1 to 100 kDa or greater up to about 1000 kDa, preferably between about 0.1, 0.2, 0.5, 1, 2, 5, 10, 20, 30 and 50 kDa as judged by standard molecule sizing techniques such as centrifugation or SDS-polyacrylamide gel electrophoresis.

The term "vector" is a nucleic acid molecule that is able to replicate autonomously in a host cell and can accept foreign DNA. A vector carries its own origin of replication, one or more unique recognition sites for restriction endonucleases which can be used for the insertion of foreign DNA, and usually selectable markers such as genes coding for antibiotic resistance, and often recognition sequences (e.g., promoter) for the expression of the inserted DNA. Common vectors include plasmid vectors and phage vectors.

In some embodiments, TCRs of the invention may be conjugated to a moiety such as a ligand, a detectable moiety, or a therapeutic moiety ("immunoconjugate"), such as a cytotoxin, an anti-cancer drug, or any other therapeutic moiety useful for treating a disease or condition including NY-ESO-1-associated disease or disorder, such as an NY-ESO-1-associated cancer.

The term "surface plasmon resonance", as used herein, refers to an optical phenomenon that allows for the analysis of real-time biomolecular interactions by detection of alterations in protein concentrations within a biosensor matrix, for example using the BIACORE™ system (Pharmacia Biosensor AB, Uppsala, Sweden and Piscataway, N.J.).

The term "KD", also known as $K_D$ or $K_d$, is intended to refer to the equilibrium dissociation constant of a particular biomolecule and its binding partner. KD measurements are particularly useful for assessing protein-protein interactions, e.g. as in an antigen-binding protein-antigen interaction. The smaller the value of the KD, the greater (or e.g. stronger) the binding interaction or affinity between the antigen-binding protein and antigen (e.g. target). The larger the value of the KD, the weaker the binding interaction or affinity between the antigen-binding protein and antigen.

The term "substantial identity" or "substantially identical," when referring to a nucleic acid or fragment thereof, indicates that, when optimally aligned with appropriate nucleotide insertions or deletions with another nucleic acid (or its complementary strand), there is nucleotide sequence identity in at least about 90%, and more preferably at least about 95%, 96%, 97%, 98% or 99% of the nucleotide bases, as measured by any well-known algorithm of sequence identity, as discussed below. A nucleic acid molecule having substantial identity to a reference nucleic acid molecule may, in certain instances, encode a polypeptide having the same or substantially similar amino acid sequence as the polypeptide encoded by the reference nucleic acid molecule.

Sequence identity can be calculated using an algorithm, for example, the Needleman Wunsch algorithm (Needleman and Wunsch 1970, *J. Mol. Biol.* 48: 443-453) for global alignment, or the Smith Waterman algorithm (Smith and Waterman 1981, *J. Mol. Biol.* 147: 195-197) for local alignment. Another preferred algorithm is described by Dufresne et al in *Nature Biotechnology in* 2002 (vol. 20, pp. 1269-71) and is used in the software GenePAST (GQ Life Sciences, Inc. Boston, MA).

As applied to polypeptides, the term "substantial similarity" or "substantially similar" means that two peptide sequences, when optimally aligned, such as by the programs GAP or BESTFIT using default gap weights, share at least 90% sequence identity, even more preferably at least 95%, 96%, 97%, 98% or 99% sequence identity. Preferably, residue positions, which are not identical, differ by conservative amino acid substitutions. A "conservative amino acid substitution" is one in which an amino acid residue is substituted by another amino acid residue having a side chain (R group) with similar chemical properties (e.g., charge or hydrophobicity). In general, a conservative amino acid substitution will not substantially change the functional properties of a protein. In cases where two or more amino acid sequences differ from each other by conservative substitutions, the percent or degree of similarity may be adjusted upwards to correct for the conservative nature of the substitution. Means for making this adjustment are well known to those of skill in the art. See, e.g., Pearson (1994) *Methods Mol. Biol.* 24: 307-331, which is herein incorporated by reference. Examples of groups of amino acids that have side chains with similar chemical properties include 1) aliphatic side chains: glycine, alanine, valine, leucine and isoleucine; 2) aliphatic-hydroxyl side chains: serine and threonine; 3) amide-containing side chains: asparagine and glutamine; 4) aromatic side chains: phenylalanine, tyrosine, and tryptophan; 5) basic side chains: lysine, arginine, and histidine; 6) acidic side chains: aspartate and glutamate, and 7) sulfur-containing side chains: cysteine and methionine. Preferred conservative amino acids substitution groups are: valine-leucine-isoleucine, phenylalanine-tyrosine, lysine-arginine, alanine-valine, glutamate-aspartate, and asparagine-glutamine. Alternatively, a conservative replacement is any change having a positive value in the PAM250 log-likelihood matrix disclosed in Gonnet et al. (1992) *Science* 256: 144345, herein incorporated by reference. A "moderately conservative" replacement is any change having a nonnegative value in the PAM250 log-likelihood matrix.

Sequence similarity for polypeptides is typically measured using sequence analysis software. Protein analysis software matches similar sequences using measures of similarity assigned to various substitutions, deletions and other modifications, including conservative amino acid substitutions. For instance, GCG software contains programs such as GAP and BESTFIT which can be used with default parameters to determine sequence homology or sequence identity between closely related polypeptides, such as homologous polypeptides from different species of organisms or between a wild type protein and a mutein thereof. See, e.g., GCG Version 6.1. Polypeptide sequences also can be compared using FASTA with default or recommended parameters; a program in GCG Version 6.1. FASTA (e.g., FASTA2 and FASTA3) provides alignments and percent sequence identity of the regions of the best overlap between the query and search sequences (Pearson (2000) supra). Sequences also can be compared using the Smith-Waterman homology search algorithm using an affine gap search with a gap open penalty of 12 and a gap extension penalty of 2, BLOSUM matrix of 62. Another preferred algorithm when comparing a sequence of the invention to a database containing a large number of sequences from different organisms is the computer program BLAST, especially BLASTP or TBLASTN, using default parameters. See, e.g., Altschul et al. (1990) *J. Mol. Biol.* 215: 403-410 and (1997) *Nucleic Acids Res.* 25:3389-3402, each of which is herein incorporated by reference.

A "patient-derived TCR" is a TCR that is produced by isolating the alpha and beta chains of an NY-ESO-1 reactive TCR isolated from the T-lymphocytes that mediated in vivo regression of a tumor in a subject having an NY-ESO-1-associated cancer. An exemplary patient-derived NY-ESO-1 TCR is referred to as 1G4 (see, e.g., U.S. Pat. No. 8,143,376, the entire contents of which are incorporated herein by reference).

The term "activates a T cell response having a signal to noise ratio stronger or equal to a patient-derived NY-ESO-1-specific TCR" is meant to refer to an increase, i.e., about 2-fold or more, an amplification, i.e., about 2-fold, an augmentation, i.e., about 2-fold, or a boost of a physiological activity, i.e., about 2-fold, i.e., T cell signaling, as measured by, for example, a luminescent bioassay as described in Example 2. Reference to a greater T cell response, or a stronger T cell response or an activation signal, may be used interchangeably. Various measurements and assays of T cell response or T cell activation are well known to the skilled artisan.

By the phrase "therapeutically effective amount" is meant an amount that produces the desired effect for which it is administered. The exact amount will depend on the purpose of the treatment, and will be ascertainable by one skilled in the art using known techniques (see, for example, Lloyd (1999) *The Art, Science and Technology of Pharmaceutical Compounding*). The term "effective amount" is intended to encompass contexts such as a pharmaceutically effective amount or therapeutically effective amount. For example, in certain embodiments, the effective amount is capable of achieving a beneficial state, beneficial outcome, functional activity in a screening assay, or improvement of a clinical condition.

As used herein, the term "subject" refers to an animal, preferably a mammal, in need of amelioration, prevention and/or treatment of an NY-ESO-1-associated disease or disorder, such as an NY-ESO-1-associated cancer (e.g., an NY-ESO-1-positive cancer). The term includes human subjects who have or are at risk of having an NY-ESO-1-associated disease or disorder, such as an n NY-ESO-1-associated cancer.

As used herein, "anti-cancer drug" means any agent useful to treat or ameliorate or inhibit cancer including, but not limited to, cytotoxins and agents such as antimetabolites, alkylating agents, anthracyclines, antibiotics, antimitotic agents, procarbazine, hydroxyurea, asparaginase, corticosteroids, cyclophosphamide, mytotane (O,P'-(DDD)), biologics (e.g., antibodies and interferons) and radioactive agents. As used herein, "a cytotoxin or cytotoxic agent", also refers to a chemotherapeutic agent and means any agent that is detrimental to cells. Examples include Taxol® (paclitaxel), temozolamide, cytochalasin B, gramicidin D, ethidium bromide, emetine, cisplatin, mitomycin, etoposide, tenoposide, vincristine, vinbiastine, coichicin, doxorubicin, daunorubicin, dihydroxy anthracin dione, mitoxantrone, mithramycin, actinomycin D, 1-dehydrotestosterone, glucocorticoids, procaine, tetracaine, lidocaine, propranolol, and puromycin and analogs or homologs thereof.

The terms "prevent", "preventing", "prevention", "prophylactic treatment" and the like are meant to refer to reducing the probability of developing a disorder or condition in a subject, who does not have, but is at risk of or susceptible to developing a disorder or condition. Prevention and the like do not mean preventing a subject from ever getting the specific disease or disorder. Prevention may require the administration of multiple doses. Prevention can include the prevention of a recurrence of a disease in a subject for whom all disease symptoms were eliminated, or prevention of recurrence in a relapsing-remitting disease.

II. NY-ESO-1 T Cell Receptors (TCRs) and Compositions Comprising NY-ESO-1 TCRs

T cells are a subgroup of cells which, together with other immune cell types (polymorphonuclear, eosinophils, basophils, mast cells, B-cells, NK cells), constitute the cellular component of the immune system. Under physiological conditions T cells function in immune surveillance and in the elimination of foreign antigen. However, under pathological conditions there is compelling evidence that T cells play a major role in the causation and propagation of disease. In these disorders, breakdown of T cell immunological tolerance, either central or peripheral is a fundamental process in the causation of autoimmune disease.

T cells bind epitopes on small antigenic determinants on the surface of antigen-presenting cells that are associated with a major histocompatibility complex (MHC; in mice) or human leukocyte antigen (HLA; in humans) complex. T cells bind these epitopes through a T cell receptor (TCR) complex on the surface of the T cell. T cell receptors are heterodimeric structures composed of two types of chains: an α (alpha) and β (beta) chain, or a γ (gamma) and δ (delta) chain. The α chain is encoded by the nucleic acid sequence located within the α locus (on human or mouse chromosome 14), which also encompasses the entire δ locus, and the β chain is encoded by the nucleic acid sequence located within the β locus (on mouse chromosome 6 or human chromosome 7). The majority of T cells have an αβ TCR; while a minority of T cells bears a γδ TCR.

T cell receptor α and β polypeptides (and similarly γ and δ polypeptides) are linked to each other via a disulfide bond. Each of the two polypeptides that make up the TCR contains an extracellular domain comprising constant and variable regions, a transmembrane domain, and a cytoplasmic tail (the transmembrane domain and the cytoplasmic tail also being a part of the constant region). The variable region of the TCR determines its antigen specificity, and similar to immunoglobulins, comprises three complementary determining regions (CDRs). The TCR is expressed on most T cells in the body and is known to be involved in the recognition of MHC-restricted antigens. The TCR α chain includes a covalently linked Vα and Cα region, whereas the β chain includes a Vβ region covalently linked to a Cβ region. The Vα and Vβ regions form a pocket or cleft that can bind an antigen in the context of a major histocompatibility complex (MHC) (or HLA in humans). TCRs are detection molecules with exquisite specificity, and exhibit, like antibodies, an enormous diversity.

The general structure of TCR molecules and methods of making and using, including binding to a peptide:Major Histocompatibility Complex have been disclosed. See, for example PCT/US98/04274; PCT/US98/20263; WO99/60120.

Non-human animals (e.g., rodents, e.g., mice or rats) can be genetically engineered to express a human or humanized T cell receptor (TCR) comprising a variable domain encoded by at least one human TCR variable region gene segment, as described in, for example, PCT Publication No. WO 2016/164492, the entire contents of which are hereby incorporated herein by reference. For example, the VelociT® mouse technology (Regeneron), a genetically modified mouse that allows for the production of fully human therapeutic TCRs against tumor and/or viral antigens, can be used to produce the TCRs of the invention. Those of skill in the art, through standard mutagenesis techniques, in conjunction with the assays described herein, can obtain altered TCR sequences and test them for particular binding affinity and/or specificity. Useful mutagenesis techniques known in the art include, without limitation, de novo gene synthesis, oligonucleotide-directed mutagenesis, region-specific mutagenesis, linker-scanning mutagenesis, and site-directed mutagenesis by PCR (see, e.g., Sambrook et al. (1989) and Ausubel et al. (1999)).

Briefly, in some embodiments, methods for generating a TCR to an NY-ESO-1 (157-165) peptide may include immunizing a non-human animal (e.g., a rodent, e.g., a mouse or a rat), such as a genetically engineered non-human animal that comprises in its genome an un-rearranged human TCR variable gene locus, with an NY-ESO-1 (157-165) peptide; allowing the animal to mount an immune response to the peptide; isolating from the animal a T cell reactive to the peptide; determining a nucleic acid sequence of a human TCR variable region expressed by the T cell; cloning the human TCR variable region into a nucleotide construct comprising a nucleic acid sequence of a human TCR constant region such that the human TCR variable region is operably linked to the human TCR constant region; and expressing from the construct a human T cell receptor specific for the NY-ESO-1 (157-165) peptide. In some embodiments, the steps of isolating a T cell, determining a nucleic acid sequence of a human TCR variable region expressed by the T cell, cloning the human TCR variable region into a nucleotide construct comprising a nucleic acid sequence of a human TCR constant region, and expressing a human T cell receptor are performed using standard techniques known to those of skill the art.

In some embodiments, the nucleotide sequence encoding a T cell receptor specific for an antigen of interest is expressed in a cell. In some embodiments, the cell expressing the TCR is selected from a CHO, COS, 293, HeLa, PERC.6™ cell, etc.

In obtaining variant TCR coding sequences, those of ordinary skill in the art will recognize that TCR-derived proteins may be modified by certain amino acid substitutions, additions, deletions, and post-translational modifications, without loss or reduction of biological activity. In particular, it is well known that conservative amino acid substitutions, that is, substitution of one amino acid for another amino acid of similar size, charge, polarity and conformation, are unlikely to significantly alter protein function. The 20 standard amino acids that are the constituents of proteins can be broadly categorized into four groups of conservative amino acids as follows: the nonpolar (hydrophobic) group includes alanine, isoleucine, leucine, methionine, phenylalanine, proline, tryptophan and valine; the polar (uncharged, neutral) group includes asparagine, cysteine, glutamine, glycine, serine, threonine and tyrosine; the positively charged (basic) group contains arginine, histidine and lysine; and the negatively charged (acidic) group contains aspartic acid and glutamic acid. Substitution in a protein of one amino acid for another within the same group is unlikely to have an adverse effect on the biological activity of the protein.

In some embodiments, a TCR of the present disclosure can comprise a CDR sequence (e.g., a CDR3 sequence such as a Vα CDR3 or a Vβ CDR3) with 1 or more substitutions as compared to a CDR sequence (e.g., a CDR3 sequence such as a Vα CDR3 or a Vβ CDR3) of Table 6. For example, a TCR of the present disclosure can comprise a CDR sequence with 1, 2, 3, 4, 5, 6, 7, 8, 9, 10, or more substitutions as compared to a CDR sequence of Table 6. In general, the TCRs of the present invention function by binding to an HLA-A2 presented NY-ESO-1 (157-165) peptide. As used herein, an HLA presented peptide (such as an HLA-A2 presented peptide) can refer to a peptide that is bound to a human leukocyte antigen (HLA) protein, for example, an HLA protein expressed on the surface of a cell. Thus, a TCR that binds to an HLA presented peptide binds to the peptide that is bound by the HLA, and optionally also binds to the HLA itself. Interaction with the HLA can confer specificity for binding to a peptide presented by a particular HLA. In some embodiments, the TCR binds to an isolated HLA presented peptide. In some embodiments, the TCR binds to an HLA presented peptide on the surface of a cell.

In general, the TCRs of the present invention can function by binding to an HLA-A2 presented NY-ESO-1 (157-165) peptide.

The present invention includes NY-ESO-1 TCRs that bind a NY-ESO-1 (157-165) peptide in the context of HLA-A2 with high specificity. In some embodiments, the NY-ESO-1 TCRs do not bind to the NY-ESO-1 (157-165) peptide in the absence of HLA-A2, or such binding is minimal. Further, in some embodiments, the NY-ESO-1 TCRs do not bind to an off-target peptide in the context of HLA-A2, or such binding is minimal. As used herein, an off-target peptide can refer to a peptide that differs from a target peptide by 1, 2, 3, 4, 5, or more amino acids. In some embodiments, binding specificity can be determined by a) measuring on-target binding (e.g., binding to the HLA-A2 presented NY-ESO-1 (157-165) peptide), b) measuring off-target binding, and c) quantifying the difference between the two, e.g., by calculating a ratio. This ratio can be calculated, for example, by dividing the values obtained in a) and b). Measurement of on-target and off-target binding can be achieved, for example, by measuring % binding to a peptide/HLA tetramer reagent (e.g., an NY-ESO-1/HLA tetramer reagent or a MAGE-H190-98/HLA tetramer reagent), or by other techniques known in the art. In some embodiments, an on-target binding/off-target binding value (e.g., a value obtained by dividing the values obtained in a) and b) described above) of a TCR of the present disclosure can be greater than 5, greater than 6, greater than 7, greater than 8, greater than 9, greater than 10, greater than 11, greater than 12, greater than 13, greater than 14, greater than 15, greater than 16, greater than 17, greater than 18, greater than 19, greater than 20, greater than 21, greater than 22, greater than 23, greater than 24, greater than 25, greater than 26, greater than 27, greater than 28, greater than 29, greater than 30, greater than 35, greater than 40, greater than 45, greater than 50, greater than 55, greater than 60, greater than 65, greater than 70, greater than 75, greater than 80, greater than 85, greater than 90, greater than 95, greater than 100, greater than 110, greater than 120, greater than 130, greater than 140, greater than 150, greater than 160, greater than 170, greater than 180, greater than 190, greater than 200, greater than 225, greater than 250, greater than 275, greater than 300, greater than 325, greater than 350, greater than 375, greater than 400, greater than 425, greater than 450, greater than 475, greater than 500, greater than 550, greater than 600, greater than 650, greater than 700, greater than 750, greater than 800, greater than 850, greater than 900, greater than 950, greater than 1000, greater than 1100, greater than 1200, greater than 1300, greater than 1400, greater than 1500, greater than 1600, greater than 1700, greater than 1800, greater than 1900, or greater than 2000. In some embodiments, an on-target binding/off-target binding value (e.g., a value obtained by dividing the values obtained in a) and b) described above) can be about 5 to about 20, about 10 to about 30, about 20 to about 80, about 30 to about 70, about 40 to about 60, about 50 to about 250, about 100 to about 200, about 100 to about 1000, about 300 to about 700, about 500 to about 1500, about 800 to about 1200, about 900 to about 1100, about 800 to about 1500, about 1000 to about 1400, or about 1100 to about 1300.

In some embodiments, the invention provides a recombinant antigen-binding protein (e.g., an isolated antigen-binding protein) that binds specifically to a conformational epitope of an HLA-A2 presented human NY-ESO-1 (157-165) peptide, wherein the antigen-binding protein has a property selected from the group consisting of: (a) binds monomeric HLA-A2: NY-ESO-1 (157-165) peptide with a binding dissociation equilibrium constant ($K_D$) of less than about 20 nM as measured in a surface plasmon resonance assay at 25° C.; (b) binds monomeric HLA-A2:NY-ESO-1 (157-165) peptide with a binding dissociation equilibrium constant ($K_D$) of less than about 25 nM as measured in a surface plasmon resonance assay at 25° C.; (c) binds to HLA-A2:NY-ESO-1 (157-165) peptide-expressing cells with an $EC_{50}$ less than about 6 nM and does not specifically bind to cells expressing predicted off-target peptides but not an HLA-A2 presented NY-ESO-1 peptide comprising the amino acid sequence of SEQ ID NO: 111, as determined by luminescence assay; (d) binds to HLA-A2:NY-ESO-1 (157-165) peptide-expressing cells with an $EC_{50}$ less than about 1 nM and do not substantially bind to cells expressing predicted off-target peptides as determined by luminescence assay; (e) binds to HLA-A2: NY-ESO-1 (157-165) peptide-expressing cells with an $EC_{50}$ less than about 30 nM as determined by flow cytometry assay; (f) binds to HLA-A2: NY-ESO-1 (157-165) peptide-expressing cells with an $EC_{50}$ less than about 75 nM as determined by flow cytometry assay; and (g) the conformational epitope comprises one or more amino acids of SEQ ID NO: 111.

In some embodiments, the NY-ESO-1 TCRs of the present disclosure have specific activity or affinity for NY-ESO-1 (157-165) as measured by an in vitro assay. For example, cells (such as T2 cells) expressing an HLA can be pulsed with a NY-ESO-1 (157-165) polypeptide, or an off-target polypeptide thereby inducing the cells to present the polypeptide bound to the HLA. Alternatively or in addition to using an off-target polypeptide as a control, an off-target HLA (an HLA other than the HLA that is recognized by the TCR of interest) can be used. For example, an off-target HLA can be used to present the NY-ESO-1 peptide to test for specificity of binding to the HLA-A2-presented NY-ESO-11 peptide. In addition, a control can be a cell line that expresses neither NY-ESO-1 nor the target HLA (e.g., HLA-A2). Cells can be co-cultured with a T-cell population expressing the TCR of interest, and activity measured as a function of the amount of a cytokine (such as interferon gamma) produced by the cells. In certain embodiments, the assay can comprise in vitro co-cultures of a TCR-expressing T cell population with $10^{-10}$ M peptide-loaded T2 cells at an effector cell:target cell ratio of 1:1 ($1 \times 10^5$ effector cells/96 well), and interferon gamma measurement 24 hours after co-culture (e.g., by a Meso Scale Discovery (MSD®) Sector Imager). In certain embodiments, the assay can comprise in vitro co-cultures of a TCR-expressing T cell population and effector cell at an effector cell:target cell ratio of 5:1 ($2.5 \times 10^5$ effector cells:$5 \times 10^4$ target cells), and interferon gamma measurement 24 hours after co-culture (e.g., by a Meso Scale Discovery (MSD®) Sector Imager).

Increasing amounts of cytokine detected can serve as an indicator of activity. The activity or specificity of a TCR of interest to its target peptide in comparison to a control (off-target) polypeptide, or the activity or specificity of a TCR of interest to its on-target HLA-bound target peptide in comparison to an off-target HLA-bound target peptide can be 2-fold or greater, 3-fold or greater, 4-fold or greater, 5-fold or greater, 6-fold or greater, 7-fold or greater, 8-fold or greater, 9-fold or greater, 10-fold or greater, 15-fold or greater, 20-fold or greater, 30-fold or greater, 40-fold or greater, 50-fold or greater, 100-fold or greater, 200-fold or greater, 300-fold or greater, 400-fold or greater, 500-fold or greater, 600-fold or greater, 700-fold or greater, 800-fold or greater, 900-fold or greater, 1,000-fold or greater, 1,500-fold or greater, 2,000-fold or greater, 2,500-fold or greater, 3,000-fold or greater, 4,000-fold or greater, 5,000-fold or greater, 10,000-fold or greater, 20,000-fold or greater, 30,000-fold or greater, 40,000-fold or greater, 50,000-fold or greater, 60,000-fold or greater, 70,000-fold or greater, 80,000-fold or greater, 90,000-fold or greater, or 100,000-fold or greater.

In certain embodiments, the NY-ESO-1 TCRs of the present invention are useful in inhibiting the growth of a tumor or delaying the progression of cancer when administered prophylactically to a subject in need thereof and may increase survival of the subject. For example, the administration of an NY-ESO-1 TCR of the present invention may lead to shrinking of a primary tumor and may prevent metastasis or development of secondary tumors. In certain embodiments, the NY-ESO-1 TCRs of the present invention are useful in inhibiting the growth of a tumor when administered therapeutically to a subject in need thereof and may increase survival of the subject. For example, the administration of a therapeutically effective amount of an NY-ESO-1 TCR of the invention to a subject may lead to shrinking and disappearance of an established tumor in the subject.

In some embodiments, the invention provides an isolated TCR that specifically binds to an HLA-A2 presented NY-ESO-1 (157-165) peptide, wherein the antigen-binding protein exhibits one or more of the following characteristics: (i) comprises an alpha chain variable domain comprising complementary determining regions (CDR) 1, CDR2, and CDR3, wherein the CDR3 region comprises the amino acid sequence of Formula I (SEQ ID NO: 118):

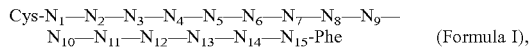

Cys-$N_1$—$N_2$—$N_3$—$N_4$—$N_5$—$N_6$—$N_7$—$N_8$—$N_9$—$N_{10}$—$N_{11}$—$N_{12}$—$N_{13}$—$N_{14}$—$N_{15}$-Phe     (Formula I), wherein
$N_1$ is a nonpolar amino acid;
$N_2$ is Leu, Tyr, Val, or Ala;
$N_3$ is Arg, Asn, Thr, or Ser;
$N_4$ is Pro, Ser, Glu, Ile, Gly, Met, Lys, or Thr;
$N_5$, which may or may not be present, is Lys;
$N_6$, which may or may not be present in Asp, Ala, Gly, Leu, or Asn;
$N_7$ is Ser, Asn, Ala, Tyr, or Thr;
$N_8$, which may or may not be present, is Ser or Gly;
$N_9$, which may or may not be present, is Gly;
$N_{10}$, which may or may not be present, is Gly or Ser;
$N_{11}$, which may or may not be present, is Trp, Gly, Ser, Gln, Ala, or Pro;
$N_{12}$ is Gly, Tyr, Asn, Gln, or Ser;
$N_{13}$ is Lys, Ala, Asp, Ile, or Asn;
$N_{14}$ is a nonpolar amino acid; and
$N_{15}$ is Gln, Asn, Arg, Thr, Val, Ile, or Ser; optionally wherein $N_1$ is Ala or Ile; and/or wherein $N_{14}$ is Phe, Leu, Met, or Pro; (ii) comprises a beta chain variable domain comprising beta chain variable domain comprises complementary determining regions (CDR) 1, CDR2, and CDR3, wherein the CDR3 region comprises amino acid sequence of Formula II (SEQ ID NO: 119):

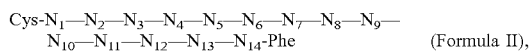

Cys-$N_1$—$N_2$—$N_3$—$N_4$—$N_5$—$N_6$—$N_7$—$N_8$—$N_9$—$N_{10}$—$N_{11}$—$N_{12}$—$N_{13}$—$N_{14}$-Phe     (Formula II), wherein
$N_1$ and $N_2$ are each independently Ala or Ser;
$N_3$ is Ser, Met, or Lys;
$N_4$ is Tyr, Trp, His, Leu, Thr, Glu or Gln;
$N_5$ is Ser, Ala, Thr, Gly, Val, or Arg;
$N_6$, which may or may not be present, is Gly, His, Asp, Thr, Pro, Met, or Ser;
$N_7$, which may or may not be present, is Gly, Tyr, Asn, or Pro;
$N_8$, which may or may not be present, is Y;
$N_9$, which may or may not be present, is N;
$N_{10}$, which may or may not be present, is a polar amino acid;
$N_{11}$ is Pro, Glu, Gly, or Asp;
$N_{12}$, which may or may not be present, is Glu;
$N_{13}$ is Leu, Ala, Gln, or Tyr; an
$N_{14}$ is His, Phe, or Thr; optionally wherein $N_{10}$ is Ser, Thr, Gln, or Tyr; (iii) comprises a CDR1 of the alpha chain variable domain comprising any one of the CDR1 amino acid sequences set forth in Table 1, or a substantially similar sequence thereof having at least 90%, at least 95%, at least 96%, at least 97%, at least 98% or at least 99% sequence identity, and a CDR2 of the alpha chain variable domain independently comprising any one of the CDR2 amino acid sequences set forth in Table 1, or a substantially similar sequence thereof having at least 90%, at least 95%, at least 96%, at least 97%, at least 98% or at least 99% sequence identity; (iv) comprises a CDR1 of a beta chain variable domain comprising any one of the CDR1 amino acid sequences set forth in Table 1, or a substantially similar sequence thereof having at least 90%, at least 95%, at least 96%, at least 97%, at least 98% or at least 99% sequence identity, and a CDR2 of a beta chain variable domain independently comprising any one of the CDR2 amino acid sequences set forth in Table 1, or a substantially similar sequence thereof having at least 90%, at least 95%, at least 96%, at least 97%, at least 98% or at least 99% sequence identity; (v) comprises an alpha chain variable domain CDR1, CDR2 and CDR3 contained within any one of the alpha chain variable domain sequences listed in Table 3, or a substantially similar sequence thereof having at least 90%, at least 95%, at least 96%, at least 97%, at least 98% or at least 99% sequence identity; and beta chain variable domain CDR1, CDR2 and CDR3 contained within any one of the beta chain variable domain sequences listed in Table 3, or a substantially similar sequence thereof having at least 90%, at least 95%, at least 96%, at least 97%, at least 98% or at least 99% sequence identity; (vi) comprises an alpha chain variable domain having an amino acid sequence that has at least 85%, 86%, 87%, 88%, 89%, 90%, 91%, 92%, 93%, 94%, 95%, 96%, 97%, 98%, 99% or about 100% amino acid identity to the entire amino acid sequence of any one of the amino acid sequences of the alpha chain variable domain amino acid sequences listed in Table 3; (vii) comprises a beta chain variable domain having an amino acid sequence that has at least 85%, 86%, 87%, 88%, 89%, 90%, 91%, 92%, 93%, 94%, 95%, 96%, 97%, 98%, 99% or about 100% amino acid identity to the entire amino acid sequence of any one of the amino acid sequences of the beta chain variable domain amino acid sequences listed in Table 3; (viii) comprises (a) an alpha chain variable domain having an amino acid sequence that has at least 85%, 86%, 87%, 88%, 89%, 90%, 91%, 92%, 93%, 94%, 95%, 96%, 97%, 98%, 99% or about 100% amino acid identity to the entire amino acid sequence of any one of the amino acid sequences of the alpha chain variable domain amino acid sequences listed in Table 3; and (b) a beta chain variable domain having an amino acid sequence that has at least 85%, 86%, 87%, 88%, 89%, 90%, 91%, 92%, 93%, 94%, 95%, 96%, 97%, 98%, 99% or about 100% amino acid identity to the entire amino acid sequence of any one of the amino acid sequences of the beta chain variable domain amino acid sequences listed in Table 3; (ix) comprises (a) an alpha chain variable domain CDR1 domain having an amino acid sequence selected from the group consisting of SEQ ID NOs: 4, 14, 24, 34, 44, 54, 64, 74, 84, 94, and 104, or a substantially similar sequence thereof having at least 90%, at least 95%, at least 96%, at least 97%, at least 98%, at least 99%, or 100% sequence identity; (b) an alpha chain variable domain CDR2 domain having an amino acid sequence selected from the group consisting of SEQ ID NOs: 5, 15, 25, 35, 45, 55, 65, 75, 85, 95, and 105, or a substantially similar sequence thereof having at least 90%, at least 95%, at least 96%, at least 97%, at least 98%, at least 99%, or 100% sequence identity; (c) an alpha chain variable domain CDR3 domain having an amino acid sequence selected from the group consisting of SEQ ID NOs: 6, 16, 26, 36, 46, 56, 66, 76, 86, 96, and 106, or a substantially similar sequence thereof having at least 90%, at least 95%, at least 96%, at least 97%, at least 98%, at least 99%, or 100% sequence identity; (d) a beta chain variable domain CDR1 having an amino acid sequence selected from the group consisting of SEQ ID NOs: 1, 11, 21, 31, 41, 51, 61, 71, 81, 91, and 101, or a substantially similar sequence thereof having at least 90%, at least 95%, at least 96%, at least 97%, at least 98%, at least 99%, or 100% sequence identity; (e) a beta chain variable domain CDR2 having an amino acid sequence selected from the group consisting of SEQ ID NOs: 2, 12, 22, 32, 42, 52, 62, 72, 82, 92, and 102, or a substantially similar sequence thereof having at least 90%, at least 95%, at least 96%, at least 97%, at least 98%, at least 99%, or 100% sequence identity; and (f) a beta chain variable domain CDR3 having an amino acid sequence selected from the group consisting of SEQ ID NOs: 3, 13, 23, 33, 43, 54, 63, 73, 83, 93, and 103, or a substantially similar sequence thereof having at least 90%, at least 95%, at least 96%, at least 97%, at least 98%, at least 99%, or 100% sequence identity; (x) comprises an alpha chain variable domain/beta chain variable domain amino acid sequence pair selected from the group consisting of SEQ ID NOs: 9/7; 19/17; 29/27; 39/37; 49/47; 59; 57; 69/67; 79/77; 89/87; 99/97; and 109/107, or a substantially similar sequence thereof having at least 90%, at least 95%, at least 96%, at least 97%, at least 98%, at least 99%, or 100% sequence identity; (xi) does not specifically bind to cells expressing predicted off-target peptides but not an HLA-A2 presented NY-ESO-1 peptide comprising the amino acid sequence of SEQ ID NO: 111, as determined by luminescence assay; and/or (xii) activates a T cell response about two times greater than a patient-derived NY-ESO-1-specific TCR, e.g., activates a T cell response about two times greater, or about three times greater, or about four times greater than a patient-derived NY-ESO-1-specific TCR as determined by a TCR-mediated T cell signaling luminescent bioassay.

The TCRs of the present invention may possess one or more of the aforementioned biological characteristics, or any combinations thereof. Other biological characteristics of the antigen-binding proteins of the present invention will be evident to a person of ordinary skill in the art from a review of the present disclosure including the working Examples herein.

In certain embodiments, a polynucleotide encoding an NY-ESO-1 TCR described herein is inserted into a vector. The term "vector" as used herein refers to a vehicle into which a polynucleotide encoding a protein may be covalently inserted so as to bring about the expression of that protein and/or the cloning of the polynucleotide. Such vectors may also be referred to as "expression vectors". The isolated polynucleotide may be inserted into a vector using any suitable methods known in the art, for example, without limitation, the vector may be digested using appropriate restriction enzymes and then may be ligated with the isolated polynucleotide having matching restriction ends. Expression vectors have the ability to incorporate and express heterologous or modified nucleic acid sequences coding for at least part of a gene product capable of being transcribed in a cell. In most cases, RNA molecules are then translated into a protein. Expression vectors can contain a variety of control sequences, which refer to nucleic acid sequences necessary for the transcription and possibly translation of an operatively linked coding sequence in a particular host organism. In addition to control sequences that govern transcription and translation, vectors and expression vectors may contain nucleic acid sequences that serve other functions as well and are discussed infra. An expression vector may comprise additional elements, for example, the expression vector may have two replication systems, thus allowing it to be maintained in two organisms, for example in human cells for expression and in a prokaryotic host for cloning and amplification.

The expression vector may have the necessary 5' upstream and 3' downstream regulatory elements such as promoter sequences such as CMV, PGK and EF1a promoters, ribosome recognition and binding TATA box, and 3' UTR AAUAAA transcription termination sequence for the efficient gene transcription and translation in its respective host cell. Other suitable promoters include the constitutive promoter of simian virus 40 (SV40) early promoter, mouse mammary tumor virus (MMTV), HIV LTR promoter, MoMuLV promoter, avian leukemia virus promoter, EBV immediate early promoter, and rous sarcoma virus promoter. Human gene promoters may also be used, including, but not limited to the actin promoter, the myosin promoter, the hemoglobin promoter, and the creatine kinase promoter. In certain embodiments inducible promoters are also contemplated as part of the vectors expressing chimeric antigen receptor. This provides a molecular switch capable of turning on expression of the polynucleotide sequence of interest or turning off expression. Examples of inducible promoters include, but are not limited to a metallothionine promoter, a glucocorticoid promoter, a progesterone promoter, or a tetracycline promoter.

The expression vector may have additional sequence such as 6×-histidine (SEQ ID NO: 165), c-Myc, and FLAG tags which are incorporated into the expressed TCRs. Thus, the expression vector may be engineered to contain 5' and 3' untranslated regulatory sequences that sometimes can function as enhancer sequences, promoter regions and/or terminator sequences that can facilitate or enhance efficient transcription of the nucleic acid(s) of interest carried on the expression vector. An expression vector may also be engineered for replication and/or expression functionality (e.g., transcription and translation) in a particular cell type, cell location, or tissue type. Expression vectors may include a selectable marker for maintenance of the vector in the host or recipient cell.

Examples of vectors are plasmid, autonomously replicating sequences, and transposable elements. Additional exemplary vectors include, without limitation, plasmids, phagemids, cosmids, artificial chromosomes such as yeast artificial chromosome (YAC), bacterial artificial chromosome (BAC), or P1-derived artificial chromosome (PAC), bacteriophages such as lambda phage or M13 phage, and animal viruses. Examples of categories of animal viruses useful as vectors include, without limitation, retrovirus (including lentivirus), adenovirus, adeno-associated virus, herpesvirus (e.g., herpes simplex virus), poxvirus, baculovirus, papillomavirus, and papovavirus (e.g., SV40). Examples of expression vectors are Lenti-X™ Bicistronic Expression System (Neo) vectors (Clontrch), pClneo vectors (Promega) for expression in mammalian cells; pLenti4/V5-DEST.™, pLenti6/V5-DEST™, and pLenti6.2N5-GW/lacZ (Invitrogen) for lentivirus-mediated gene transfer and expression in mammalian cells. The coding sequences of the TCRs disclosed herein can be ligated into such expression vectors for the expression of the chimeric protein in mammalian cells.

In certain embodiments, the nucleic acids encoding the TCR of the present invention are provided in a viral vector. A viral vector can be those derived from retrovirus, lentivirus, or foamy virus. As used herein, the term, "viral vector," refers to a nucleic acid vector construct that includes at least one element of viral origin and has the capacity to be packaged into a viral vector particle. The viral vector can contain the coding sequence for the various proteins described herein in place of nonessential viral genes. The vector and/or particle can be utilized for the purpose of transferring DNA, RNA or other nucleic acids into cells either in vitro or in vivo. Numerous forms of viral vectors are known in the art.

In certain embodiments, the viral vector containing the coding sequence for a TCR described herein is a retroviral vector or a lentiviral vector. The term "retroviral vector" refers to a vector containing structural and functional genetic elements that are primarily derived from a retrovirus. The term "lentiviral vector" refers to a vector containing structural and functional genetic elements outside the LTRs that are primarily derived from a lentivirus.

The retroviral vectors for use herein can be derived from any known retrovirus (e.g., type c retroviruses, such as Moloney murine sarcoma virus (MoMSV), Harvey murine sarcoma virus (HaMuSV), murine mammary tumor virus (MuMTV), gibbon ape leukemia virus (GaLV), feline leukemia virus (FLV), spumavirus, Friend, Murine Stem Cell Virus (MSCV) and Rous Sarcoma Virus (RSV)). Retroviruses" of the invention also include human T cell leukemia viruses, HTLV-1 and HTLV-2, and the lentiviral family of retroviruses, such as Human Immunodeficiency Viruses, HIV-1, HIV-2, simian immunodeficiency virus (SIV), feline immunodeficiency virus (FIV), equine immnodeficiency virus (EIV), and other classes of retroviruses.

A lentiviral vector for use herein refers to a vector derived from a lentivirus, a group (or genus) of retroviruses that give rise to slowly developing disease. Viruses included within this group include HIV (human immunodeficiency virus; including HIV type 1, and HIV type 2); visna-maedi; a caprine arthritis-encephalitis virus; equine infectious anemia virus; feline immunodeficiency virus (FIV); bovine immune deficiency virus (BIV); and simian immunodeficiency virus (SIV). Preparation of the recombinant lentivirus can be achieved using the methods according to Dull et al. and Zufferey et al. (Dull et al., *J. Virol.*, 1998; 72: 8463-8471 and Zufferey et al., *J. Virol.* 1998; 72:9873-9880).

Retroviral vectors (i.e., both lentiviral and non-lentiviral) for use in the present invention can be formed using standard cloning techniques by combining the desired DNA sequences in the order and orientation described herein (*Current Protocols in Molecular Biology*, Ausubel, F. M. et al. (eds.) Greene Publishing Associates, (1989), *Sections* 9.10-9.14 and other standard laboratory manuals; Eglitis, et al. (1985) *Science* 230:1395-1398; Danos and Mulligan (1988) *Proc. Natl. Acad. Sci. USA* 85:6460-6464; Wilson et al. (1988) *Proc. Natl. Acad. Sci. USA* 85:3014-3018; Armentano et al. (1990) *Proc. Natl. Acad. Sci. USA* 87:6141-6145; Huber et al. (1991) *Proc. Natl. Acad. Sci. USA* 88:8039-8043; Ferry et al. (1991) *Proc. Natl. Acad. Sci. USA* 88:8377-8381; Chowdhury et al. (1991) *Science* 254:1802-1805; van Beusechem et al. (1992) *Proc. Natl. Acad. Sci. USA* 89:7640-7644; Kay et al. (1992) *Human Gene Therapy* 3:641-647; Dai et al. (1992) *Proc. Natl. Acad. Sci. USA* 89:10892-10895; Hwu et al. (1993) *J. Immunol* 150:4104-4115; U.S. Pat. Nos. 4,868,116; 4,980,286; PCT Application WO 89/07136; PCT Application WO 89/02468; PCT Application WO 89/05345; and PCT Application WO 92/07573).

Suitable sources for obtaining retroviral (i.e., both lentiviral and non-lentiviral) sequences for use in forming the vectors include, for example, genomic RNA and cDNAs available from commercially available sources, including the Type Culture Collection (ATCC), Rockville, Md. The sequences also can be synthesized chemically.

For expression of a NY-ESO-1 TCR, the vector may be introduced into a host cell to allow expression of the polypeptide within the host cell. The expression vectors may contain a variety of elements for controlling expression, including without limitation, promoter sequences, transcription initiation sequences, enhancer sequences, selectable markers, and signal sequences. These elements may be selected as appropriate by a person of ordinary skill in the art, as described above. For example, the promoter sequences may be selected to promote the transcription of the polynucleotide in the vector. Suitable promoter sequences include, without limitation, T7 promoter, T3 promoter, SP6 promoter, beta-actin promoter, EF a promoter, CMV promoter, and SV40 promoter. Enhancer sequences may be selected to enhance the transcription of the polynucleotide. Selectable markers may be selected to allow selection of the host cells inserted with the vector from those not, for example, the selectable markers may be genes that confer antibiotic resistance. Signal sequences may be selected to allow the expressed polypeptide to be transported outside of the host cell.

For cloning of the polynucleotide, the vector may be introduced into a host cell (an isolated host cell) to allow replication of the vector itself and thereby amplify the copies of the polynucleotide contained therein. The cloning vectors may contain sequence components generally include, without limitation, an origin of replication, promoter sequences, transcription initiation sequences, enhancer sequences, and selectable markers. These elements may be selected as appropriate by a person of ordinary skill in the art. For example, the origin of replication may be selected to promote autonomous replication of the vector in the host cell.

In certain embodiments, the present disclosure provides isolated host cells containing the vectors provided herein. The host cells containing the vector may be useful in expression or cloning of the polynucleotide contained in the vector. Suitable host cells can include, without limitation, prokaryotic cells, fungal cells, yeast cells, or higher eukaryotic cells such as mammalian cells. Suitable prokaryotic cells for this purpose include, without limitation, eubacteria, such as Gram-negative or Gram-positive organisms, for example, Enterobacteriaceae such as *Escherichia*, e.g., *E. coli, Enterobacter, Erwinia, Klebsiella, Proteus, Salmonella*, e.g., *Salmonella typhimurium, Serratia*, e.g., *Serratia marcescans*, and *Shigella*, as well as Bacilli such as *B. subtilis* and *B. licheniformis, Pseudomonas* such as *P. aeruginosa*, and *Streptomyces*.

The TCRs of the present invention are introduced into a host cell using transfection and/or transduction techniques known in the art. As used herein, the terms, "transfection," and, "transduction," refer to the processes by which an exogenous nucleic acid sequence is introduced into a host cell. The nucleic acid may be integrated into the host cell DNA or may be maintained extrachromosomally. The nucleic acid may be maintained transiently or a may be a stable introduction. Transfection may be accomplished by a variety of means known in the art including but not limited to calcium phosphate-DNA co-precipitation, DEAE-dextran-mediated transfection, polybrene-mediated transfection, electroporation, microinjection, liposome fusion, lipofection, protoplast fusion, retroviral infection, and biolistics. Transduction refers to the delivery of a gene(s) using a viral or retroviral vector by means of viral infection rather than by transfection. In certain embodiments, retroviral vectors are transduced by packaging the vectors into virions prior to contact with a cell. For example, a nucleic acid encoding an NY-ESO-1 TCR of the invention carried by a retroviral vector can be transduced into a cell through infection and pro virus integration.

As used herein, the term "genetically engineered" or "genetically modified" refers to the addition of extra genetic material in the form of DNA or RNA into the total genetic material in a cell. The terms, "genetically modified cells," "modified cells," and, "redirected cells," are used interchangeably.

In particular, the TCRs of the present invention are introduced and expressed in immune effector cells so as to redirect their specificity to a target antigen of interest, e.g., a an HLA-A2 displayed NY-ESO-1 peptide, e.g., amino acid residues 157-165.

The present invention provides methods for making the immune effector cells which express the TCRs as described herein. In some embodiments, the method comprises transfecting or transducing immune effector cells, e.g., immune effector cells isolated from a subject, such as a subject having an NY-ESO-1-associated disease or disorder, such that the immune effector cells express one or more TCR as described herein. In certain embodiments, the immune effector cells are isolated from an individual and genetically modified without further manipulation in vitro. Such cells can then be directly re-administered into the individual. In further embodiments, the immune effector cells are first activated and stimulated to proliferate in vitro prior to being genetically modified to express a TCR. In this regard, the immune effector cells may be cultured before or after being genetically modified (i.e., transduced or transfected to express a TCR as described herein).

Prior to in vitro manipulation or genetic modification of the immune effector cells described herein, the source of cells may be obtained from a subject. In particular, the immune effector cells for use with the TCRs as described herein comprise T cells.

T cells can be obtained from a number of sources, including peripheral blood mononuclear cells, bone marrow, lymph nodes tissue, cord blood, thymus issue, tissue from a site of infection, ascites, pleural effusion, spleen tissue, and tumors. In certain embodiments, T cell can be obtained from a unit of blood collected from the subject using any number of techniques known to the skilled person, such as FICOLL separation. In some embodiments, cells from the circulating blood of an individual are obtained by apheresis. The apheresis product typically contains lymphocytes, including T cells, monocytes, granulocyte, B cells, other nucleated white blood cells, red blood cells, and platelets. In some embodiments, the cells collected by apheresis may be washed to remove the plasma fraction and to place the cells in an appropriate buffer or media for subsequent processing. In some embodiments of the invention, the cells are washed with PBS. In an alternative embodiment, the washed solution lacks calcium and may lack magnesium or may lack many if not all divalent cations. As would be appreciated by those of ordinary skill in the art, a washing step may be accomplished by methods known to those in the art, such as by using a semiautomated flow-through centrifuge. After washing, the cells may be resuspended in a variety of biocompatible buffers or other saline solution with or without buffer. In certain embodiments, the undesirable components of the apheresis sample may be removed in the cell directly resuspended culture media.

In certain embodiments, T cells are isolated from peripheral blood mononuclear cells (PBMCs) by lysing the red blood cells and depleting the monocytes, for example, by centrifugation through a PERCOLL™ gradient. A specific subpopulation of T cells, such as CD28+, CD4+, CD8+, CD45RA+, and CD45RO+ T cells, can be further isolated by positive or negative selection techniques. For example, enrichment of a T cell population by negative selection can be accomplished with a combination of antibodies directed to surface markers unique to the negatively selected cells. One method for use herein is cell sorting and/or selection via negative magnetic immunoadherence or flow cytometry that uses a cocktail of monoclonal antibodies directed to cell surface markers present on the cells negatively selected. For example, to enrich for CD4+ cells by negative selection, a monoclonal antibody cocktail typically includes antibodies to CD14, CD20, CD11b, CD16, HLA-DR, and CD8. Flow cytometry and cell sorting may also be used to isolate cell populations of interest for use in the present invention.

PBMC may be used directly for genetic modification with the TCRs using methods as described herein. In certain embodiments, after isolation of PBMC, T lymphocytes are further isolated and in certain embodiments, both cytotoxic and helper T lymphocytes can be sorted into naïve, memory, and effector T cell subpopulations either before or after genetic modification and/or expansion.

The immune effector cells, such as T cells, can be genetically modified following isolation using known methods, or the immune effector cells can be activated and expanded (or differentiated in the case of progenitors) in vitro prior to being genetically modified. In another embodiment, the immune effector cells, such as T cells, are genetically modified with the chimeric antigen receptors described herein (e.g., transduced with a viral vector comprising a nucleic acid encoding a TCR) and then are activated and expanded in vitro. Methods for activating and expanding T cells are known in the art and are described, for example, in U.S. Pat. Nos. 6,905,874; 6,867,041; 6,797,514; WO2012079000, US 2016/0175358.

The invention provides a population of modified immune effector cells for the treatment of an NY-ESO-1-associated disease or disorder, e.g., cancer, the modified immune effector cells comprising an NY-ESO-1 TCR as disclosed herein.

TCR-expressing immune effector cells prepared as described herein can be utilized in methods and compositions for adoptive immunotherapy in accordance with known techniques, or variations thereof that will be apparent to those skilled in the art based on the instant disclosure. See, e.g., US Patent Application Publication No. 2003/0170238 to Gruenberg et al; see also U.S. Pat. No. 4,690,915 to Rosenberg.

III. Pharmaceutical Compositions

The invention provides therapeutic compositions comprising the NY-ESO-1 TCRs of the invention or immune effector cells comprising the NY-ESO-1 TCRs of the invention. Therapeutic compositions in accordance with the invention will be administered with suitable carriers, excipients, and other agents that are incorporated into formulations to provide improved transfer, delivery, tolerance, and the like. A multitude of appropriate formulations can be found in the formulary known to all pharmaceutical chemists: *Remington's Pharmaceutical Sciences*, Mack Publishing Company, Easton, PA. These formulations include, for example, powders, pastes, ointments, jellies, waxes, oils, lipids, lipid (cationic or anionic) containing vesicles (such as LIPOFECTIN™), DNA conjugates, anhydrous absorption pastes, oil-in-water and water-in-oil emulsions, emulsions carbowax (polyethylene glycols of various molecular weights), semi-solid gels, and semi-solid mixtures containing carbowax. See also Powell et al. "Compendium of excipients for parenteral formulations" *PDA* (1998) *J Pharm Sci Technol* 52:238-311.

Depending on the severity of the condition, the frequency and the duration of the treatment can be adjusted.

In certain embodiments, the initial dose may be followed by administration of a second or a plurality of subsequent doses of NY-ESO-1 TCRs of the invention or immune effector cells comprising the NY-ESO-1 TCRs of the invention in an amount that can be approximately the same or less than that of the initial dose.

In certain situations, the pharmaceutical composition can be delivered in a controlled release system. In some embodiments, a pump may be used.

The injectable preparations may include dosage forms for intravenous, subcutaneous, intracutaneous, intracranial, intraperitoneal and intramuscular injections, drip infusions, etc. These injectable preparations may be prepared by methods publicly known. For example, the injectable preparations may be prepared, e.g., by dissolving, suspending or emulsifying the antigen-binding protein or its salt described above in a sterile aqueous medium or an oily medium conventionally used for injections. As the aqueous medium for injections, there are, for example, physiological saline, an isotonic solution containing glucose and other auxiliary agents, etc., which may be used in combination with an appropriate solubilizing agent such as an alcohol (e.g., ethanol), a polyalcohol (e.g., propylene glycol, polyethylene glycol), a nonionic surfactant [e.g., polysorbate 80, HCO-50 (polyoxyethylene (50 mol) adduct of hydrogenated castor oil)], etc. As the oily medium, there are employed, e.g., sesame oil, soybean oil, etc., which may be used in combination with a solubilizing agent such as benzyl benzoate, benzyl alcohol, etc. The injection thus prepared is preferably filled in an appropriate ampoule.

In some embodiments, TCR-expressing immune effector cells are formulated by first harvesting them from their culture medium, and then washing and concentrating the cells in a medium and container system suitable for administration (a "pharmaceutically acceptable" carrier) in a treatment-effective amount. Suitable infusion medium can be any isotonic medium formulation, typically normal saline, Normosol R (Abbott) or Plasma-Lyte A (Baxter), but also 5% dextrose in water or Ringer's lactate can be utilized. The infusion medium can be supplemented with human serum albumin.

A treatment-effective amount of cells in the composition is typically greater than $10^2$ cells, and up to $10^6$ up to and including $10^8$ or $10^9$ cells and can be more than $10^{10}$ cells. The number of cells will depend upon the ultimate use for which the composition is intended as will the type of cells included therein.

The cells may be autologous or heterologous to the patient undergoing therapy. If desired, the treatment may also include administration of mitogens (e.g., PHA) or lymphokines, cytokines, and/or chemokines (e.g., IFN-γ, IL-2, IL-12, TNF-α, IL-18, and TNF-β, GM-CSF, IL-4, IL-13, Flt3-L, RANTES, MIP1α, etc.) as described herein to enhance induction of the immune response.

The TCR expressing immune effector cell populations of the present invention may be administered either alone, or as a pharmaceutical composition in combination with diluents and/or with other components such as IL-2 or other cytokines or cell populations. Briefly, pharmaceutical compositions of the present invention may comprise a TCR-expressing immune effector cell population, such as T cells, as described herein, in combination with one or more pharmaceutically or physiologically acceptable carriers, diluents or excipients. Such compositions may comprise buffers such as neutral buffered saline, phosphate buffered saline and the like; carbohydrates such as glucose, mannose, sucrose or dextrans, mannitol; proteins; polypeptides or amino acids such as glycine; antioxidants; chelating agents such as EDTA or glutathione; adjuvants (e.g., aluminum hydroxide); and preservatives. Compositions of the present invention are preferably formulated for intravenous administration.

IV. Therapeutic Uses of NY-ESO-1 TCRs or Immune Effector Cells Comprising NY-ESO-1 TCRs The anti-tumor immune response induced in a subject by administering TCR expressing T cells described herein using the methods described herein, or other methods known in the art, may include cellular immune responses mediated by cytotoxic T cells capable of killing infected cells, regulatory T cells, and helper T cell responses. Humoral immune responses, mediated primarily by helper T cells capable of activating B cells thus leading to antibody production, may also be induced. A variety of techniques may be used for analyzing the type of immune responses induced by the compositions of the present invention, which are well described in the art; e.g., *Current Protocols in Immunology*, Edited by: John E. Coligan, Ada M. Kruisbeek, David H. Margulies, Ethan M. Shevach, Warren Strober (2001) John Wiley & Sons, NY, N.Y.

Thus, the NY-ESO-1 TCRs of the invention are useful, inter alia, for the treatment, prevention and/or amelioration of any disease or disorder associated with or mediated by NY-ESO-1. For example, the present invention provides methods for treating an NY-ESO-1-associated disease or disorder, such as an NY-ESO-1-associated cancer (e.g., an NY-ESO-1-positive cancer) (tumor growth inhibition) by administering an NY-ESO-1 TCR (or pharmaceutical composition comprising an NY-ESO-1 TCR or a plurality of cells comprising an NY-ESO-1 TCR) as described herein to a patient in need of such treatment, and NY-ESO-1 TCRs (or pharmaceutical composition comprising an NY-ESO-1 TCR) for use in the treatment of an NY-ESO-1-associated cancer. The antigen-binding proteins of the present invention are useful for the treatment, prevention, and/or amelioration of disease or disorder or condition such as an NY-ESO-1-associated cancer and/or for ameliorating at least one symptom associated with such disease, disorder or condition. In the context of the methods of treatment described herein, the NY-ESO-1 TCR (or pharmaceutical composition or plurality of cells) may be administered as a monotherapy (i.e., as the only therapeutic agent) or in combination with one or more additional therapeutic agents (examples of which are described elsewhere herein).

Accordingly, the present invention provides for methods of treating an individual diagnosed with or suspected of having, or at risk of developing, an NY-ESO-1-associated disease or disorder, e.g., an NY-ESO-1-associated cancer, comprising administering the individual a therapeutically effective amount of the TCR-expressing immune effector cells as described herein.

In some embodiments, the invention provides a method of treating a subject diagnosed with an NY-ESO-1-positive cancer comprising removing immune effector cells from a subject diagnosed with an NY-ESO-1-positive cancer, genetically modifying said immune effector cells with a vector comprising a nucleic acid encoding a TCR of the instant invention, thereby producing a population of modified immune effector cells, and administering the population of modified immune effector cells to the same subject. In some embodiments, the immune effector cells comprise T cells.

The methods for administering the cell compositions described herein includes any method which is effective to result in reintroduction of ex vivo genetically modified immune effector cells that either directly express a TCR of the invention in the subject or on reintroduction of the genetically modified progenitors of immune effector cells that on introduction into a subject differentiate into mature immune effector cells that express the TCR. One method comprises transducing peripheral blood T cells ex vivo with a nucleic acid construct in accordance with the invention and returning the transduced cells into the subject.

In some embodiments of the invention, the compositions described herein are useful for treating subjects suffering from primary or recurrent cancer, including, but not limited to, NY-ESO-1-associated cancer, e.g., NY-ESO-1-associated cancer is a liposarcoma, a neuroblastoma, a myeloma, a metastatic melanoma, a synovial sarcoma, a bladder cancer, an esophageal cancer, a hepatocellular cancer, a head and neck cancer, a non-small cell lung cancer, an ovarian cancer, a prostate cancer, a breast cancer, astrocytic tumor, glioblastoma multiforme, anaplastic astrocytoma, brain tumor, fallopian tube cancer, ovarian epithelial cancer, primary peritoneal cavity cancer, advanced solid tumors, soft tissue sarcoma, melanoma, a sarcoma, myelodysplastic syndrome, acute myeloid leukemia, Hodgkin lymphoma, non-Hodgkin lymphoma, Hodgkin disease, multiple myeloma, synovial sarcoma, metastatic solid tumors, esophageal cancer, rhabdomyosarcoma, advanced myxoid, round cell liposarcoma, metastatic melanoma, or recurrent non-small cell lung cancer. In some embodiments, the NY-ESO-1-associated cancer is a liposarcoma, a neuroblastoma, a myeloma, a metastatic melanoma, a synovial sarcoma, a bladder cancer, an esophageal cancer, a hepatocellular cancer, a head and neck cancer, a non-small cell lung cancer, an ovarian cancer, a prostate cancer, or a breast cancer.

The TCRs may be used to treat early stage or late-stage symptoms of the NY-ESO-1-associated cancer. In some embodiments, a TCR of the invention may be used to treat advanced or metastatic cancer. The TCRs are useful in reducing or inhibiting or shrinking tumor growth. In certain embodiments, treatment with aa TCR of the invention leads to more than 40% regression, more than 50% regression, more than 60% regression, more than 70% regression, more than 80% regression or more than 90% regression of a tumor in a subject. In certain embodiments, the TCRs may be used to prevent relapse of a tumor. In certain embodiments, the TCRs are useful in extending progression-free survival or overall survival in a subject with NY-ESO-1-associated cancer. In some embodiments, the TCRs are useful in reducing toxicity due to chemotherapy or radiotherapy while maintaining long-term survival in a patient suffering from NY-ESO-1-associated cancer.

One or more TCRs of the present invention may be administered to relieve or prevent or decrease the severity of one or more of the symptoms or conditions of the disease or disorder.

It is also contemplated herein to use one or more TCRs of the present invention prophylactically to patients at risk for developing a disease or disorder such as NY-ESO-1-associated disease or disorder, such as an NY-ESO-1-associated cancer.

In a further embodiment of the invention, the present TCRs are used for the preparation of a pharmaceutical composition for treating patients suffering from NY-ESO-1-associated disease or disorder, such as an NY-ESO-1-associated cancer. In another embodiment of the invention, the present TCRs are used as adjunct therapy with any other agent or any other therapy known to those skilled in the art useful for treating NY-ESO-1-associated cancer.

Combination therapies may include an NY-ESO-1 TCR of the invention, such as immune effector cell comprising a TCR of the invention, or a pharmaceutical composition of the invention, and any additional therapeutic agent that may be advantageously combined with a TCR of the invention. The TCRs of the present invention may be combined synergistically with one or more anti-cancer drugs or therapy used to treat or inhibit an NY-ESO-1-associated disease or disorder, such as NY-ESO-1-positive cancer, e.g., a liposarcoma, a neuroblastoma, a myeloma, a metastatic melanoma, a synovial sarcoma, a bladder cancer, an esophageal cancer, a hepatocellular cancer, a head and neck cancer, a non-small cell lung cancer, an ovarian cancer, a prostate cancer, a breast cancer, astrocytic tumor, glioblastoma multiforme, anaplastic astrocytoma, brain tumor, fallopian tube cancer, ovarian epithelial cancer, primary peritoneal cavity cancer, advanced solid tumors, soft tissue sarcoma, melanoma, a sarcoma, myelodysplastic syndrome, acute myeloid leukemia, Hodgkin lymphoma, non-Hodgkin lymphoma, Hodgkin disease, multiple myeloma, synovial sarcoma, metastatic solid tumors, esophageal cancer, rhabdomyosarcoma, advanced myxoid, round cell liposarcoma, metastatic melanoma, or recurrent non-small cell lung cancer.

It is contemplated herein to use the TCRs of the invention in combination with immunostimulatory and/or immunosupportive therapies to inhibit tumor growth, and/or enhance survival of cancer patients. The immunostimulatory therapies include direct immunostimulatory therapies to augment immune cell activity by either "releasing the brake" on suppressed immune cells or "stepping on the gas" to activate an immune response. Examples include targeting other checkpoint receptors, vaccination and adjuvants. The immunosupportive modalities may increase antigenicity of the tumor by promoting immunogenic cell death, inflammation or have other indirect effects that promote an anti-tumor immune response. Examples include radiation, chemotherapy, anti-angiogenic agents, and surgery.

In various embodiments, one or more TCRs of the present invention may be used in combination with a PD-1 inhibitor (e.g., an anti-PD-1 antibody such as nivolumab, pembrolizumab, pidilizumab, BGB-A317 or REGN2810), a PD-L1 inhibitor (e.g., an anti-PD-L1 antibody such as avelumab, atezolizumab, durvalumab, MDX-1105, or REGN3504), a CTLA-4 inhibitor (e.g., ipilimumab), a TIM3 inhibitor, a BTLA inhibitor, a TIGIT inhibitor, a CD47 inhibitor, a GITR inhibitor, an antagonist of another T cell co-inhibitor or ligand (e.g., an antibody to CD-28, 2β4, LY108, LAIR1, ICOS, CD160 or VISTA), an indoleamine-2,3-dioxygenase (IDO) inhibitor, a vascular endothelial growth factor (VEGF) antagonist [e.g., a "VEGF-Trap" such as aflibercept or other VEGF-inhibiting fusion protein as set forth in U.S. Pat. No. 7,087,411, or an anti-VEGF antibody or antigen-binding fragment thereof (e.g., bevacizumab, or ranibizumab) or a small molecule kinase inhibitor of VEGF receptor (e.g., sunitinib, sorafenib, or pazopanib)], an Ang2 inhibitor (e.g., nesvacumab), a transforming growth factor beta (TGFβ) inhibitor, an epidermal growth factor receptor (EGFR) inhibitor (e.g., erlotinib, cetuximab), a CD20 inhibitor (e.g., an anti-CD20 antibody such as rituximab), an antibody to a tumor-specific antigen [e.g., CA9, CA125, melanoma-associated antigen 3 (MAGE3), carcinoembryonic antigen (CEA), vimentin, tumor-M2-PK, prostate-specific antigen (PSA), mucin-1, MART-1, and CA19-9], a vaccine (e.g., *Bacillus* Calmette-Guerin, a cancer vaccine), an adjuvant to increase antigen presentation (e.g., granulocyte-macrophage colony-stimulating factor), a bispecific antibody (e.g., CD3×CD20 bispecific antibody, or PSMA×CD3 bispecific antibody), a cytotoxin, a chemotherapeutic agent (e.g., dacarbazine, temozolomide, cyclophosphamide, docetaxel, doxorubicin, daunorubicin, cisplatin, carboplatin, gemcitabine, methotrexate, mitoxantrone, oxaliplatin, paclitaxel, and vincristine), cyclophosphamide, radiotherapy, surgery, an IL-6R inhibitor (e.g., sarilumab), an IL-4R inhibitor (e.g., dupilumab), an IL-10 inhibitor, a cytokine such as IL-2, IL-7, IL-21, and IL-15, an antibody-drug conjugate (ADC) (e.g., anti-CD19-DM4 ADC, and anti-DS6-DM4 ADC), an anti-inflammatory drug (e.g., corticosteroids, and non-steroidal anti-inflammatory drugs), a dietary supplement such as anti-oxidants or any other therapy care to treat cancer. In certain embodiments, the TCRs of the present invention may be used in combination with cancer vaccines including dendritic cell vaccines, oncolytic viruses, tumor cell vaccines, etc. to augment the anti-tumor response.

Examples of cancer vaccines that can be used in combination with TCRs of the present invention include MAGE3 vaccine for melanoma and bladder cancer, MUC1 vaccine for breast cancer, EGFRv3 (e.g., Rindopepimut) for brain cancer (including glioblastoma multiforme), or ALVAC-CEA (for CEA+ cancers).

In certain embodiments, the NY-ESO-1 TCRs of the invention may be administered in combination with radiation therapy in methods to generate long-term durable anti-tumor responses and/or enhance survival of patients with cancer. In some embodiments, the NY-ESO-1 TCRs of the invention may be administered prior to, concomitantly or after administering radiation therapy to a cancer patient. For example, radiation therapy may be administered in one or more doses to tumor lesions followed by administration of one or more doses of NY-ESO-1 TCRs of the invention. In some embodiments, radiation therapy may be administered locally to a tumor lesion to enhance the local immunogenicity of a patient's tumor (adjuvinating radiation) and/or to kill tumor cells (ablative radiation) followed by systemic administration of an NY-ESO-1 TCRs of the invention.

The additional therapeutically active agent(s)/component(s) may be administered prior to, concurrent with, or after the administration of the NY-ESO-1 TCRs of the present invention. For purposes of the present disclosure, such administration regimens are considered the administration of an NY-ESO-1 TCR "in combination with" a second therapeutically active component.

The additional therapeutically active component(s) may be administered to a subject prior to administration of an NY-ESO-1 TCR of the present invention. In other embodiments, the additional therapeutically active component(s) may be administered to a subject after administration of an NY-ESO-1 TCR of the present invention. In yet other embodiments, the additional therapeutically active component(s) may be administered to a subject concurrent with administration of an NY-ESO-1 TCR of the present invention. "Concurrent" administration, for purposes of the present invention, includes, e.g., administration of an NY-ESO-1 TCR and an additional therapeutically active component to a subject in a single dosage form (e.g., co-formulated), or in separate dosage forms administered to the subject within about 30 minutes or less of each other. If administered in separate dosage forms, each dosage form may be administered via the same route; alternatively, each dosage form may be administered via a different route. In any event, administering the components in a single dosage from, in separate dosage forms by the same route, or in separate dosage forms by different routes are all considered "concurrent administration," for purposes of the present disclosure. For purposes of the present disclosure, administration of an NY-ESO-1 TCR "prior to", "concurrent with," or "after" (as those terms are defined herein above) administration of an additional therapeutically active component is considered administration of an NY-ESO-1 TCR "in combination with" an additional therapeutically active component).

The present invention is further illustrated by the following Examples, which are not intended to be limiting in any way. The entire contents of all references, patents and published patent applications cited throughout this application, as well as the Figures, are hereby incorporated herein by reference.

EXAMPLES

Example 1. Isolation of NY-ESO-1 Specific T Cell Receptors

Mice humanized for cellular immune system components, VelociT™ mice (see, e.g., PCT Publication No. WO 2016/164492, the entire contents of which are incorporated herein by reference), were immunized with NY-ESO-1 (157-165) peptide (SLLMWITQC, SEQ ID NO: 111) presented specifically by human HLA-A2, diluted in PBS and mixed with adjuvant, e.g. in equal volume with Complete Freund's Adjuvant (CFA; Chondrex, Inc.). Spleen suspensions from immunized mice were obtained and dissociated. Red blood cells were lysed in ACK lysis buffer (Life Technologies), and splenocytes were suspended in RPMI complete media.

Isolated splenocytes were sorted and single T cells that bind NY-ESO-1 (157-165) peptide in the context of MHC were isolated by fluorescent-activated cell sorting (FACS). Isolated T cells were single well plated and mixed with TCR alpha and beta variable region-specific PCR primers. cDNAs for each single T cell were synthesized via a reverse transcriptase (RT) reaction. Each resulting RT product was then split and transferred into two corresponding wells for subsequent TCR beta and alpha PCRs. One set of the resulting RT products was first amplified by PCR using a 5' degenerate primer specific for TCR beta variable region leader sequence or a 5' degenerate primer specific for TCR alpha chain variable region leader sequence and a 3' primer specific for TCR constant region, to form an amplicon. The amplicons were then amplified again by PCR using a 5' degenerate primer specific for TCR beta variable region framework 1 or a 5' degenerate primer specific for TCR alpha chain variable region framework 1 and a 3' primer specific for TCR constant region, to generate amplicons for cloning. The TCR beta and alpha derived PCR products were cloned into expression vectors containing beta constant region and alpha constant region, respectively. The expression vectors expressing full-length beta and alpha chain pairs were cloned into CHO cells and tested for binding specificity to commercial NY-ESO-1/HLA tetramer reagents (HLA-A02:01 NY-ESO-1 tetramer; MBL International Corporation).

Table 1 provides a detailed list of the alpha and beta chain CDR1, CDR2, and CDR3 amino acid sequences of the TCRs that were isolated, Table 2 provides the corresponding polynucleic acid sequences, and Table 3 provides the amino acid and nucleotide sequences of the alpha and beta chain variable regions of the isolated TCRs.

Although the VelociT™ TCRs were cloned from CD8-positive VelociT™ mouse T cells, the TCRs were expressed in CHO cells in the absence of any CD8, and still demonstrated binding the NY-ESO peptide tetramer. Without being bound by any theory, the VelociT™ derived TCRs may bind to T cells in the absence of CD8, for example double-negative (CD4-CD8-) T cells.

TABLE 1

Amino Acid CDR Sequences

| TCR No. | TCR ID | Vβ CDR1 | SEQ ID NO | Vβ CDR2 | SEQ ID NO | Vβ CDR3 | SEQ ID NO: | Vα CDR1 | SEQ ID NO | Vα CDR2 | SEQ ID NO | Vα CDR3 | SEQ ID NO: |
|---|---|---|---|---|---|---|---|---|---|---|---|---|---|
| 1 | 001 | MNHNY | 1 | SVGAGI | 2 | CASSYSGGSPLHF | 3 | TISGTDY | 4 | GLTSN | 5 | CILRPDSWGKFQF | 6 |
| 2 | 018 | LGHNA | 11 | YNFKEQ | 12 | CASSQAHYTEAFF | 13 | TSESDYY | 14 | QEAYKQQN | 15 | CAYRSANSGYALNF | 16 |
| 3 | 050 | MNHNY | 21 | SVGAGI | 22 | CASSWTDNQPQHF | 23 | TISGTDY | 24 | GLTSN | 25 | CILREGNNDMRF | 26 |
| 4 | 063 | LGHNA | 31 | YNFKEQ | 32 | CASSHGTGYNYGYTF | 33 | DRGSQS | 34 | IYSNGD | 35 | CAVNILASGGSYIPTF | 36 |
| 5 | 071 | MNHEY | 41 | SVGAGI | 42 | CASSYVGNTGELFF | 43 | TISGTDY | 44 | GLTSN | 45 | CILRPDSWGKFQF | 46 |
| 6 | 090 | MNHEY | 51 | SMNVEV | 52 | CASSLRGPYGYTF | 53 | DSASNY | 54 | IRSNVGE | 55 | CAATGYGQNFVF | 56 |
| 7 | 108 | LGHNA | 61 | YNFKEQ | 62 | CASSQGPGYTF | 63 | DSASNY | 64 | IRSNVGE | 65 | CAASMKDSSYKLIF | 66 |
| 8 | 167 | DFQATT | 71 | SNEGSKA | 72 | CSAMTVMNTEAFF | 73 | TISGTDY | 74 | GLTSN | 75 | CILRPDSWGKFQF | 76 |
| 9 | 184 | SGHKS | 81 | YYEKEE | 82 | CASSLGSYDYTF | 83 | NSMFDY | 84 | ISSIKDK | 85 | CAARKNYGGSQGNLIF | 86 |
| 10 | 188 | DFQATT | 91 | SNEGSKA | 92 | CSAKEGTEAFF | 93 | TISGTDY | 94 | GLTSN | 95 | CILNTGTASKLTF | 96 |
| 11 | 317 | LGHNA | 101 | YNFKEQ | 102 | CASSQGPGYTF | 103 | DRGSQS | 104 | IYSNGD | 105 | CAVNSSPYKLSF | 106 |

TABLE 2

Polynucleic Acid CDR Sequences

| TCR No. | TCR ID | Vβ CDR1 | SEQ ID NO | Vβ CDR2 | SEQ ID NO | Vβ CDR3 | SEQ ID NO: | Vα CDR1 | SEQ ID NO | Vα CDR2 | SEQ ID NO | Vα CDR3 | SEQ ID NO: |
|---|---|---|---|---|---|---|---|---|---|---|---|---|---|
| 1 | 001 | ATGAACCATAACTAC | 121 | TCAGTTGGTGCTGGTATC | 122 | TGTGCCAGCAGTTACTCGGGGGGTTCACCCCTCCACTTT | 123 | ACAATCAGTGGAACTGATTAC | 124 | GGTCTTACAAGCAAT | 125 | TGCATCCTGCGGCCTGACAGCTGGGGAAATTCCAGTTT | 126 |
| 2 | 018 | CTGGGGCATAACGCT | 127 | TACAACTTTAAAGAACAG | 128 | TGTGCCAGCAGCCAAGCACACTACACTGAAGCTTTCTTT | 129 | ACCAGTGAGAGTGATTATTAT | 130 | CAAGAAGCTTATAAGCAACAGAAT | 131 | TGTGCTTATAGGAGCGCAAATTCCGGGTATGCACTCAACTTC | 132 |
| 3 | 050 | ATGAACCATAACTAC | 133 | TCAGTTGGTGCTGGTATC | 122 | TGTGCCAGCAGCTGGACAGCAATCAGCCCAGCATTT | 134 | ACAATCAGTGGAACTGATTAC | 124 | GGTCTTACAAGCAAT | 125 | TGCATCCTGAGAGAGGGGAACAATGACATGCGCTTT | 135 |

TABLE 2-continued

Polynucleic Acid CDR Sequences

| TCR No. | TCR ID | Vβ CDR1 | SEQ ID NO | Vβ CDR2 | SEQ ID NO | Vβ CDR3 | SEQ ID NO: | Vα CDR1 | SEQ ID NO | Vα CDR2 | SEQ ID NO | Vα CDR3 | SEQ ID NO: |
|---|---|---|---|---|---|---|---|---|---|---|---|---|---|
| 4 | 063 | CTGGGGCATAACGCT | 127 | TACAACTTT | 128 | TGTGCCAGCAGCCATGGGACAGGTTATAACTATGGCTACACCTT | 136 | GACCGAGGTTCCCAGTCC | 137 | ATATACTCCAATGGTGAC | 138 | TGTGCCGTGAACATCCTCGCATCAGGAGGAAGCTACATACCTACATTT | 139 |
| 5 | 071 | ATGAACCATGAATAC | 140 | TCAGTTGGTGCTGGTATC | 122 | TGTGCCAGCAGTTACGTGGGGAACACCGGGGAGCTGTTTTTT | 141 | ACAATCAGTGGAACTGATTAC | 124 | GGTCTTACAAGCAAT | 125 | TGCATCCTGCGGCCTGACAGCTGGGGGAAATTCCAGTTT | 126 |
| 6 | 090 | ATGAACCATGAGTAT | 142 | TCAATGAATGTTGAGGTG | 143 | TGTGCCAGCAGTTTACGGGGGCCTTATGGCTACACCTTC | 144 | GACAGTGCCTCAAACTAC | 145 | ATTCGTTCAAATGTGGGCGAA | 146 | TGTGCAGCAACGGGCTATGGTCAGAATTTTGTCTTT | 147 |
| 7 | 108 | CTGGGGCATAACGCT | 127 | TACAACTTTAAGAACAG | 128 | TGTGCCAGCAGCCAAGGCCCAGGCTACACCTTC | 148 | GACAGTGCCTCAAACTAC | 145 | ATTCGTTCAAATGTGGGCGAA | 146 | TGTGCAGCAAGTATGAAGGATAGCAGCTATAAATTGATCTTC | 149 |
| 8 | 167 | GACTTTCAGGCCACAACT | 150 | TCCAATGAGGGCTCCAAGGCC | 151 | TGCAGTGCTATGACAGTCATGAACACTGAAGCTTTCTTT | 152 | ACAATCAGTGGAACTGATTAC | 124 | GGTCTTACAAGCAAT | 125 | TGCATCCTGCGGCCTGACAGCTGGGGGAAATTCCAGTTT | 126 |
| 9 | 184 | TCTGGGCACAAGAGT | 153 | TATTATGAGAAAGAAGAG | 154 | TGTGCCAGCAGCTTGGGCAGCTATGACTACACCTTC | 155 | AACAGCATGTTTGATTAT | 156 | ATAAGTTCCATTAAGGATAAA | 157 | TGTGCAGCAAGGAAGAATTATGGAGGAAGCCAAGGAAATCTCATCTTT | 158 |
| 10 | 188 | GACTTTCAGGCCACAACT | 150 | TCCAATGAGGGCTCCAAGGCC | 151 | TGCAGTGCTAAGGAGGGGACTGAAGCTTTCTTT | 159 | ACAATCAGTGGAACTGATTAC | 124 | GGTCTTACAAGCAAT | 125 | TGCATCCTGAATACCGGCACTGCCAGTAAACTCACCTTT | 160 |
| 11 | 317 | CTGGGGCATAACGCT | 127 | TACAACTTTAAGAACAG | 128 | TGTGCCAGCAGCCAAGGCCCAGGCTACACCTTC | 148 | GACCGAGGTTCCCAGTCC | 137 | ATATACTCCAATGGTGAC | 138 | TGTGCCGTGAACTCCTCGCCCTACAAGCTCAGCTTT | 161 |

TABLE 3

Amino acid and nucleic sequences for VelociT ™ TCRs specific for NY-ESO-1 (157-165)/HLA-A2

| Domain name | Domain Sequences<br>AA Sequence (SEQ ID NO)<br>NA Sequence (SEQ ID NO) |
|---|---|
| TCR001 Vα | DAKTTQPNSMESNEEEPVHLPCNHSTISGTDYIHWYRQLPSQGPEYVIHGLTS<br>NVNNRMASLAIAEDRKSSTLILHRATLRDAAVYYCILRPDSWGKFQFGAGTQVV<br>VTP (SEQ ID NO: 9)<br>GATGCTAAGACCACACAGCCAAATTCAATGGAGAGTAACGAAGAAGAGCCT<br>GTTCACTTGCCTTGTAACCACTCCACAATCAGTGGAACTGATTACATACATT<br>GGTATCGACAGCTTCCCTCCCAGGGTCCAGAGTACGTGATTCATGGTCTTA<br>CAAGCAATGTGAACAACAGAATGGCCTCTCTGGCAATCGCTGAAGACAGAA<br>AGTCCAGTACCTTGATCCTGCACCGTGCTACCTTGAGAGATGCTGCTGTGT<br>ACTACTGCATCCTGCGGCCTGACAGCTGGGGGAAATTCCAGTTTGGAGCAG<br>GGACCCAGGTTGTGGTCACCCCAG (SEQ ID NO: 10) |
| TCR001 Vβ | NAGVTQTPKFRILKIGQSMTLQCAQDMNHNYMYWYRQDPGMGLKLIYYSVGA<br>GITDKGEVPNGYNVSRSTTEYFPLRLELAAPSQTSVYFCASSYSGGSPLHFGN<br>GTRLTVT (SEQ ID NO: 7) |

TABLE 3-continued

Amino acid and nucleic sequences for VelociT™ TCRs specific for NY-ESO-1 (157-165)/HLA-A2

| Domain name | Domain Sequences<br>AA Sequence (SEQ ID NO)<br>NA Sequence (SEQ ID NO) |
|---|---|
| | AATGCTGGTGTCACTCAGACCCCAAAATTCCGCATCCTGAAGATAGGACAG<br>AGCATGACACTGCAGTGTGCCCAGGATATGAACCATAACTACATGTACTGG<br>TATCGACAAGACCCAGGCATGGGGCTGAAGCTGATTTATTATTCAGTTGGT<br>GCTGGTATCACTGATAAAGGAGAAGTCCCGAATGGCTACAACGTCTCCAGA<br>TCAACCACAGAGTATTTCCCGCTCAGGCTGGAGTTGGCTGCTCCCTCCCAG<br>ACATCTGTGTACTTCTGTGCCAGCAGTTACTCGGGGGGTTCACCCCTCCAC<br>TTTGGGAACGGGACCCAGGCTCACTGTGACAG (SEQ ID NO: 8) |
| TCR018 Vα | AQTVTQSQPEMSVQEAETVTLSCTYDTSESDYYLFWYKQPPSRQMILVIRQEA<br>YKQQNATENRFSVNFQKAAKSFSLKISDSQLGDAAMYFCAYRSANSGYALNFG<br>KGTSLLVTP (SEQ ID NO: 19)<br>GCTCAGACAGTCACTCAGTCTCAACCAGAGATGTCTGTGCAGGAGGCAGAG<br>ACCGTGACCCTGAGCTGCACATATGACACCAGTGAGAGTGATTATTATTTAT<br>TCTGGTACAAGCAGCCTCCCAGCAGGCAGATGATTCTCGTTATTCGCCAAG<br>AAGCTTATAAGCAACAGAATGCAACAGAGAATCGTTTCTCTGTGAACTTCCA<br>GAAAGCAGCCAAATCCTTCAGTCTCAAGATCTCAGACTCACAGCTGGGGGA<br>TGCCGCGATGTATTTCTGTGCTTATAGGAGCGCAAATTCCGGGTATGCACT<br>CAACTTCGGCAAAGGCACCTCGCTGTTGGTCACACCC (SEQ ID NO: 20) |
| TCR018 Vβ | ETGVTQTPRHLVMGMTNKKSLKCEQHLGHNAMYWYKQSAKKPLELMFVYNFK<br>EQTENNSVPSRFSPECPNSSHLFLHLHTLQPEDSALYLCASSQAHYTEAFFGQ<br>GTRLTVV (SEQ ID NO: 17)<br>GAAACGGGAGTTACGCAGACACCAAGACACCTGGTCATGGGAATGACAAAT<br>AAGAAGTCTTTGAAATGTGAACAACATCTGGGGCATAACGCTATGTATTGGT<br>ACAAGCAAAGTGCTAAGAAGCCACTGGAGCTCATGTTTGTCTACAACTTTAA<br>AGAACAGACTGAAAACAACAGTGTGCCAAGTCGCTTCTCACCTGAATGCCC<br>CAACAGCTCTCACTTATTCCTTCACCTACACACCCTGCAGCCAGAAGACTCG<br>GCCCTGTATCTCTGTGCCAGCAGCCAAGCACACTACACTGAAGCTTTCTTT<br>GGACAAGGCACCAGACTCACAGTTGTA (SEQ ID NO: 18) |
| TCR050 Vα | DAKTTQPNSMESNEEEPVHLPCNHSTISGTDYIHWYRQLPSQGPEYVIHGLTS<br>NVNNRMASLAIAEDRKSSTLILHRATLRDAAVYYCILREGNNDMRFGAGTRLTV<br>KP (SEQ ID NO: 29)<br>GATGCTAAGACCACACAGCCAAATTCAATGGAGAGTAACGAAGAAGAGCCT<br>GTTCACTTGCCTTGTAACCACTCCACAATCAGTGGAACTGATTACATACATT<br>GGTATCGACAGCTTCCCTCCCAGGGTCCAGAGTACGTGATTCATGGTCTTA<br>CAAGCAATGTGAACAACAGAATGGCCTCTCTGGCAATCGCTGAAGACAGAA<br>AGTCCAGTACCTTGATCCTGCACCGTGCTACCTTGAGAGATGCTGCTGTGT<br>ACTACTGCATCCTGAGAGAGGGGAACAATGACATGCGCTTTGGAGCAGGG<br>ACCAGACTGACAGTAAAACCA (SEQ ID NO: 30) |
| TCR050 Vα | NAGVTQTPKFRILKIGQSMTLQCAQDMNHNYMYWYRQDPGMGLKLIYYSVGA<br>GITDKGEVPNGYNVSRSTTEYFPLRLELAAPSQTSVYFCASSWTDNQPQHFGD<br>GTRLSIL (SEQ ID NO: 27)<br>AATGCTGGTGTCACTCAGACCCCAAAATTCCGCATCCTGAAGATAGGACAG<br>AGCATGACACTGCAGTGTGCCCAGGATATGAACCATAACTACATGTACTGG<br>TATCGACAAGACCCAGGCATGGGGCTGAAGCTGATTTATTATTCAGTTGGT<br>GCTGGTATCACTGATAAAGGAGAAGTCCCGAATGGCTACAACGTCTCCAGA<br>TCAACCACAGAGTATTTCCCGCTCAGGCTGGAGTTGGCTGCTCCCTCCCAG<br>ACATCTGTGTACTTCTGTGCCAGCAGCTGGACAGACAATCAGCCCCAGCAT<br>TTTGGTGATGGGACTCGACTCTCCATCCTA (SEQ ID NO: 28) |
| TCR063 Vα | QKEVEQNSGPLSVPEGAIASLNCTYSDRGSQSFFWYRQYSGKSPELIMSIYSN<br>GDKEDGRFTAQLNKASQYVSLLIRDSQPSDSATYLCAVNILASGGSYIPTFGRG<br>TSLIVHP (SEQ ID NO: 39)<br>CAGAAGGAGGTGGAGCAGAATTCTGGACCCCTCAGTGTTCCAGAGGGAGC<br>CATTGCCTCTCTCAACTGCACTTACAGTGACCGAGGTTCCCAGTCCTTCTTC<br>TGGTACAGACAATATTCTGGGAAAAGCCCTGAGTTGATAATGTCCATATACT<br>CCAATGGTGACAAGGAAGATGGAAGGTTTACAGCACAGCTCAATAAAGCCA<br>GCCAGTATGTTTCTCTGCTCATCAGAGACTCCCAGCCCAGTGATTCAGCCA<br>CCTACCTCTGTGCCGTGAACATCCTCGCATCAGGAGGAAGCTACATACCTA<br>CATTTGGAAGAGGAACCAGCCTTATTGTTCATCCG (SEQ ID NO: 40) |
| TCR063 Vβ | ETGVTQTPRHLVMGMTNKKSLKCEQHLGHNAMYWYKQSAKKPLELMFVYNFK<br>EQTENNSVPSRFSPECPNSSHLFLHLHTLQPEDSALYLCASSHGTGYNYGYTF<br>GSGTRLTVV (SEQ ID NO: 37)<br>GAAACGGGAGTTACGCAGACACCAAGACACCTGGTCATGGGAATGACAAAT<br>AAGAAGTCTTTGAAATGTGAACAACATCTGGGGCATAACGCTATGTATTGGT<br>ACAAGCAAAGTGCTAAGAAGCCACTGGAGCTCATGTTTGTCTACAACTTTAA<br>AGAACAGACTGAAAACAACAGTGTGCCAAGTCGCTTCTCACCTGAATGCCC<br>CAACAGCTCTCACTTATTCCTTCACCTACACACCCTGCAGCCAGAAGACTCG<br>GCCCTGTATCTCTGTGCCAGCAGCCATGGGACAGGTTATAACTATGGCTAC<br>ACCTTCGGTTCGGGGACCAGGTTAACCGTTGTAG (SEQ ID NO: 38) |

TABLE 3-continued

Amino acid and nucleic sequences for VelociT ™ TCRs specific for NY-ESO-1 (157-165)/HLA-A2

| Domain name | Domain Sequences<br>AA Sequence (SEQ ID NO)<br>NA Sequence (SEQ ID NO) |
|---|---|
| TCR071 Vα | DAKTTQPNSMESNEEEPVHLPCNHSTISGTDYIHWYRQLPSQGPEYVIHGLTS<br>NVNNRMASLAIAEDRKSSTLILHRATLRDAAVYYCILRPDSWGKFQFGAGTQVV<br>VTP (SEQ ID NO: 49)<br>GATGCTAAGACCACACAGCCAAATTCAATGGAGAGTAACGAAGAAGAGCCT<br>GTTCACTTGCCTTGTAACCACTCCACAATCAGTGGAACTGATTACATACATT<br>GGTATCGACAGCTTCCCTCCCAGGGTCCAGAGTACGTGATTCATGGTCTTA<br>CAAGCAATGTGAACAACAGAATGGCCTCTCTGGCAATCGCTGAAGACAGAA<br>AGTCCAGTACCTTGATCCTGCACCGTGCTACCTTGAGAGATGCTGCTGTGT<br>ACTACTGCATCCTGCGGCCTGACAGCTGGGGGAAATTCCAGTTTGGAGCAG<br>GGACCCAGGTTGTGGTCACCCCAG (SEQ ID NO: 50) |
| TCR071 Vβ | NAGVTQTPKFQVLKTGQSMTLQCAQDMNHEYMSWYRQDPGMGLRLIHYSVG<br>AGITDQGEVPNGYNVSRSTTEDFPLRLLSAAPSQTSVYFCASSYVGNTGELFF<br>GEGSRLTVL (SEQ ID NO: 47)<br>AATGCTGGTGTCACTCAGACCCCAAAATTCCAGGTCCTGAAGACAGGACAG<br>AGCATGACACTGCAGTGTGCCCAGGATATGAACCATGAATACATGTCCTGG<br>TATCGACAAGACCCAGGCATGGGGCTGAGGCTGATTCATTACTCAGTTGGT<br>GCTGGTATCACTGACCAAGGAGAAGTCCCCAATGGCTACAATGTCTCCAGA<br>TCAACCACAGAGGATTTCCCGCTCAGGCTGCTGTCGGCTGCTCCCTCCCAG<br>ACATCTGTGTACTTCTGTGCCAGCAGTTACGTGGGGAACACCGGGGAGCTG<br>TTTTTTGGAGAAGGCTCTAGGCTGACCGTACTG (SEQ ID NO: 48) |
| TCR090 Vα | GENVEQHPSTLSVQEGDSSVIKCTYSDSASNYFPWYKQELGKRPQLIIDIRSNV<br>GEKKDQRIAVTLNKTAKHFSLHITETQPEDSAVYFCAATGYGQNFVFGPGTRLS<br>VLP (SEQ ID NO: 59)<br>GGAGAGAATGTGGAGCAGCATCCTTCAACCCTGAGTGTCCAGGAGGGAGA<br>CAGCTCTGTTATCAAGTGTACTTATTCAGACAGTGCCTCAAACTACTTCCCT<br>TGGTATAAGCAAGAACTTGGAAAAAGACCTCAGCTTATTATAGACATTCGTT<br>CAAATGTGGGCGAAAAGAAAGACCAACGAATTGCTGTTACATTGAACAAGA<br>CAGCCAAACATTTCTCCCTGCACATCACAGAGACCCAACCTGAAGACTCGG<br>CTGTCTACTTCTGTGCAGCAACGGGCTATGGTCAGAATTTTGTCTTTGGTCC<br>CGGAACCAGATTGTCCGTGCTGCCA (SEQ ID NO: 60) |
| TCR090 Vβ | EAQVTQNPRYLITVTGKKLTVTCSQNMNHEYMSWYRQDPGLGLRQIYYSMNV<br>EVTDKGDVPEGYKVSRKEKRNFPLILESPSPNQTSLYFCASSLRGPYGYTFGS<br>GTRLTVV (SEQ ID NO: 57)<br>GAAGCCCAAGTGACCCAGAACCCAAGATACCTCATCACAGTGACTGGAAAG<br>AAGTTAACAGTGACTTGTTCTCAGAATATGAACCATGAGTATATGTCCTGGT<br>ATCGACAAGACCCAGGGCTGGGCTTAAGGCAGATCTACTATTCAATGAATG<br>TTGAGGTGACTGATAAGGGAGATGTTCCTGAAGGGTACAAAGTCTCTCGAA<br>AAGAGAAGAGGAATTTCCCCCTGATCCTGGAGTCGCCCAGCCCCAACCAGA<br>CCTCTCTGTACTTCTGTGCCAGCAGTTTACGGGGGCCTTATGGCTACACCT<br>TCGGTTCGGGGACCAGGTTAACCGTTGTA (SEQ ID NO: 58) |
| TCR108 Vα | GENVEQHPSTLSVQEGDSAVIKCTYSDSASNYFPWYKQELGKRPQLIIDIRSNV<br>GEKKDQRIAVTLNKTAKHFSLHITETQPEDSAVYFCAASMKDSSYKLIFGSGTRL<br>LVRP (SEQ ID NO: 69)<br>GGAGAGAATGTGGAGCAGCATCCTTCAACCCTGAGTGTCCAGGAGGGAGA<br>CAGCGCTGTTATCAAGTGTACTTATTCAGACAGTGCCTCAAACTACTTCCCT<br>TGGTATAAGCAAGAACTTGGAAAAAGACCTCAGCTTATTATAGACATTCGTT<br>CAAATGTGGGCGAAAAGAAAGACCAACGAATTGCTGTTACATTGAACAAGA<br>CAGCCAAACATTTCTCCCTGCACATCACAGAGACCCAACCTGAAGACTCGG<br>CTGTCTACTTCTGTGCAGCAAGTATGAAGGATAGCAGCTATAAATTGATCTT<br>CGGGAGTGGGACCAGACTGCTGGTCAGGCCT (SEQ ID NO: 70) |
| TCR108 Vβ | ETGVTQTPRHLVMGMTNKKSLKCEQHLGHNAMYWYKQSAKKPLELMFVYNFK<br>EQTENNSVPSRFSPECPNSSHLFLHLHTLQPEDSALYLCASSQGPGYTFGSGT<br>RLTVV (SEQ ID NO: 67)<br>GAAACGGGAGTTACGCAGACACCAAGACACCTGGTCATGGGAATGACAAAT<br>AAGAAGTCTTTGAAATGTGAACAACATCTGGGGCATAACGCTATGTATTGGT<br>ACAAGCAAAGTGCTAAGAAGCCACTGGAGCTCATGTTTGTCTACAACTTTAA<br>AGAACAGACTGAAAACAACAGTGTGCCAAGTCGCTTCTCACCTGAATGCCC<br>CAACAGCTCTCACTTATTCCTTCACCTACACACCCTGCAGCCAGAAGACTCG<br>GCCCTGTATCTCTGTGCCAGCAGCCAAGGCCCAGGCTACACCTTCGGTTCG<br>GGGACCAGGTTAACCGTTGTA (SEQ ID NO: 68) |
| TCR167 Vα | DAKTTQPNSMESNEEEPVHLPCNHSTISGTDYIHWYRQLPSQGPEYVIHGLTS<br>NVNNRMASLAIAEDRKSSTLILHRATLRDAAVYYCILRPDSWGKFQFGAGTQVV<br>VTP (SEQ ID NO: 79)<br>GATGCTAAGACCACACAGCCAAATTCAATGGAGAGTAACGAAGAAGAGCCT<br>GTTCACTTGCCTTGTAACCACTCCACAATCAGTGGAACTGATTACATACATT<br>GGTATCGACAGCTTCCCTCCCAGGGTCCAGAGTACGTGATTCATGGTCTTA |

TABLE 3-continued

Amino acid and nucleic sequences for VelociT™ TCRs specific for NY-ESO-1 (157-165)/HLA-A2

| Domain name | Domain Sequences<br>AA Sequence (SEQ ID NO)<br>NA Sequence (SEQ ID NO) |
|---|---|
| | CAAGCAATGTGAACAACAGAATGGCCTCTCTGGCAATCGCTGAAGACAGAA<br>AGTCCAGTACCTTGATCCTGCACCGTGCTACCTTGAGAGATGCTGCTGTGT<br>ACTACTGCATCCTGCGGCCTGACAGCTGGGGGAAATTCCAGTTTGGAGCAG<br>GGACCCAGGTTGTGGTCACCCCAG (SEQ ID NO: 80) |
| TCR167 Vβ | GAVVSQHPSWVICKSGTCVKIECRSLDFQATTMFWYRQFPKQSLMLMATSNE<br>GSKATYEQGVEKDKFLINHASLTLSTLTVAGAHPEDSSFYICSAMTVMNTEAFF<br>GQGTRLTVV (SEQ ID NO: 77)<br>GGTGCTGTCGTCTCTCAACATCCGAGCTGGGTTATCTGTAAGAGTGGAACC<br>TGTGTGAAGATCGAGTGCCGTTCCCTGGACTTTCAGGCCACAACTATGTTTT<br>GGTATCGTCAGTTCCCGAAACAGAGTCTCATGCTGATGGCAACTTCCAATG<br>AGGGCTCCAAGGCCACATACGAGCAAGGCGTCGAGAAGGACAAGTTTCTC<br>ATCAACCATGCAAGCCTGACCTTGTCCACTCTGACAGTGGCCGGTGCCCAT<br>CCTGAAGACAGCAGCTTCTACATCTGCAGTGCTATGACAGTCATGAACACT<br>GAAGCTTTCTTTGGACAAGGCACCAGACTCACAGTTGTA (SEQ ID NO: 78) |
| TCR184 Vα | DQQVKQNSPSLSVQEGRISILNCDYTNSMFDYLWYKKYPAEGPTFLISISSIKD<br>KNEDGRFTVFLNKSAKHLSLHIVPSQPGDSAVYFCAARKNYGGSQGNLIFGKG<br>TKLSVKP (SEQ ID NO: 89)<br>GACCAGCAAGTTAAGCAAAATTCACCATCCCTGAGCGTCCAGGAAGGAAGA<br>ATTTCTATTCTGAACTGTGACTATACTAACAGCATGTTTGATTATTTCCTATG<br>GTACAAAAAATACCCTGCTGAAGGTCCTACATTCCTGATATCTATAAGTTCC<br>ATTAAGGATAAAAATGAAGATGGAAGATTCACTGTTTTCTTAAACAAAAGTGC<br>CAAGCACCTCTCTCTGCACATTGTGCCCTCCCAGCCTGGAGACTCTGCAGT<br>GTACTTCTGTGCAGCAAGGAAGAATTATGGAGGAAGCCAAGGAAATCTCAT<br>CTTTGGAAAAGGCACTAAACTCTCTGTTAAACCA (SEQ ID NO: 90) |
| TCR184 Vβ | DAGVTQSPTHLIKTRGQQVTLRCSPISGHKSVSWYQQVLGQGPQFIFQYYEKE<br>ERGRGNFPDRFSARQFPNYSSELNVNALLLGDSALYLCASSLGSYDYTFGSGT<br>RLTVV (SEQ ID NO: 87)<br>GACGCTGGAGTCACCCAAAGTCCCACACACCTGATCAAAACGAGAGGACA<br>GCAAGTGACTCTGAGATGCTCTCCTATCTCTGGGCACAAGAGTGTGTCCTG<br>GTACCAACAGGTCCTGGGTCAGGGGCCCCAGTTTATCTTTCAGTATTATGA<br>GAAAGAAGAGAGAGGAAGAGGAAACTTCCCTGATCGATTCTCAGCTCGCCA<br>GTTCCCTAACTATAGCTCTGAGCTGAATGTGAACGCCTTGTTGCTGGGGGA<br>CTCGGCCCTGTATCTCTGTGCCAGCAGCTTGGGCAGCTATGACTACACCTT<br>CGGTTCGGGGACCAGGTTAACCGTTGTA (SEQ ID NO: 88) |
| TCR188 Vα | DAKTTQPNSMESNEEEPVHLPCNHSTISGTDYIHWYRQLPSQGPEYVIHGLTS<br>NVNNRMASLAIAEDRKSSTLILHRATLRDAAVYYCILNTGTASKLTFGTGTRLQV<br>TL (SEQ ID NO: 99)<br>GATGCTAAGACCACACAGCCAAATTCAATGGAGAGTAACGAAGAAGAGCCT<br>GTTCACTTGCCTTGTAACCACTCCACAATCAGTGGAACTGATTACATACATT<br>GGTATCGACAGCTTCCCTCCCAGGGTCCAGAGTACGTGATTCATGGTCTTA<br>CAAGCAATGTGAACAACAGAATGGCCTCTCTGGCAATCGCTGAAGACAGAA<br>AGTCCAGTACCTTGATCCTGCACCGTGCTACCTTGAGAGATGCTGCTGTGT<br>ACTACTGCATCCTGAATACCGGCACTGCCAGTAAACTCACCTTTGGGACTG<br>GAACAAGACTTCAGGTCACGCTC (SEQ ID NO: 100) |
| TCR188 Vβ | GAVVSQHPSWVICKSGTSVKIECRSLDFQATTMFWYRQFPKQSLMLMATSNE<br>GSKATYEQGVEKDKFLINHASLTLSTLTVTSAHPEDSSFYICSAKEGTEAFFGQ<br>GTRLTVV (SEQ ID NO: 97)<br>GGTGCTGTCGTCTCTCAACATCCGAGCTGGGTTATCTGTAAGAGTGGAACC<br>TCTGTGAAGATCGAGTGCCGTTCCCTGGACTTTCAGGCCACAACTATGTTTT<br>GGTATCGTCAGTTCCCGAAACAGAGTCTCATGCTGATGGCAACTTCCAATG<br>AGGGCTCCAAGGCCACATACGAGCAAGGCGTCGAGAAGGACAAGTTTCTC<br>ATCAACCATGCAAGCCTGACCTTGTCCACTCTGACAGTGACCAGTGCCCAT<br>CCTGAAGACAGCAGCTTCTACATCTGCAGTGCTAAGGAGGGGACTGAAGCT<br>TTCTTTGGACAAGGCACCAGACTCACAGTTGTA (SEQ ID NO: 98) |
| TCR317 Vα | QKEVEQNSGPLSVPEGAIASLNCTYSDRGSQSFFWYRQYSGKSPELIMSIYSN<br>GDKEDGRFTAQLNKASQYVSLLIRDSQPSDSATYLCAVNSSPYKLSFGAGTTV<br>TVRA (SEQ ID NO: 109)<br>CAGAAGGAGGTGGAGCAGAATTCTGGACCCCTCAGTGTTCCAGAGGGAGC<br>CATTGCCTCTCTCAACTGCACTTACAGTGACCGAGGTTCCCAGTCCTTCTTC<br>TGGTACAGACAATATTCTGGGAAAAGCCCTGAGTTGATAATGTCCATATACT<br>CCAATGGTGACAAAGAAGATGGAAGGTTTACAGCACAGCTCAATAAAGCCA<br>GCCAGTATGTTTCTCTGCTCATCAGAGACTCCCAGCCCAGTGATTCAGCGA<br>CCTACCTCTGTGCCGTGAACTCCTCGCCCTACAAGCTCAGCTTTGGAGCCG<br>GAACCACAGTAACTGTAAGAGCA (SEQ ID NO: 110) |
| TCR317 Vβ | ETGVTQTPRHLVMGMTNKKSLKCEQHLGHNAMYWYKQSAKKPLELMFVYNFK<br>EQTENNSVPSRFSPECPNSSHLFLHLHTLQPEDSALYLCASSQGPGYTFGSGT |

TABLE 3-continued

Amino acid and nucleic sequences for VelociT ™ TCRs specific for NY-ESO-1 (157-165)/HLA-A2

| Domain name | Domain Sequences<br>AA Sequence (SEQ ID NO)<br>NA Sequence (SEQ ID NO) |
|---|---|
| | RLTVV (SEQ ID NO: 107)<br>GAAACGGGAGTTACGCAGACACCAAGACACCTGGTCATGGGAATGACAAAT<br>AAGAAGTCTTTGAAATGTGAACAACATCTGGGGCATAACGCTATGTATTGGT<br>ACAAGCAAAGTGCTAAGAAGCCACTGGAGCTCATGTTTGTCTACAACTTTAA<br>AGAACAGACTGAAAACAACAGTGTGCCAAGTCGCTTCTCACCTGAATGCCC<br>CAACAGCTCTCACTTATTCCTTCACCTACACACCCTGCAGCCAGAAGACTCG<br>GCCCTGTATCTCTGTGCCAGCAGCCAAGGCCCAGGCTACACCTTCGGTTCG<br>GGGACCAGGTTAACCGTTGTA (SEQ ID NO: 108) |

Example 2. Reporter T Cell/APC Luciferase Assay to Measure and Assess T Cell Receptor Specific Activity T cell activation is achieved by stimulating T cell receptors (TCRs) that recognize specific peptides presented by major histocompatibility complex class I or II proteins on antigen-presenting cells (APC). Activated TCRs in turn initiate a cascade of signaling events that can be monitored by reporter genes driven by transcription factors such as activator-protein 1 (AP-1), Nuclear Factor of Activated T cells (NFAT) or Nuclear factor kappa-light-chain-enhancer of activated B cells (NFκb).

A bioassay was developed to measure TCR mediated T cell signaling induced by interaction between WT human HLA-A2/NY-ESO-1 (157-165) specific TCRs and HLA-A2+ APCs presenting the NY-ESO-1 peptide. Jurkat clone J.RT3.T3.5 (ATCC #TIB-153) which lacks its own endogenous TCR was transduced by lentiviruses encoding the human CD8A/B genes, Cignal Lenti AP-1 Luciferase Reporter (Qiagen—SAbiosciences, #CLS-011 L) and NY-ESO-1 specific TCRs derived either from immunization of VelociT™ mice (WO 2016/164492) or from published comparator NY-ESO-1 TCRs (1G4 and clone 113: Li, Y. et al. *Nat Biotechnol* 2005; 23:349-354).

In the luciferase-based bioassay, RPM11640 supplemented with 10% FBS and penicillin/streptomycin/glutamine was used as assay medium to prepare cell suspensions and dilutions. Serial dilutions of HLA-A2+293T cells were done in round-bottom 96-well plates, starting at $3.0 \times 10^5$ cells with 2-fold dilutions down. The APCs were then transferred to a 96-well flat-bottom white plate (Nunc #136102) in 40 μL and pulsed with 100 uM of NY-ESO-1 peptide for 2 hours. Reporter T cells were prepared in a suspension of $1.25 \times 10^6$ cells/mL and L was added per well ($5 \times 10^4$ cells/well). Plates containing the co-culture were incubated for 5 hours at 37° C./5% $CO_2$ Luciferase activity was then detected after the addition of ONE-Glo™ (Promega, #E6110) reagent and relative light units (RLUs) were measured on a SpectraMax M5 microplate reader.

Whereas the irrelevant VelociT™ derived TCR #229 had no activity against NY-ESO-1 peptide, all four HLA-A2/NY-ESO-1 restricted TCRs reacted with the target cells in a concentration dependent manner as measured by AP-1 luciferase activity (FIG. 1). The specific activity of these TCRs were defined as the ratio of RLU to peptide pulsed APCs divided by the RLU to non-pulsed APCs. The specific activity of these four VelociT™ derived TCRs were considerably higher than the patient derived 1 G4 comparator TCR as well as its in vitro matured derivative, 113. (Table 4).

TABLE 4

| TCR ID | Signal to Noise (S/N) ratio |
|---|---|
| TCR#229 | 1 |
| Comparator Clone 113 | 2.3 |
| TCR#188 | 5.1 |
| Comparator 1G4 | 6.3 |
| TCR#063 | 11.2 |
| TCR#050 | 15.5 |
| TCR#001 | 25.4 |

Example 3. Prediction of Potential Off-Target Peptides

Given a target 9-mer peptide-HLA-A2 complex, an associated potential off-target peptide was defined based on two criteria: A) the peptide is a 9-mer and is predicted to bind HLA-A2, and B) the peptide is similar to the target peptide based on sequence homology. Therefore, to predict potential off-target peptides associated with SLLMWITQC (NY-ESO-1; SEQ ID NO: 111) the following methodology was used.

As a first step, canonical human protein sequences were downloaded from the UniprotKB database (version September 2014) (Magrae, Michele, and UniProt Consortium. *Database* 2011 (2011): bar009) and all 9-mers were extracted. This resulted in 11,118,076 peptides from 20,014 protein sequences.

Next, the binding affinities of the peptides with HLA-A2 were computed using NetMHCstab webserver (version 1.0) (Jorgensen, Kasper W., et al. (2014) *Immunology* 141(1): 18-26). Peptides with affinity value <500 nM were predicted to bind HLA-A2, and the rest were discarded resulting in the remaining 338,452 peptides.

The peptide sequences were then evaluated for sequence homology with the target peptide. For each peptide, its Degree of Similarity (DoS) was calculated to the target peptide. The DoS value represents the number of identical amino acids at identical positions between the two peptides. Peptides with DoS value >=5 were considered potential off-targets. This resulted in 1 off-target peptide with DoS=6 and 25 off-target peptides with DoS=5.

The peptide with DoS=6, three randomly selected peptides out of the peptides with DoS=5, and a peptide based on evidence from literature were selected for experimental validation and are listed in Table 5 below.

TABLE 5

Predicted off-target peptides similar to HLA-A2/NY-ESO-1: (157-165) (SLLMWITQC; SEQ ID NO: 111)

| Peptide Sequence | Peptide Name | Gene | Predicted IC50 (nM) |
|---|---|---|---|
| SLLDIITNC (SEQ ID NO: 114) | EARS2: 306-313 | EARS2 | 114.3 |
| SLLMSILAL (SEQ ID NO: 115) | MAGEH1: 90-98 | MAGEH1 | 33.7 |
| LLTMHITQL (SEQ ID NO: 116) | FBXL22: 4-12 | FBXL22 | 133.8 |
| SLLTWILHI (SEQ ID NO: 117) | URB1: 1853-1861 | URB1 | 10.0 |

To assay for the target specificity of the TCRs for HLA-A2/NY-ESO-1, the potential off-target peptides that are similar to NY-ESO-1 (157-165) were pulsed onto HLA-A2+ 293T cells and off-target reactivity was also measured in the T cell reporter assay described in Example 2 above. An irrelevant peptide, LV9-5, mucin peptide, was also included in this assay as a negative control.

As depicted in FIGS. 2A-2E, the patient-derived comparator 1 G4 and the two VelociT™ derived TCRs had no off-target activity. By contrast, the in vitro matured TCR Comparator Clone 113 non-specifically reacted with HLA-A2+293T cells indicating that while this affinity-matured TCR has high binding affinity against HLA-A2/NY-ESO-1 complex (26 µM, as reported by Zhao et al, *J Immunol.* 2007 Nov. 1; 179(9): 5845-5854), it was also nonspecifically activated by other peptides bound to HLA-A2. Nonspecific activation of human T cells by a recombinant TCR could lead to toxicity if administered as a therapy in humans.

Example 4. Cytotoxic Activity

Figure 3:
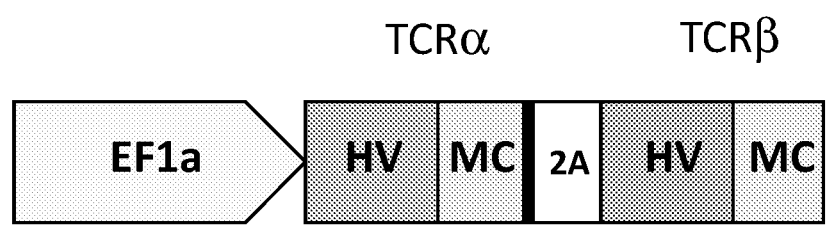
FIG. 3 depicts a TCR construct design used for expressing the TCR001 construct in primary T cells. HV denotes the human variable domain and MC denotes the mouse constant domain for each respective TCR chain. The EF1a promoter is shown as an arrow, and a furin cleavage site is denoted by a solid black box.

T cell receptors were generated against the NY-ESO-1157-165 peptide (SLLMWITC (SEQ ID NO: 164)) loaded into HLA-A2 using the VelociT platform, as described above. In order to assay for cytoytoxic activity, TCR001 was reformatted into a composite TCR structure wherein the human constant domain of the TCR α or TCR 3 chain was substituted with the murine counterpart to increase TCR stability for the assay. The human variable domains remained intact. For the TCR 3 chain, the mouse TRBC1 gene was used. Before VSV-pseudotyped lentivirus was produced, the TCR was cloned into a bicistronic construct using a pLVX lentiviral vector having an EF1a promoter and the TCR chains linked by a 2A peptide linker in a single ORF (FIG. 3). Peptide bond skipping during the translation of the mRNA at the 3' end of the 2A sequence produced two proteins: a TCR α chain-2A fusion and a TCR 3 chain. To proteolytically remove the 2A protein sequence, the 2A element was preceded by a sequence encoding a furin cleavage site, which is represented as a black box in FIG. 3.

To avoid potential mispairing between exogenous and endogenous TCR chains, the endogenous TRAC and TRBC1/2 were gene edited to prevent their expression using CRISPR/Cas9. TrueGuide Modified Synthetic guide RNAs (sgRNAs) that bound near the 5' end of the first exon of the TRAC gene and both TRBC1/2 genes were designed and are depicted below in Table 6. None of the sgRNA sequences were predicted to bind to the sequence of TCR001.

TABLE 6 sgRNA sequences

| Target allele | sgRNA sequence | SEQ ID NO. |
|---|---|---|
| TRAC | TCTCTCAGCTGGTACACGGC | 162 |
| TRBC1/2 | CAAACACAGCGACCTCGGGT | 163 |

Figure 4:
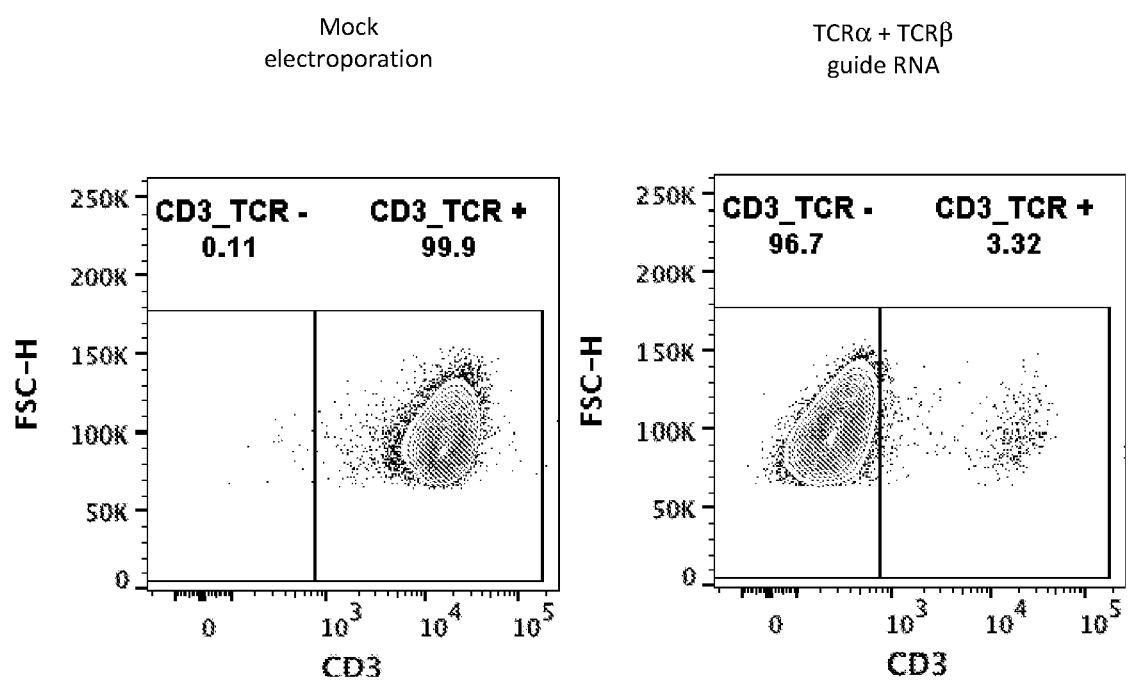
FIG. 4 depicts a loss of endogenous TCR expression following electroporation with sgRNA targeting the TRAC locus and TRBC1/2 loci. T cells were stained with anti-human CD3 to assess cell surface TCR expression.
Figure 5A:
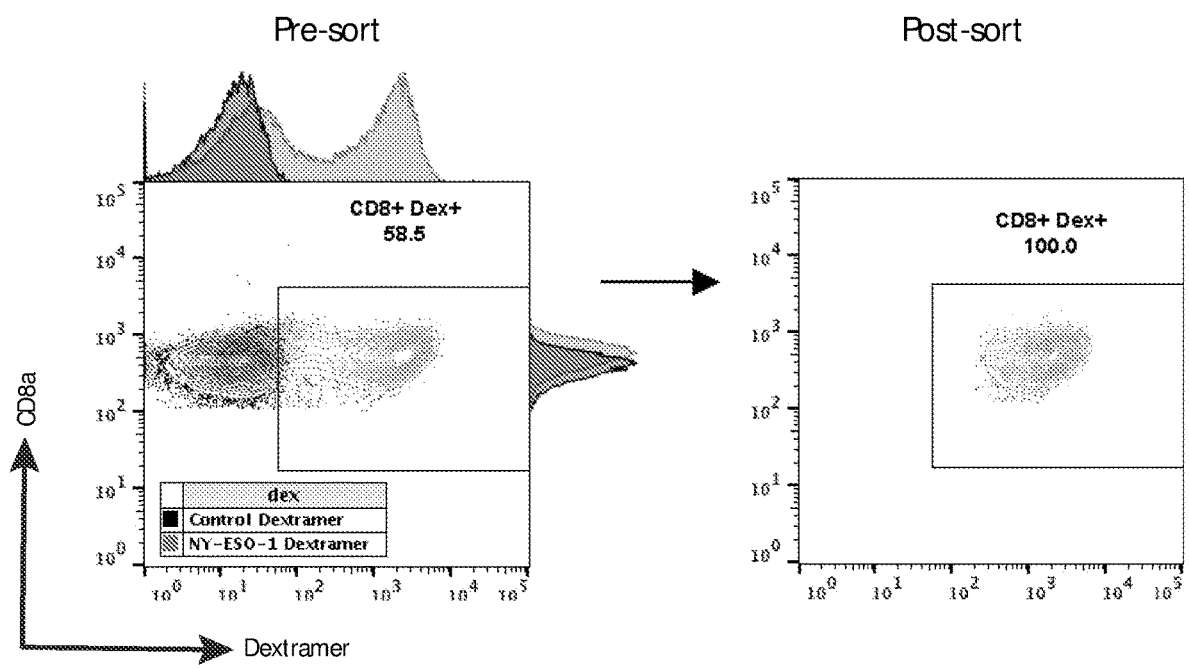
FIG. 5A and FIG. 5B depict dextramer staining data for the detection of antigen specific T cells recognizing NY-ESO-1157-165 peptide presented by HLA-A2.
Figure 5B:
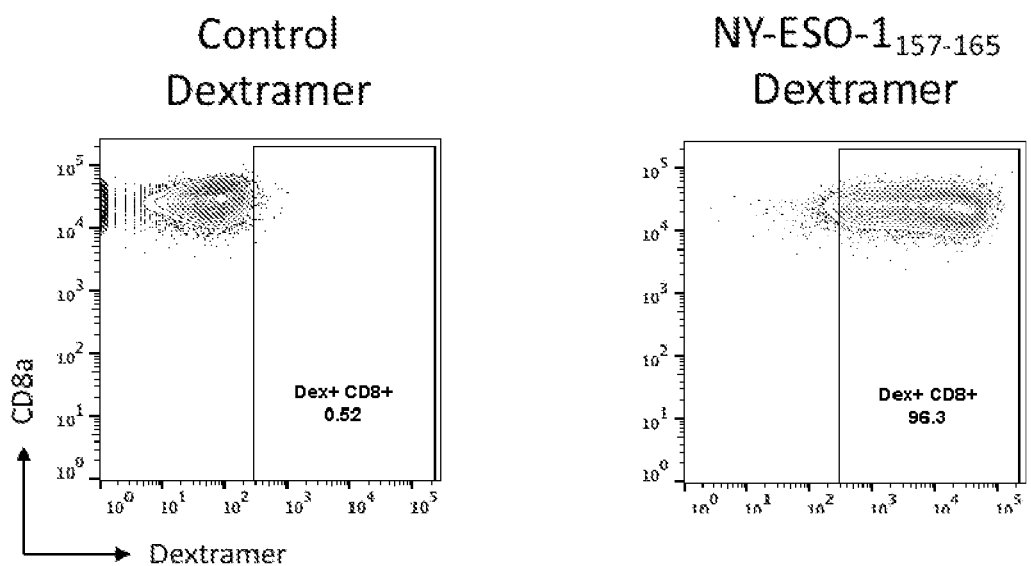

Primary human T cells were isolated from normal healthy donor PBMC and stimulated with CD3/CD28 microbeads plus 100 IU/mL recombinant human IL-2 for 48 hours in CTS OptMizer™ media. After the initial activation period, $3 \times 10^6$ T cells were resuspended at $1 \times 10^6$ cells/mL in P2 electroporation buffer (Lonza) supplemented with sgRNA and TrueCut Cas9v2 protein (ThermoFisher) at a molar ratio of 3:1. Electroporation was performed using the Lonza Shuttle Nucleofector and program EH100P3. Post-electroporation, an aliquot of T cells was cultured with IL-2 (100 U/mL) for 72 hours in cRPMI culture media when the loss of endogenous TCR expression was characterized by evaluating a decrease in cell surface CD3 expression (FIG. 4). A second aliquot of T cells was immediately resuspended in cRPMI media and spinfected with lentivirus (MOI=5) encoding TCR001 that is specific for NY-ESO-1 (157-165) when carried by HLA-A2. The transduced T cells were expanded with CD3/CD28 microbeads and recombinant human IL-2 (100 IU/mL) for 9 days. Exogenous TCR001 expression was then assessed by Dextramer staining and CD8+ T cells expressing the composite TCR were highly enriched by sorting to >99% purity (FIG. 5A). The sorted cells then were co-cultured with irradiated HLA-mismatched PBMC, isolated from two normal healthy donors and mixed at a 1:1 ratio, and an HLA-mismatched B-LCL cell line. The HLA-mismatched and irradiated PBMC and B-LCL stimulatory cells were combined at a 5:1 ratio, respectively. Cultures were supplemented with anti-CD3 (Clone OKT3) and human IL-2 (50 IU/mL) and expanded in cRPMI media supplemented with 10% human Ab serum for a minimum of 12 days post-sorting. Human IL-2 was replenished every 36-48 hours. Post-expansion, CD8+ T cells expressing the exogenous composite TCR001 remained highly enriched (FIG. 5B). Control dextramer was used to define background staining and carried a non-specific control peptide.

After 10 days of post-sort expansion, an aliquot of expanding T cells was harvested, washed, and resuspended in cRPMI media. Two target cell lines were used to measure antigen-dependent cytolysis by TCR001: an IM9 target cell line that expresses endogenous NY-ESO-1 protein, and an IM9 cell line engineered to overexpress single chain HLA-A2 presenting an NY-ESO-1 (157-165) peptide (designated IM9+*). The IM9++ target cell line, which maximized antigen density, was included as a precaution against the possibility that endogenous levels of HLA-A2 loaded with NY-ESO-1 (157-165) on IM9 cells would be insufficient to trigger TCR-mediated cytolytic activity. Two negative controls were established to investigate antigen specific TCR mediated killing: a K562 cell line that does not express NY-ESO-1 protein, and untransduced T cells that were expanded with anti-CD3/CD28 beads in the presence of 100 IU/mL human IL-2 and used as effector T cells. Each target and control cell line was harvested and loaded with calcein-AM dye. After calcein labeling, target cells were washed twice to remove residual calcein. Subsequently, T cells and target cells were co-cultured on a 96 well round bottom plate at various ratios and cultured at 37° C. for 2.5 hours when culture supernatant was harvested. To determine if calcein was spontaneously released from the target cell lines, each cell line was cultured in the absence of effector T cells. To determine the maximum possible release of calcein, target cell lines were cultured and lysed using cRPMI media that was supplemented to contain 1% Triton™ X-114 detergent. Within the supernatant, the relative calcein levels were measured using a Viktor X4 plate reader and percent cytotoxicity was calculated as ((Calcein Signal−Spontaneous Calcein Release)/(Calcein Maximum Release−Spontaneous Calcein Release))*100.

Figure 6:
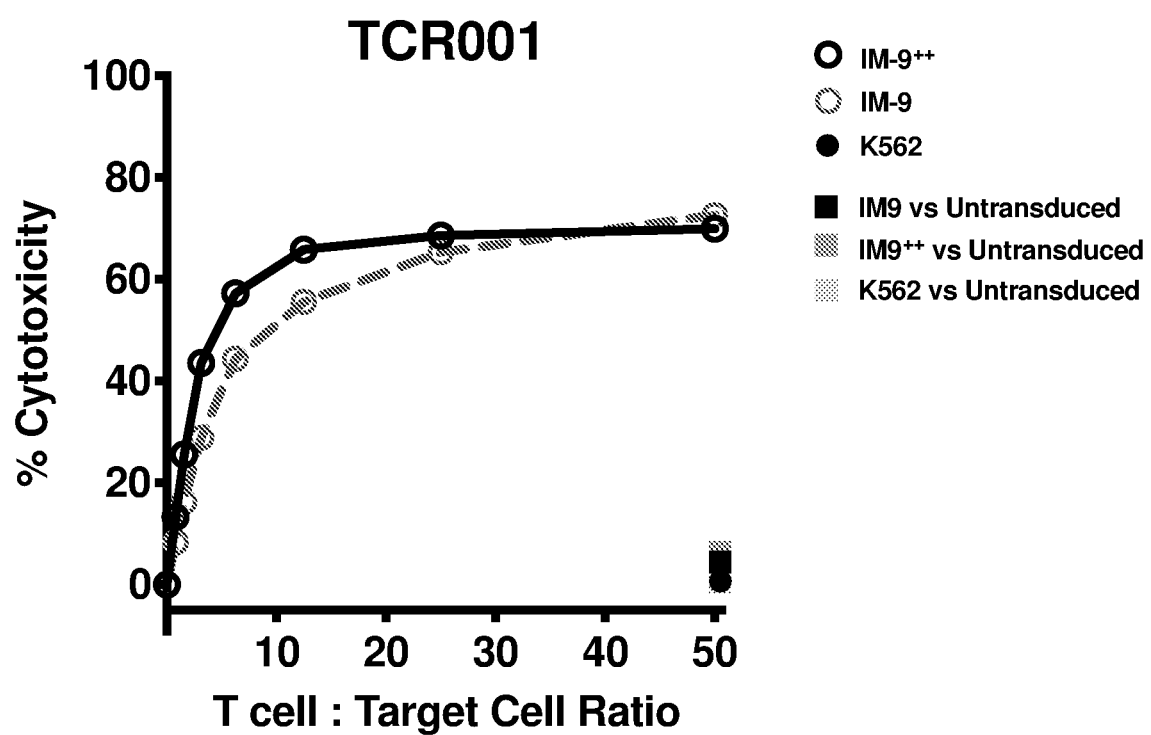
FIG. 6 depicts cytotoxicity data showing that T cells expressing TCR001 lyse target cells that express endogenous levels of NY-ESO-1 (IM9) or overexpress a single chain HLA-A2 carrying NY-ESO-1 (157-165) peptide (IM9+*). K562 cells lacking NY-ESO-1 expression were used to ensure that TCR mediated killing was antigen dependent. Untransduced and expanded T cells failed to kill any target cell, indicating that expression of TCR001 was necessary for target cell lysis.

As shown in FIG. 6 and Tables 7 and 8, enriched and expanded T cells expressing TCR001 induced robust cytolysis of both IM9 cells (grey open circles) and IM9++ cells (open black circles), but not K562 cells (filled black circles) which lack NY-ESO-1 expression. Similarly, untransduced and expanded T cells that lack composite TCR001 expression from the same normal healthy donor failed to kill the IM9 (black square), IM9++(dark grey square), and K562 (light grey square) target cells, revealing that cytolysis of IM9 and IM9++ target cells was dependent on TCR001. While overexpression of HLA-A2/NY-ESO-1 (157-165) in IM9 cells (as observed with IM9++ cells) did not enhance the maximal level of cytotoxicity relative to IM9 cells, an increase in cytolysis was observed as T cell numbers became limiting at lower T cell to target cell ratios. Collectively, these data demonstrate TCR functionality and specificity for an HLA-A2-presented NY-ESO-1.

TABLE 7

Measured cytolysis of NY-ESO-1 + tumor cell lines by TCR001 + T cells.

| T cell: Target Cell | IM-9 | | IM-9++ | | K562 | |
|---|---|---|---|---|---|---|
| Ratio | Mean | SD | Mean | SD | Mean | SD |
| 50 | 72.6 | 2.1 | 70.0 | 2.0 | 0.7 | 0.5 |
| 25 | 65.4 | 1.6 | 68.7 | 1.2 | ND | ND |
| 12.5 | 55.6 | 0.1 | 65.9 | 0.7 | ND | ND |
| 6.25 | 44.4 | 0.3 | 57.3 | 0.5 | ND | ND |
| 3.125 | 28.9 | 1.8 | 43.6 | 0.4 | ND | ND |
| 1.56 | 16.2 | 0.4 | 25.6 | 0.7 | ND | ND |
| 0.78 | 8.3 | 0.3 | 13.3 | 0.1 | ND | ND |
| 0 | 0.2 | 1.3 | 0.0 | 0.4 | ND | ND |

SD: Standard Deviation;
ND: Not Determined (T cell: target cell ratio of 50 would have maximal background kill compared to the other ratios)

TABLE 8

Measured cytolysis of NY-ESO-1 + tumor cell lines by untransduced and expanded polyclonal T cells.

| T cell: Target Cell | IM-9 vs. untransduced T cells | | IM-9++ vs. untransduced T cells | | K562 vs. untransduced T cells | |
|---|---|---|---|---|---|---|
| Ratio | Mean | SD | Mean | SD | Mean | SD |
| 50 | 4.4 | 1.0 | 6.4 | 0.2 | 0.5 | 0.3 |

SD: Standard Deviation

EQUIVALENTS

Those skilled in the art will recognize or be able to ascertain using no more than routine experimentation, many equivalents to the specific embodiments of the invention described herein, such equivalents are intended to be encompassed by the following claims. The contents of all references, patents and published patent applications cited throughout this application are incorporated herein by reference.

We claim:

1. A T cell receptor (TCR) that binds specifically to an HLA-A2 presented cancer testis antigen New York Esophageal Squamous Cell Carcinoma-1 (NY-ESO-1) peptide,
    wherein the TCR comprises a TCR alpha chain and a TCR beta chain, and
    wherein the TCR alpha chain comprises an alpha chain variable domain comprising a complementarity determining region (CDR)1, a CDR2, and a CDR3 comprising the amino acid sequences of SEQ ID NOs: 4, 5, and 6, respectively, and the TCR beta chain comprises a beta chain variable domain comprising a CDR1, a CDR2, and a CDR3 comprising the amino acid sequences of SEQ ID NOs: 1, 2, and 3, respectively.

2. The TCR of claim 1, wherein the alpha chain variable domain comprises the amino acid sequence of SEQ ID NO: 9 and the beta chain variable domain comprises the amino acid sequence of SEQ ID NO: 7.

3. The TCR of claim 1, further comprising a detectable moiety.

4. A pharmaceutical composition comprising the TCR of claim 1 and a pharmaceutically acceptable carrier or diluent.

5. A cell presenting the TCR of claim 1.

6. A polynucleotide molecule comprising a polynucleotide sequence that encodes the alpha chain variable domain of the TCR as set forth in claim 1 and the beta chain variable domain of the TCR as set forth in claim 1.

7. A vector comprising the polynucleotide molecule of claim 6.

8. A cell expressing the vector of claim 7.

9. A method of treating a subject having an NY-ESO-1-associated cancer, comprising administering to the subject a therapeutically effective amount of the TCR as set forth in claim 1, thereby treating the subject.

10. The polynucleotide molecule of claim 6, wherein the polynucleotide sequence that encodes the alpha chain variable domain comprises the nucleotide sequence of SEQ ID NO: 10.

11. The polynucleotide molecule of claim 6, wherein the polynucleotide sequence that encodes the beta chain variable domain comprises the nucleotide sequence of SEQ ID NO: 8.

12. A cell expressing the polynucleotide molecule of claim 6.

13. A cell comprising
   a first polynucleotide molecule, wherein the first polynucleotide molecule comprises a polynucleotide sequence that encodes the alpha chain variable domain of the TCR as set forth in claim 1; and
   a second polynucleotide molecule, wherein the second polynucleotide molecule comprises a polynucleotide sequence that encodes the beta chain variable domain of the TCR as set forth in claim 1.

14. The cell of claim 13, wherein the polynucleotide sequence that encodes the alpha chain variable domain of the TCR comprises the nucleotide sequence of SEQ ID NO: 10, and wherein the polynucleotide sequence that encodes the beta chain variable domain of the TCR comprises the nucleotide sequence of SEQ ID NO: 8.

15. The cell of claim 13, wherein the first polynucleotide molecule is contained within a vector.

16. The cell of claim 13, wherein the second polynucleotide molecule is contained within a vector.

17. The cell of claim 13, wherein the first polynucleotide molecule and the second polynucleotide molecule are contained within a vector.

18. A pharmaceutical composition comprising the cell of claim 5.

19. A pharmaceutical composition comprising the cell of claim 8.

20. A pharmaceutical composition comprising the cell of claim 12.

21. A pharmaceutical composition comprising the cell of any one of claims 13-17.

22. The method of claim 9, wherein the NY-ESO-1-associated cancer is a liposarcoma, a neuroblastoma, a myeloma, a metastatic melanoma, a synovial sarcoma, a bladder cancer, an esophageal cancer, a hepatocellular cancer, a head and neck cancer, a non-small cell lung cancer, an ovarian cancer, a prostate cancer, a breast cancer, astrocytic tumor, glioblastoma multiforme, anaplastic astrocytoma, brain tumor, fallopian tube cancer, ovarian epithelial cancer, primary peritoneal cavity cancer, advanced solid tumors, soft tissue sarcoma, melanoma, a sarcoma, myelodysplastic syndrome, acute myeloid leukemia, Hodgkin lymphoma, non-Hodgkin lymphoma, multiple myeloma, synovial sarcoma, metastatic solid tumors, rhabdomyosarcoma, advanced myxoid, round cell liposarcoma, or recurrent non-small cell lung cancer.

23. The method of claim 9, wherein the TCR is administered to the subject in combination with a second therapeutic agent.

24. The method of claim 9, wherein the TCR administered subcutaneously, intravenously, intradermally, intraperitoneally, orally, intramuscularly or intracranially to the subject.

25. A method of treating a subject having an NY-ESO-1-associated cancer, comprising administering to the subject a plurality of the cells of any one of claim 5, 8, or 12-17, thereby treating the subject.

26. The method of claim 25, wherein the NY-ESO-1-associated cancer is a liposarcoma, a neuroblastoma, a myeloma, a metastatic melanoma, a synovial sarcoma, a bladder cancer, an esophageal cancer, a hepatocellular cancer, a head and neck cancer, a non-small cell lung cancer, an ovarian cancer, a prostate cancer, a breast cancer, astrocytic tumor, glioblastoma multiforme, anaplastic astrocytoma, brain tumor, fallopian tube cancer, ovarian epithelial cancer, primary peritoneal cavity cancer, advanced solid tumors, soft tissue sarcoma, melanoma, a sarcoma, myelodysplastic syndrome, acute myeloid leukemia, Hodgkin lymphoma, non-Hodgkin lymphoma, multiple myeloma, synovial sarcoma, metastatic solid tumors, rhabdomyosarcoma, advanced myxoid, round cell liposarcoma, or recurrent non-small cell lung cancer.

27. The method of claim 25, wherein the plurality of cells is administered to the subject in combination with a second therapeutic agent.

28. The method of claim 25, wherein the plurality of cells is administered subcutaneously, intravenously, intradermally, intraperitoneally, orally, intramuscularly or intracranially to the subject.

29. The cell of any one of claim 5, 8, or 12-17, wherein the cell is a primary cell.

30. The cell of claim 29, wherein the primary cell is a primary lymphocyte.

31. The cell of claim 30, wherein the primary lymphocyte is a primary T lymphocyte.

32. A cell expressing a first vector comprising a polynucleotide molecule comprising a polynucleotide sequence that encodes the alpha chain variable domain of the TCR as set forth in claim 1 and a second vector comprising a polynucleotide molecule comprising a polynucleotide sequence that encodes the beta chain variable domain of the TCR as set forth in claim 1.

* * * * *

SEQUENCE LISTING

<160> NUMBER OF SEQ ID NOS: 165

<210> SEQ ID NO 1
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 1

Met Asn His Asn Tyr
1               5

<210> SEQ ID NO 2
<211> LENGTH: 6

```
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 2

Ser Val Gly Ala Gly Ile
1               5

<210> SEQ ID NO 3
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 3

Cys Ala Ser Ser Tyr Ser Gly Gly Ser Pro Leu His Phe
1               5                   10

<210> SEQ ID NO 4
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 4

Thr Ile Ser Gly Thr Asp Tyr
1               5

<210> SEQ ID NO 5
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 5

Gly Leu Thr Ser Asn
1               5

<210> SEQ ID NO 6
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 6

Cys Ile Leu Arg Pro Asp Ser Trp Gly Lys Phe Gln Phe
1               5                   10

<210> SEQ ID NO 7
<211> LENGTH: 112
<212> TYPE: PRT
<213> ORGANISM: Artificial Sequence
<220> FEATURE:
<221> NAME/KEY: source
```

<223> OTHER INFORMATION: /note="Description of Artificial Sequence:
Synthetic polypeptide"

<400> SEQUENCE: 7

```
Asn Ala Gly Val Thr Gln Thr Pro Lys Phe Arg Ile Leu Lys Ile Gly
1               5                   10                  15

Gln Ser Met Thr Leu Gln Cys Ala Gln Asp Met Asn His Asn Tyr Met
            20                  25                  30

Tyr Trp Tyr Arg Gln Asp Pro Gly Met Gly Leu Lys Leu Ile Tyr Tyr
        35                  40                  45

Ser Val Gly Ala Gly Ile Thr Asp Lys Gly Glu Val Pro Asn Gly Tyr
    50                  55                  60

Asn Val Ser Arg Ser Thr Thr Glu Tyr Phe Pro Leu Arg Leu Glu Leu
65                  70                  75                  80

Ala Ala Pro Ser Gln Thr Ser Val Tyr Phe Cys Ala Ser Ser Tyr Ser
                85                  90                  95

Gly Gly Ser Pro Leu His Phe Gly Asn Gly Thr Arg Leu Thr Val Thr
            100                 105                 110
```

<210> SEQ ID NO 8
<211> LENGTH: 337
<212> TYPE: DNA
<213> ORGANISM: Artificial Sequence
<220> FEATURE:
<221> NAME/KEY: source
<223> OTHER INFORMATION: /note="Description of Artificial Sequence:
Synthetic polynucleotide"

<400> SEQUENCE: 8

```
aatgctggtg tcactcagac cccaaaattc cgcatcctga agataggaca gagcatgaca        60
ctgcagtgtg cccaggatat gaaccataac tacatgtact ggtatcgaca agacccaggc       120
atggggctga agctgatttta ttattcagtt ggtgctggta tcactgataa aggagaagtc      180
ccgaatggct acaacgtctc cagatcaacc acagagtatt tcccgctcag gctggagttg      240
gctgctccct cccagacatc tgtgtacttc tgtgccagca gttactcggg gggttcaccc      300
ctccactttg gaacgggac caggctcact gtgacag                                 337
```

<210> SEQ ID NO 9
<211> LENGTH: 110
<212> TYPE: PRT
<213> ORGANISM: Artificial Sequence
<220> FEATURE:
<221> NAME/KEY: source
<223> OTHER INFORMATION: /note="Description of Artificial Sequence:
Synthetic polypeptide"

<400> SEQUENCE: 9

```
Asp Ala Lys Thr Thr Gln Pro Asn Ser Met Glu Ser Asn Glu Glu Glu
1               5                   10                  15

Pro Val His Leu Pro Cys Asn His Ser Thr Ile Ser Gly Thr Asp Tyr
            20                  25                  30

Ile His Trp Tyr Arg Gln Leu Pro Ser Gln Gly Pro Glu Tyr Val Ile
        35                  40                  45

His Gly Leu Thr Ser Asn Val Asn Asn Arg Met Ala Ser Leu Ala Ile
    50                  55                  60

Ala Glu Asp Arg Lys Ser Ser Thr Leu Ile Leu His Arg Ala Thr Leu
65                  70                  75                  80

Arg Asp Ala Ala Val Tyr Tyr Cys Ile Leu Arg Pro Asp Ser Trp Gly
                85                  90                  95
```

```
Lys Phe Gln Phe Gly Ala Gly Thr Gln Val Val Val Thr Pro
            100                 105                 110
```

<210> SEQ ID NO 10
<211> LENGTH: 331
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 10

```
gatgctaaga ccacacagcc aaattcaatg gagagtaacg aagaagagcc tgttcacttg    60
ccttgtaacc actccacaat cagtggaact gattacatac attggtatcg acagcttccc   120
tcccagggtc cagagtacgt gattcatggt cttacaagca atgtgaacaa cagaatggcc   180
tctctggcaa tcgctgaaga cagaaagtcc agtaccttga tcctgcaccg tgctaccttg   240
agagatgctg ctgtgtacta ctgcatcctg cggcctgaca gctggggaa attccagttt   300 ggagcaggga cccaggttgt ggtcacccca g                                  331
```

<210> SEQ ID NO 11
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 11

```
Leu Gly His Asn Ala
1               5
```

<210> SEQ ID NO 12
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 12

```
Tyr Asn Phe Lys Glu Gln
1               5
```

<210> SEQ ID NO 13
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 13

```
Cys Ala Ser Ser Gln Ala His Tyr Thr Glu Ala Phe Phe
1               5                   10
```

<210> SEQ ID NO 14
<211> LENGTH: 7
<212> TYPE: PRT
<213> ORGANISM: Artificial Sequence
<220> FEATURE:

```
<221> NAME/KEY: source
<223> OTHER INFORMATION: /note="Description of Artificial Sequence:
      Synthetic peptide"

<400> SEQUENCE: 14

Thr Ser Glu Ser Asp Tyr Tyr
1               5

<210> SEQ ID NO 15
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 15

Gln Glu Ala Tyr Lys Gln Gln Asn
1               5

<210> SEQ ID NO 16
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 16

Cys Ala Tyr Arg Ser Ala Asn Ser Gly Tyr Ala Leu Asn Phe
1               5                   10

<210> SEQ ID NO 17
<211> LENGTH: 112
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 17

Glu Thr Gly Val Thr Gln Thr Pro Arg His Leu Val Met Gly Met Thr
1               5                   10                  15

Asn Lys Lys Ser Leu Lys Cys Glu Gln His Leu Gly His Asn Ala Met
            20                  25                  30

Tyr Trp Tyr Lys Gln Ser Ala Lys Lys Pro Leu Glu Leu Met Phe Val
        35                  40                  45

Tyr Asn Phe Lys Glu Gln Thr Glu Asn Asn Ser Val Pro Ser Arg Phe
    50                  55                  60

Ser Pro Glu Cys Pro Asn Ser Ser His Leu Phe Leu His Leu His Thr
65                  70                  75                  80

Leu Gln Pro Glu Asp Ser Ala Leu Tyr Leu Cys Ala Ser Ser Gln Ala
                85                  90                  95

His Tyr Thr Glu Ala Phe Phe Gly Gln Gly Thr Arg Leu Thr Val Val
            100                 105                 110

<210> SEQ ID NO 18
<211> LENGTH: 336
<212> TYPE: DNA
<213> ORGANISM: Artificial Sequence
<220> FEATURE:
<221> NAME/KEY: source
```

-continued

<223> OTHER INFORMATION: /note="Description of Artificial Sequence:
      Synthetic polynucleotide"

<400> SEQUENCE: 18
gaaacgggag ttacgcagac accaagacac ctggtcatgg gaatgacaaa taagaagtct     60
ttgaaatgtg aacaacatct ggggcataac gctatgtatt ggtacaagca aagtgctaag    120
aagccactgg agctcatgtt tgtctacaac tttaaagaac agactgaaaa caacagtgtg    180
ccaagtcgct tctcacctga atgccccaac agctctcact tattccttca cctacacacc    240
ctgcagccag aagactcggc cctgtatctc tgtgccagca gccaagcaca ctacactgaa    300
gctttctttg gacaaggcac cagactcaca gttgta                              336

<210> SEQ ID NO 19
<211> LENGTH: 115
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 19

Ala Gln Thr Val Thr Gln Ser Gln Pro Glu Met Ser Val Gln Glu Ala
1               5                   10                  15

Glu Thr Val Thr Leu Ser Cys Thr Tyr Asp Thr Ser Glu Ser Asp Tyr
            20                  25                  30

Tyr Leu Phe Trp Tyr Lys Gln Pro Pro Ser Arg Gln Met Ile Leu Val
        35                  40                  45

Ile Arg Gln Glu Ala Tyr Lys Gln Gln Asn Ala Thr Glu Asn Arg Phe
    50                  55                  60

Ser Val Asn Phe Gln Lys Ala Ala Lys Ser Phe Ser Leu Lys Ile Ser
65                  70                  75                  80

Asp Ser Gln Leu Gly Asp Ala Ala Met Tyr Phe Cys Ala Tyr Arg Ser
                85                  90                  95

Ala Asn Ser Gly Tyr Ala Leu Asn Phe Gly Lys Gly Thr Ser Leu Leu
            100                 105                 110

Val Thr Pro
        115

<210> SEQ ID NO 20
<211> LENGTH: 345
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 20
gctcagacag tcactcagtc tcaaccagag atgtctgtgc aggaggcaga gaccgtgacc     60
ctgagctgca catatgacac cagtgagagt gattattatt tattctggta caagcagcct    120
cccagcaggc agatgattct cgttattcgc caagaagctt ataagcaaca gaatgcaaca    180
gagaatcgtt tctctgtgaa cttccagaaa gcagccaaat ccttcagtct caagatctca    240
gactcacagc tggggatgc cgcgatgtat ttctgtgctt ataggagcgc aaattccggg    300
tatgcactca acttcggcaa aggcacctcg ctgttggtca caccc                    345

<210> SEQ ID NO 21

```
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 21

Met Asn His Asn Tyr
1               5

<210> SEQ ID NO 22
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 22

Ser Val Gly Ala Gly Ile
1               5

<210> SEQ ID NO 23
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 23

Cys Ala Ser Ser Trp Thr Asp Asn Gln Pro Gln His Phe
1               5                   10

<210> SEQ ID NO 24
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 24

Thr Ile Ser Gly Thr Asp Tyr
1               5

<210> SEQ ID NO 25
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 25

Gly Leu Thr Ser Asn
1               5

<210> SEQ ID NO 26
<211> LENGTH: 12
<212> TYPE: PRT
<213> ORGANISM: Artificial Sequence
<220> FEATURE:
```

```
<221> NAME/KEY: source
<223> OTHER INFORMATION: /note="Description of Artificial Sequence:
      Synthetic peptide"

<400> SEQUENCE: 26

Cys Ile Leu Arg Glu Gly Asn Asn Asp Met Arg Phe
1               5                   10

<210> SEQ ID NO 27
<211> LENGTH: 112
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 27

Asn Ala Gly Val Thr Gln Thr Pro Lys Phe Arg Ile Leu Lys Ile Gly
1               5                   10                  15

Gln Ser Met Thr Leu Gln Cys Ala Gln Asp Met Asn His Asn Tyr Met
            20                  25                  30

Tyr Trp Tyr Arg Gln Asp Pro Gly Met Gly Leu Lys Leu Ile Tyr Tyr
        35                  40                  45

Ser Val Gly Ala Gly Ile Thr Asp Lys Gly Glu Val Pro Asn Gly Tyr
    50                  55                  60

Asn Val Ser Arg Ser Thr Thr Glu Tyr Phe Pro Leu Arg Leu Glu Leu
65                  70                  75                  80

Ala Ala Pro Ser Gln Thr Ser Val Tyr Phe Cys Ala Ser Ser Trp Thr
                85                  90                  95

Asp Asn Gln Pro Gln His Phe Gly Asp Gly Thr Arg Leu Ser Ile Leu
            100                 105                 110

<210> SEQ ID NO 28
<211> LENGTH: 336
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 28
aatgctggtg tcactcagac cccaaaattc cgcatcctga agataggaca gagcatgaca      60
ctgcagtgtg cccaggatat gaaccataac tacatgtact ggtatcgaca agacccaggc     120
atggggctga agctgattta ttattcagtt ggtgctggta tcactgataa aggagaagtc     180
ccgaatggct acaacgtctc cagatcaacc acagagtatt tcccgctcag gctggagttg     240
gctgctccct cccagacatc tgtgtacttc tgtgccagca gctggacaga caatcagccc     300
cagcattttg gtgatgggac tcgactctcc atccta                                336

<210> SEQ ID NO 29
<211> LENGTH: 109
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 29

Asp Ala Lys Thr Thr Gln Pro Asn Ser Met Glu Ser Asn Glu Glu Glu
```

```
                1               5                   10                  15
        Pro Val His Leu Pro Cys Asn His Ser Thr Ile Ser Gly Thr Asp Tyr
                        20                  25                  30

Ile His Trp Tyr Arg Gln Leu Pro Ser Gln Gly Pro Glu Tyr Val Ile
                        35                  40                  45

His Gly Leu Thr Ser Asn Val Asn Asn Arg Met Ala Ser Leu Ala Ile
                50                  55                  60

Ala Glu Asp Arg Lys Ser Ser Thr Leu Ile Leu His Arg Ala Thr Leu
        65                  70                  75                  80

Arg Asp Ala Ala Val Tyr Tyr Cys Ile Leu Arg Glu Gly Asn Asn Asp
                            85                  90                  95

Met Arg Phe Gly Ala Gly Thr Arg Leu Thr Val Lys Pro
                        100                 105
```

<210> SEQ ID NO 30
<211> LENGTH: 327
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 30

```
gatgctaaga ccacacagcc aaattcaatg gagagtaacg aagaagagcc tgttcacttg    60
ccttgtaacc actccacaat cagtggaact gattacatac attggtatcg acagcttccc   120
tcccagggtc cagagtacgt gattcatggt cttacaagca atgtgaacaa cagaatggcc   180
tctctggcaa tcgctgaaga cagaaagtcc agtaccttga tcctgcaccg tgctaccttg   240
agagatgctg ctgtgtacta ctgcatcctg agagaggga acaatgacat gcgctttgga   300
gcagggacca gactgacagt aaaacca                                       327
```

<210> SEQ ID NO 31
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 31

```
Leu Gly His Asn Ala
1               5
```

<210> SEQ ID NO 32
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 32

```
Tyr Asn Phe Lys Glu Gln
1               5
```

<210> SEQ ID NO 33
<211> LENGTH: 15
<212> TYPE: PRT
<213> ORGANISM: Artificial Sequence

```
<220> FEATURE:
<221> NAME/KEY: source
<223> OTHER INFORMATION: /note="Description of Artificial Sequence:
      Synthetic peptide"

<400> SEQUENCE: 33

Cys Ala Ser Ser His Gly Thr Gly Tyr Asn Tyr Gly Tyr Thr Phe
1               5                   10                  15

<210> SEQ ID NO 34
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 34

Asp Arg Gly Ser Gln Ser
1               5

<210> SEQ ID NO 35
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 35

Ile Tyr Ser Asn Gly Asp
1               5

<210> SEQ ID NO 36
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 36

Cys Ala Val Asn Ile Leu Ala Ser Gly Gly Ser Tyr Ile Pro Thr Phe
1               5                   10                  15

<210> SEQ ID NO 37
<211> LENGTH: 114
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 37

Glu Thr Gly Val Thr Gln Thr Pro Arg His Leu Val Met Gly Met Thr
1               5                   10                  15

Asn Lys Lys Ser Leu Lys Cys Glu Gln His Leu Gly His Asn Ala Met
            20                  25                  30

Tyr Trp Tyr Lys Gln Ser Ala Lys Lys Pro Leu Glu Leu Met Phe Val
        35                  40                  45

Tyr Asn Phe Lys Glu Gln Thr Glu Asn Asn Ser Val Pro Ser Arg Phe
    50                  55                  60
```

```
Ser Pro Glu Cys Pro Asn Ser Ser His Leu Phe Leu His Leu His Thr
 65                  70                  75                  80

Leu Gln Pro Glu Asp Ser Ala Leu Tyr Leu Cys Ala Ser Ser His Gly
                 85                  90                  95

Thr Gly Tyr Asn Tyr Gly Tyr Thr Phe Gly Ser Gly Thr Arg Leu Thr
            100                 105                 110

Val Val
```

```
<210> SEQ ID NO 38
<211> LENGTH: 343
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 38
gaaacgggag ttacgcagac accaagacac ctggtcatgg gaatgacaaa taagaagtct    60
ttgaaatgtg aacaacatct ggggcataac gctatgtatt ggtacaagca aagtgctaag   120
aagccactgg agctcatgtt tgtctacaac tttaaagaac agactgaaaa caacagtgtg   180
ccaagtcgct tctcacctga atgccccaac agctctcact tattccttca cctacacacc   240
ctgcagccag aagactcggc cctgtatctc tgtgccagca gccatgggac aggttataac   300
tatggctaca ccttcggttc ggggaccagg ttaaccgttg tag                     343
```

```
<210> SEQ ID NO 39
<211> LENGTH: 114
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 39

Gln Lys Glu Val Glu Gln Asn Ser Gly Pro Leu Ser Val Pro Glu Gly
  1               5                  10                  15

Ala Ile Ala Ser Leu Asn Cys Thr Tyr Ser Asp Arg Gly Ser Gln Ser
                 20                  25                  30

Phe Phe Trp Tyr Arg Gln Tyr Ser Gly Lys Ser Pro Glu Leu Ile Met
             35                  40                  45

Ser Ile Tyr Ser Asn Gly Asp Lys Glu Asp Gly Arg Phe Thr Ala Gln
         50                  55                  60

Leu Asn Lys Ala Ser Gln Tyr Val Ser Leu Leu Ile Arg Asp Ser Gln
 65                  70                  75                  80

Pro Ser Asp Ser Ala Thr Tyr Leu Cys Ala Val Asn Ile Leu Ala Ser
                 85                  90                  95

Gly Gly Ser Tyr Ile Pro Thr Phe Gly Arg Gly Thr Ser Leu Ile Val
            100                 105                 110

His Pro
```

```
<210> SEQ ID NO 40
<211> LENGTH: 342
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"
```

```
<400> SEQUENCE: 40
cagaaggagg tggagcagaa ttctggaccc ctcagtgttc cagagggagc cattgcctct    60
ctcaactgca cttacagtga ccgaggttcc cagtccttct tctggtacag acaatattct   120
gggaaaagcc ctgagttgat aatgtccata tactccaatg gtgacaaaga agatggaagg   180
tttacagcac agctcaataa agccagccag tatgtttctc tgctcatcag agactcccag   240
cccagtgatt cagccaccta cctctgtgcc gtgaacatcc tcgcatcagg aggaagctac   300
atacctacat ttggaagagg aaccagcctt attgttcatc cg                     342

<210> SEQ ID NO 41
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 41

Met Asn His Glu Tyr
1               5

<210> SEQ ID NO 42
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 42

Ser Val Gly Ala Gly Ile
1               5

<210> SEQ ID NO 43
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 43

Cys Ala Ser Ser Tyr Val Gly Asn Thr Gly Glu Leu Phe Phe
1               5                   10

<210> SEQ ID NO 44
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 44

Thr Ile Ser Gly Thr Asp Tyr
1               5

<210> SEQ ID NO 45
<211> LENGTH: 5
<212> TYPE: PRT
```

<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 45

Gly Leu Thr Ser Asn
1               5

<210> SEQ ID NO 46
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 46

Cys Ile Leu Arg Pro Asp Ser Trp Gly Lys Phe Gln Phe
1               5                   10

<210> SEQ ID NO 47
<211> LENGTH: 113
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 47

Asn Ala Gly Val Thr Gln Thr Pro Lys Phe Gln Val Leu Lys Thr Gly
1               5                   10                  15

Gln Ser Met Thr Leu Gln Cys Ala Gln Asp Met Asn His Glu Tyr Met
            20                  25                  30

Ser Trp Tyr Arg Gln Asp Pro Gly Met Gly Leu Arg Leu Ile His Tyr
        35                  40                  45

Ser Val Gly Ala Gly Ile Thr Asp Gln Gly Glu Val Pro Asn Gly Tyr
    50                  55                  60

Asn Val Ser Arg Ser Thr Thr Glu Asp Phe Pro Leu Arg Leu Leu Ser
65                  70                  75                  80

Ala Ala Pro Ser Gln Thr Ser Val Tyr Phe Cys Ala Ser Ser Tyr Val
                85                  90                  95

Gly Asn Thr Gly Glu Leu Phe Phe Gly Glu Gly Ser Arg Leu Thr Val
            100                 105                 110

Leu

<210> SEQ ID NO 48
<211> LENGTH: 339
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 48
aatgctggtg tcactcagac cccaaaattc caggtcctga agacaggaca gagcatgaca      60
ctgcagtgtg cccaggatat gaaccatgaa tacatgtcct ggtatcgaca agacccaggc     120
atggggctga ggctgattca ttactcagtt ggtgctggta tcactgacca aggagaagtc     180

```
cccaatggct acaatgtctc cagatcaacc acagaggatt tcccgctcag gctgctgtcg    240
gctgctccct cccagacatc tgtgtacttc tgtgccagca gttacgtggg gaacaccggg    300
gagctgtttt ttggagaagg ctctaggctg accgtactg                           339
```

<210> SEQ ID NO 49
<211> LENGTH: 110
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 49

```
Asp Ala Lys Thr Thr Gln Pro Asn Ser Met Glu Ser Asn Glu Glu Glu
1               5                   10                  15

Pro Val His Leu Pro Cys Asn His Ser Thr Ile Ser Gly Thr Asp Tyr
            20                  25                  30

Ile His Trp Tyr Arg Gln Leu Pro Ser Gln Gly Pro Glu Tyr Val Ile
        35                  40                  45

His Gly Leu Thr Ser Asn Val Asn Asn Arg Met Ala Ser Leu Ala Ile
    50                  55                  60

Ala Glu Asp Arg Lys Ser Ser Thr Leu Ile Leu His Arg Ala Thr Leu
65                  70                  75                  80

Arg Asp Ala Ala Val Tyr Tyr Cys Ile Leu Arg Pro Asp Ser Trp Gly
                85                  90                  95

Lys Phe Gln Phe Gly Ala Gly Thr Gln Val Val Val Thr Pro
            100                 105                 110
```

<210> SEQ ID NO 50
<211> LENGTH: 331
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 50

```
gatgctaaga ccacacagcc aaattcaatg gagagtaacg aagaagagcc tgttcacttg    60
ccttgtaacc actccacaat cagtggaact gattacatac attggtatcg acagcttccc   120
tcccagggtc cagagtacgt gattcatggt cttacaagca atgtgaacaa cagaatggcc   180
tctctggcaa tcgctgaaga cagaaagtcc agtaccttga tcctgcaccg tgctaccttg   240
agagatgctg ctgtgtacta ctgcatcctg cggcctgaca gctgggggaa attccagttt   300
ggagcaggga cccaggttgt ggtcacccca g                                  331
```

<210> SEQ ID NO 51
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 51

```
Met Asn His Glu Tyr
1               5
```

```
<210> SEQ ID NO 52
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 52

Ser Met Asn Val Glu Val
1               5

<210> SEQ ID NO 53
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 53

Cys Ala Ser Ser Leu Arg Gly Pro Tyr Gly Tyr Thr Phe
1               5                   10

<210> SEQ ID NO 54
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 54

Asp Ser Ala Ser Asn Tyr
1               5

<210> SEQ ID NO 55
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 55

Ile Arg Ser Asn Val Gly Glu
1               5

<210> SEQ ID NO 56
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 56

Cys Ala Ala Thr Gly Tyr Gly Gln Asn Phe Val Phe
1               5                   10

<210> SEQ ID NO 57
<211> LENGTH: 112
<212> TYPE: PRT
<213> ORGANISM: Artificial Sequence
```

<220> FEATURE:
<221> NAME/KEY: source
<223> OTHER INFORMATION: /note="Description of Artificial Sequence:
      Synthetic polypeptide"

<400> SEQUENCE: 57

Glu Ala Gln Val Thr Gln Asn Pro Arg Tyr Leu Ile Thr Val Thr Gly
1               5                   10                  15

Lys Lys Leu Thr Val Thr Cys Ser Gln Asn Met Asn His Glu Tyr Met
            20                  25                  30

Ser Trp Tyr Arg Gln Asp Pro Gly Leu Gly Leu Arg Gln Ile Tyr Tyr
        35                  40                  45

Ser Met Asn Val Glu Val Thr Asp Lys Gly Asp Val Pro Glu Gly Tyr
    50                  55                  60

Lys Val Ser Arg Lys Glu Lys Arg Asn Phe Pro Leu Ile Leu Glu Ser
65                  70                  75                  80

Pro Ser Pro Asn Gln Thr Ser Leu Tyr Phe Cys Ala Ser Ser Leu Arg
                85                  90                  95

Gly Pro Tyr Gly Tyr Thr Phe Gly Ser Gly Thr Arg Leu Thr Val Val
            100                 105                 110

<210> SEQ ID NO 58
<211> LENGTH: 336
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 58
gaagcccaag tgacccagaa cccaagatac ctcatcacag tgactggaaa gaagttaaca    60
gtgacttgtt ctcagaatat gaaccatgag tatatgtcct ggtatcgaca agacccaggg   120
ctgggcttaa ggcagatcta ctattcaatg aatgttgagg tgactgataa gggagatgtt   180
cctgaagggt acaaagtctc tcgaaaagag aagaggaatt ccccctgat cctggagtcg    240 cccagcccca accagacctc tctgtacttc tgtgccagca gtttacgggg gccttatggc   300
tacaccttcg gttcggggac caggttaacc gttgta                             336

<210> SEQ ID NO 59
<211> LENGTH: 111
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 59

Gly Glu Asn Val Glu Gln His Pro Ser Thr Leu Ser Val Gln Glu Gly
1               5                   10                  15

Asp Ser Ser Val Ile Lys Cys Thr Tyr Ser Asp Ser Ala Ser Asn Tyr
            20                  25                  30

Phe Pro Trp Tyr Lys Gln Glu Leu Gly Lys Arg Pro Gln Leu Ile Ile
        35                  40                  45

Asp Ile Arg Ser Asn Val Gly Glu Lys Lys Asp Gln Arg Ile Ala Val
    50                  55                  60

Thr Leu Asn Lys Thr Ala Lys His Phe Ser Leu His Ile Thr Glu Thr
65                  70                  75                  80

Gln Pro Glu Asp Ser Ala Val Tyr Phe Cys Ala Ala Thr Gly Tyr Gly
            85                  90                  95

Gln Asn Phe Val Phe Gly Pro Gly Thr Arg Leu Ser Val Leu Pro
        100                 105                 110

<210> SEQ ID NO 60
<211> LENGTH: 333
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 60
ggagagaatg tggagcagca tccttcaacc ctgagtgtcc aggagggaga cagctctgtt      60
atcaagtgta cttattcaga cagtgcctca aactacttcc cttggtataa gcaagaactt     120
ggaaaaagac ctcagcttat tatagacatt cgttcaaatg tgggcgaaaa gaaagaccaa     180
cgaattgctg ttacattgaa caagacagcc aaacatttct ccctgcacat cacagagacc     240
caacctgaag actcggctgt ctacttctgt gcagcaacgg gctatggtca gaattttgtc     300
tttggtcccg gaaccagatt gtccgtgctg cca                                  333

<210> SEQ ID NO 61
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 61

Leu Gly His Asn Ala
1               5

<210> SEQ ID NO 62
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 62

Tyr Asn Phe Lys Glu Gln
1               5

<210> SEQ ID NO 63
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 63

Cys Ala Ser Ser Gln Gly Pro Gly Tyr Thr Phe
1               5                   10

<210> SEQ ID NO 64
<211> LENGTH: 6
<212> TYPE: PRT

```
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 64

Asp Ser Ala Ser Asn Tyr
1               5

<210> SEQ ID NO 65
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 65

Ile Arg Ser Asn Val Gly Glu
1               5

<210> SEQ ID NO 66
<211> LENGTH: 14
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 66

Cys Ala Ala Ser Met Lys Asp Ser Ser Tyr Lys Leu Ile Phe
1               5                   10

<210> SEQ ID NO 67
<211> LENGTH: 110
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 67

Glu Thr Gly Val Thr Gln Thr Pro Arg His Leu Val Met Gly Met Thr
1               5                   10                  15

Asn Lys Lys Ser Leu Lys Cys Glu Gln His Leu Gly His Asn Ala Met
            20                  25                  30

Tyr Trp Tyr Lys Gln Ser Ala Lys Lys Pro Leu Glu Leu Met Phe Val
        35                  40                  45

Tyr Asn Phe Lys Glu Gln Thr Glu Asn Asn Ser Val Pro Ser Arg Phe
    50                  55                  60

Ser Pro Glu Cys Pro Asn Ser Ser His Leu Phe Leu His Leu His Thr
65                  70                  75                  80

Leu Gln Pro Glu Asp Ser Ala Leu Tyr Leu Cys Ala Ser Ser Gln Gly
                85                  90                  95

Pro Gly Tyr Thr Phe Gly Ser Gly Thr Arg Leu Thr Val Val
            100                 105                 110

<210> SEQ ID NO 68
<211> LENGTH: 330
<212> TYPE: DNA
<213> ORGANISM: Artificial Sequence
```

```
<220> FEATURE:
<221> NAME/KEY: source
<223> OTHER INFORMATION: /note="Description of Artificial Sequence:
      Synthetic polynucleotide"

<400> SEQUENCE: 68
gaaacgggag ttacgcagac accaagacac ctggtcatgg gaatgacaaa taagaagtct      60
ttgaaatgtg aacaacatct ggggcataac gctatgtatt ggtacaagca aagtgctaag     120
aagccactgg agctcatgtt tgtctacaac tttaaagaac agactgaaaa caacagtgtg     180
ccaagtcgct tctcacctga atgccccaac agctctcact tattccttca cctacacacc     240
ctgcagccag aagactcggc cctgtatctc tgtgccagca gccaaggccc aggctacacc     300
ttcggttcgg ggaccaggtt aaccgttgta                                      330

<210> SEQ ID NO 69
<211> LENGTH: 113
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 69

Gly Glu Asn Val Glu Gln His Pro Ser Thr Leu Ser Val Gln Glu Gly
1               5                   10                  15

Asp Ser Ala Val Ile Lys Cys Thr Tyr Ser Asp Ser Ala Ser Asn Tyr
            20                  25                  30

Phe Pro Trp Tyr Lys Gln Glu Leu Gly Lys Arg Pro Gln Leu Ile Ile
        35                  40                  45

Asp Ile Arg Ser Asn Val Gly Glu Lys Lys Asp Gln Arg Ile Ala Val
    50                  55                  60

Thr Leu Asn Lys Thr Ala Lys His Phe Ser Leu His Ile Thr Glu Thr
65                  70                  75                  80

Gln Pro Glu Asp Ser Ala Val Tyr Phe Cys Ala Ala Ser Met Lys Asp
                85                  90                  95

Ser Ser Tyr Lys Leu Ile Phe Gly Ser Gly Thr Arg Leu Leu Val Arg
            100                 105                 110

Pro

<210> SEQ ID NO 70
<211> LENGTH: 339
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 70
ggagagaatg tggagcagca tccttcaacc ctgagtgtcc aggagggaga cagcgctgtt      60
atcaagtgta cttattcaga cagtgcctca aactacttcc cttggtataa gcaagaactt     120
ggaaaaagac tcagcttat tatagacatt cgttcaaatg tgggcgaaaa gaaagaccaa     180
cgaattgctg ttacattgaa caagacagcc aaacatttct ccctgcacat cacagagacc     240
caacctgaag actcggctgt ctacttctgt gcagcaagta tgaaggatag cagctataaa     300
ttgatcttcg ggagtgggac cagactgctg gtcaggcct                            339
```

```
<210> SEQ ID NO 71
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 71

Asp Phe Gln Ala Thr Thr
1               5

<210> SEQ ID NO 72
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 72

Ser Asn Glu Gly Ser Lys Ala
1               5

<210> SEQ ID NO 73
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 73

Cys Ser Ala Met Thr Val Met Asn Thr Glu Ala Phe Phe
1               5                   10

<210> SEQ ID NO 74
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 74

Thr Ile Ser Gly Thr Asp Tyr
1               5

<210> SEQ ID NO 75
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 75

Gly Leu Thr Ser Asn
1               5

<210> SEQ ID NO 76
<211> LENGTH: 13
<212> TYPE: PRT
<213> ORGANISM: Artificial Sequence
```

<220> FEATURE:
<221> NAME/KEY: source
<223> OTHER INFORMATION: /note="Description of Artificial Sequence:
      Synthetic peptide"

<400> SEQUENCE: 76

Cys Ile Leu Arg Pro Asp Ser Trp Gly Lys Phe Gln Phe
1               5                   10

<210> SEQ ID NO 77
<211> LENGTH: 115
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 77

Gly Ala Val Val Ser Gln His Pro Ser Trp Val Ile Cys Lys Ser Gly
1               5                   10                  15

Thr Cys Val Lys Ile Glu Cys Arg Ser Leu Asp Phe Gln Ala Thr Thr
            20                  25                  30

Met Phe Trp Tyr Arg Gln Phe Pro Lys Gln Ser Leu Met Leu Met Ala
        35                  40                  45

Thr Ser Asn Glu Gly Ser Lys Ala Thr Tyr Glu Gln Gly Val Glu Lys
    50                  55                  60

Asp Lys Phe Leu Ile Asn His Ala Ser Leu Thr Leu Ser Thr Leu Thr
65                  70                  75                  80

Val Ala Gly Ala His Pro Glu Asp Ser Ser Phe Tyr Ile Cys Ser Ala
                85                  90                  95

Met Thr Val Met Asn Thr Glu Ala Phe Phe Gly Gln Gly Thr Arg Leu
            100                 105                 110

Thr Val Val
        115

<210> SEQ ID NO 78
<211> LENGTH: 345
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 78
ggtgctgtcg tctctcaaca tccgagctgg gttatctgta agagtggaac ctgtgtgaag      60
atcgagtgcc gttccctgga cttttcaggcc acaactatgt tttggtatcg tcagttcccg    120
aaacagagtc tcatgctgat ggcaacttcc aatgagggct ccaaggccac atacgagcaa    180
ggcgtcgaga aggacaagtt tctcatcaac catgcaagcc tgaccttgtc cactctgaca    240
gtggccggtg cccatcctga agacagcagc ttctacatct gcagtgctat gacagtcatg    300
aacactgaag ctttctttgg acaaggcacc agactcacag ttgta                    345

<210> SEQ ID NO 79
<211> LENGTH: 110
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 79

Asp Ala Lys Thr Thr Gln Pro Asn Ser Met Glu Ser Asn Glu Glu Glu
1               5                   10                  15

Pro Val His Leu Pro Cys Asn His Ser Thr Ile Ser Gly Thr Asp Tyr
            20                  25                  30

Ile His Trp Tyr Arg Gln Leu Pro Ser Gln Gly Pro Glu Tyr Val Ile
        35                  40                  45

His Gly Leu Thr Ser Asn Val Asn Asn Arg Met Ala Ser Leu Ala Ile
    50                  55                  60

Ala Glu Asp Arg Lys Ser Ser Thr Leu Ile Leu His Arg Ala Thr Leu
65                  70                  75                  80

Arg Asp Ala Ala Val Tyr Tyr Cys Ile Leu Arg Pro Asp Ser Trp Gly
                85                  90                  95

Lys Phe Gln Phe Gly Ala Gly Thr Gln Val Val Val Thr Pro
            100                 105                 110

<210> SEQ ID NO 80
<211> LENGTH: 331
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 80
gatgctaaga ccacacagcc aaattcaatg gagagtaacg aagaagagcc tgttcacttg      60
ccttgtaacc actccacaat cagtggaact gattacatac attggtatcg acagcttccc    120
tcccagggtc cagagtacgt gattcatggt cttacaagca atgtgaacaa cagaatggcc    180
tctctggcaa tcgctgaaga cagaaagtcc agtaccttga tcctgcaccg tgctaccttg    240
agagatgctg ctgtgtacta ctgcatcctg cggcctgaca gctgggggaa attccagttt    300
ggagcaggga cccaggttgt ggtcacccca g                                   331

<210> SEQ ID NO 81
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 81

Ser Gly His Lys Ser
1               5

<210> SEQ ID NO 82
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 82

Tyr Tyr Glu Lys Glu Glu
1               5

```
<210> SEQ ID NO 83
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 83

Cys Ala Ser Ser Leu Gly Ser Tyr Asp Tyr Thr Phe
1               5                   10

<210> SEQ ID NO 84
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 84

Asn Ser Met Phe Asp Tyr
1               5

<210> SEQ ID NO 85
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 85

Ile Ser Ser Ile Lys Asp Lys
1               5

<210> SEQ ID NO 86
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 86

Cys Ala Ala Arg Lys Asn Tyr Gly Gly Ser Gln Gly Asn Leu Ile Phe
1               5                   10                  15

<210> SEQ ID NO 87
<211> LENGTH: 111
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 87

Asp Ala Gly Val Thr Gln Ser Pro Thr His Leu Ile Lys Thr Arg Gly
1               5                   10                  15

Gln Gln Val Thr Leu Arg Cys Ser Pro Ile Ser Gly His Lys Ser Val
            20                  25                  30

Ser Trp Tyr Gln Gln Val Leu Gly Gln Gly Pro Gln Phe Ile Phe Gln
        35                  40                  45
```

Tyr Tyr Glu Lys Glu Glu Arg Gly Arg Gly Asn Phe Pro Asp Arg Phe
            50                  55                  60

Ser Ala Arg Gln Phe Pro Asn Tyr Ser Ser Glu Leu Asn Val Asn Ala
65                  70                  75                  80

Leu Leu Leu Gly Asp Ser Ala Leu Tyr Leu Cys Ala Ser Ser Leu Gly
                85                  90                  95

Ser Tyr Asp Tyr Thr Phe Gly Ser Gly Thr Arg Leu Thr Val Val
                100                 105                 110

<210> SEQ ID NO 88
<211> LENGTH: 333
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 88
gacgctggag tcacccaaag tcccacacac ctgatcaaaa cgagaggaca gcaagtgact      60
ctgagatgct ctcctatctc tgggcacaag agtgtgtcct ggtaccaaca ggtcctgggt     120
caggggcccc agtttatctt tcagtattat gagaaagaag agagaggaag aggaaacttc     180
cctgatcgat tctcagctcg ccagttccct aactatagct ctgagctgaa tgtgaacgcc     240
ttgttgctgg gggactcggc cctgtatctc tgtgccagca gcttgggcag ctatgactac     300
accttcggtt cggggaccag gttaaccgtt gta                                  333

<210> SEQ ID NO 89
<211> LENGTH: 115
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 89

Asp Gln Gln Val Lys Gln Asn Ser Pro Ser Leu Ser Val Gln Glu Gly
1               5                   10                  15

Arg Ile Ser Ile Leu Asn Cys Asp Tyr Thr Asn Ser Met Phe Asp Tyr
            20                  25                  30

Phe Leu Trp Tyr Lys Lys Tyr Pro Ala Glu Gly Pro Thr Phe Leu Ile
        35                  40                  45

Ser Ile Ser Ser Ile Lys Asp Lys Asn Glu Asp Gly Arg Phe Thr Val
    50                  55                  60

Phe Leu Asn Lys Ser Ala Lys His Leu Ser Leu His Ile Val Pro Ser
65                  70                  75                  80

Gln Pro Gly Asp Ser Ala Val Tyr Phe Cys Ala Ala Arg Lys Asn Tyr
                85                  90                  95

Gly Gly Ser Gln Gly Asn Leu Ile Phe Gly Lys Gly Thr Lys Leu Ser
                100                 105                 110

Val Lys Pro
        115

<210> SEQ ID NO 90
<211> LENGTH: 345
<212> TYPE: DNA
<213> ORGANISM: Artificial Sequence
<220> FEATURE:

```
<221> NAME/KEY: source
<223> OTHER INFORMATION: /note="Description of Artificial Sequence:
      Synthetic polynucleotide"

<400> SEQUENCE: 90
gaccagcaag ttaagcaaaa ttcaccatcc ctgagcgtcc aggaaggaag aatttctatt     60
ctgaactgtg actatactaa cagcatgttt gattatttcc tatggtacaa aaaatacccr    120
gctgaaggtc ctacattcct gatatctata agttccatta aggataaaaa tgaagatgga    180
agattcactg ttttcttaaa caaaagtgcc aagcacctct ctctgcacat tgtgccctcc    240
cagcctggag actctgcagt gtacttctgt gcagcaagga agaattatgg aggaagccaa    300
ggaaatctca tctttggaaa aggcactaaa ctctctgtta aacca                    345

<210> SEQ ID NO 91
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 91

Asp Phe Gln Ala Thr Thr
1               5

<210> SEQ ID NO 92
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 92

Ser Asn Glu Gly Ser Lys Ala
1               5

<210> SEQ ID NO 93
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 93

Cys Ser Ala Lys Glu Gly Thr Glu Ala Phe Phe
1               5                   10

<210> SEQ ID NO 94
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 94

Thr Ile Ser Gly Thr Asp Tyr
1               5
```

<210> SEQ ID NO 95
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 95

```
Gly Leu Thr Ser Asn
1               5
```

<210> SEQ ID NO 96
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 96

```
Cys Ile Leu Asn Thr Gly Thr Ala Ser Lys Leu Thr Phe
1               5                   10
```

<210> SEQ ID NO 97
<211> LENGTH: 113
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 97

```
Gly Ala Val Val Ser Gln His Pro Ser Trp Val Ile Cys Lys Ser Gly
1               5                   10                  15

Thr Ser Val Lys Ile Glu Cys Arg Ser Leu Asp Phe Gln Ala Thr Thr
            20                  25                  30

Met Phe Trp Tyr Arg Gln Phe Pro Lys Gln Ser Leu Met Leu Met Ala
        35                  40                  45

Thr Ser Asn Glu Gly Ser Lys Ala Thr Tyr Glu Gln Gly Val Glu Lys
    50                  55                  60

Asp Lys Phe Leu Ile Asn His Ala Ser Leu Thr Leu Ser Thr Leu Thr
65                  70                  75                  80

Val Thr Ser Ala His Pro Glu Asp Ser Ser Phe Tyr Ile Cys Ser Ala
                85                  90                  95

Lys Glu Gly Thr Glu Ala Phe Phe Gly Gln Gly Thr Arg Leu Thr Val
            100                 105                 110

Val
```

<210> SEQ ID NO 98
<211> LENGTH: 339
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 98

```
ggtgctgtcg tctctcaaca tccgagctgg gttatctgta agagtggaac ctctgtgaag    60
atcgagtgcc gttccctgga ctttcaggcc acaactatgt tttggtatcg tcagttcccg   120
```

```
aaacagagtc tcatgctgat ggcaacttcc aatgagggct ccaaggccac atacgagcaa    180
ggcgtcgaga aggacaagtt tctcatcaac catgcaagcc tgaccttgtc cactctgaca    240
gtgaccagtg cccatcctga agacagcagc ttctacatct gcagtgctaa ggagggggact   300 gaagctttct ttggacaagg caccagactc acagttgta                           339
```

```
<210> SEQ ID NO 99
<211> LENGTH: 110
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 99
```

```
Asp Ala Lys Thr Thr Gln Pro Asn Ser Met Glu Ser Asn Glu Glu Glu
1               5                   10                  15

Pro Val His Leu Pro Cys Asn His Ser Thr Ile Ser Gly Thr Asp Tyr
            20                  25                  30

Ile His Trp Tyr Arg Gln Leu Pro Ser Gln Gly Pro Glu Tyr Val Ile
        35                  40                  45

His Gly Leu Thr Ser Asn Val Asn Asn Arg Met Ala Ser Leu Ala Ile
    50                  55                  60

Ala Glu Asp Arg Lys Ser Ser Thr Leu Ile Leu His Arg Ala Thr Leu
65                  70                  75                  80

Arg Asp Ala Ala Val Tyr Tyr Cys Ile Leu Asn Thr Gly Thr Ala Ser
                85                  90                  95

Lys Leu Thr Phe Gly Thr Gly Thr Arg Leu Gln Val Thr Leu
            100                 105                 110
```

```
<210> SEQ ID NO 100
<211> LENGTH: 330
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 100
```

```
gatgctaaga ccacacagcc aaattcaatg gagagtaacg aagaagagcc tgttcacttg    60
ccttgtaacc actccacaat cagtggaact gattacatac attggtatcg acagcttccc   120
tcccagggtc cagagtacgt gattcatggt cttacaagca atgtgaacaa cagaatggcc   180
tctctggcaa tcgctgaaga cagaaagtcc agtaccttga tcctgcaccg tgctaccttg   240
agagatgctg ctgtgtacta ctgcatcctg aataccggca ctgccagtaa actcaccttt   300
gggactggaa caagacttca ggtcacgctc                                     330
```

```
<210> SEQ ID NO 101
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 101
```

```
Leu Gly His Asn Ala
```

```
<210> SEQ ID NO 102
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 102

Tyr Asn Phe Lys Glu Gln
1               5

<210> SEQ ID NO 103
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 103

Cys Ala Ser Ser Gln Gly Pro Gly Tyr Thr Phe
1               5                   10

<210> SEQ ID NO 104
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 104

Asp Arg Gly Ser Gln Ser
1               5

<210> SEQ ID NO 105
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 105

Ile Tyr Ser Asn Gly Asp
1               5

<210> SEQ ID NO 106
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 106

Cys Ala Val Asn Ser Ser Pro Tyr Lys Leu Ser Phe
1               5                   10

<210> SEQ ID NO 107
```

```
<211> LENGTH: 110
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 107

Glu Thr Gly Val Thr Gln Thr Pro Arg His Leu Val Met Gly Met Thr
1               5                   10                  15

Asn Lys Lys Ser Leu Lys Cys Glu Gln His Leu Gly His Asn Ala Met
            20                  25                  30

Tyr Trp Tyr Lys Gln Ser Ala Lys Lys Pro Leu Glu Leu Met Phe Val
        35                  40                  45

Tyr Asn Phe Lys Glu Gln Thr Glu Asn Asn Ser Val Pro Ser Arg Phe
    50                  55                  60

Ser Pro Glu Cys Pro Asn Ser Ser His Leu Phe Leu His Leu His Thr
65                  70                  75                  80

Leu Gln Pro Glu Asp Ser Ala Leu Tyr Leu Cys Ala Ser Ser Gln Gly
                85                  90                  95

Pro Gly Tyr Thr Phe Gly Ser Gly Thr Arg Leu Thr Val Val
            100                 105                 110

<210> SEQ ID NO 108
<211> LENGTH: 330
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 108
gaaacgggag ttacgcagac accaagacac ctggtcatgg gaatgacaaa taagaagtct     60
ttgaaatgtg aacaacatct ggggcataac gctatgtatt ggtacaagca aagtgctaag    120
aagccactgg agctcatgtt tgtctacaac tttaaagaac agactgaaaa caacagtgtg    180
ccaagtcgct tctcacctga atgccccaac agctctcact tattccttca cctacacacc    240
ctgcagccag aagactcggc cctgtatctc tgtgccagca gccaaggccc aggctacacc    300
ttcggttcgg ggaccaggtt aaccgttgta                                     330

<210> SEQ ID NO 109
<211> LENGTH: 110
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 109

Gln Lys Glu Val Glu Gln Asn Ser Gly Pro Leu Ser Val Pro Glu Gly
1               5                   10                  15

Ala Ile Ala Ser Leu Asn Cys Thr Tyr Ser Asp Arg Gly Ser Gln Ser
            20                  25                  30

Phe Phe Trp Tyr Arg Gln Tyr Ser Gly Lys Ser Pro Glu Leu Ile Met
        35                  40                  45

Ser Ile Tyr Ser Asn Gly Asp Lys Glu Asp Gly Arg Phe Thr Ala Gln
    50                  55                  60
```

```
Leu Asn Lys Ala Ser Gln Tyr Val Ser Leu Leu Ile Arg Asp Ser Gln
 65                  70                  75                  80

Pro Ser Asp Ser Ala Thr Tyr Leu Cys Ala Val Asn Ser Ser Pro Tyr
                 85                  90                  95

Lys Leu Ser Phe Gly Ala Gly Thr Thr Val Thr Val Arg Ala
                100                 105                 110

<210> SEQ ID NO 110
<211> LENGTH: 330
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 110
cagaaggagg tggagcagaa ttctggaccc ctcagtgttc cagagggagc cattgcctct     60
ctcaactgca cttacagtga ccgaggttcc cagtccttct tctggtacag acaatattct    120
gggaaaagcc ctgagttgat aatgtccata tactccaatg gtgacaaaga agatggaagg    180
tttacagcac agctcaataa agccagccag tatgtttctc tgctcatcag agactcccag    240
cccagtgatt cagccaccta cctctgtgcc gtgaactcct cgccctacaa gctcagcttt    300
ggagccggaa ccacagtaac tgtaagagca                                     330

<210> SEQ ID NO 111
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 111

Ser Leu Leu Met Trp Ile Thr Gln Cys
1               5

<210> SEQ ID NO 112
<211> LENGTH: 752
<212> TYPE: DNA
<213> ORGANISM: Homo sapiens

<400> SEQUENCE: 112
atcctcgtgg gccctgacct tctctctgag agccgggcag aggctccgga gccatgcagg     60
ccgaaggccg gggcacaggg ggttcgacgg gcgatgctga tgcccagga ggccctggca    120 ttcctgatgg cccaggggc aatgctggcg gcccaggaga ggcgggtgcc acgggcggca    180
gaggtccccg gggcgcaggg gcagcaaggg cctcggggcc gggaggaggc gccccgcggg    240
gtccgcatgg cggcgcggct tcagggctga atggatgctg cagatgcggg gccaggggc    300 cggagagccg cctgcttgag ttctacctcg ccatgccttt cgcgacaccc atggaagcag    360
agctggcccg caggagcctg gcccaggatg cccaccgct tcccgtgcca ggggtgcttc    420
tgaaggagtt cactgtgtcc ggcaacatac tgactatccg actgactgct gcagaccacc    480
gccaactgca gctctccatc agctcctgtc tccagcagct ttccctgttg atgtggatca    540
cgcagtgctt tctgccccgtg ttttttggctc agcctccctc agggcagagg cgctaagccc    600
agcctggcgc cccttcctag gtcatgcctc ctccctagg gaatggtccc agcacgagtg    660
gccagttcat tgtgggggcc tgattgtttg tcgctggagg aggacggctt acatgtttgt    720
```

```
ttctgtagaa aataaaactg agctacgaaa aa                                  752
```

<210> SEQ ID NO 113
<211> LENGTH: 180
<212> TYPE: PRT
<213> ORGANISM: Homo sapiens

<400> SEQUENCE: 113

```
Met Gln Ala Glu Gly Arg Gly Thr Gly Ser Thr Gly Asp Ala Asp
1               5                   10                  15

Gly Pro Gly Gly Pro Gly Ile Pro Asp Gly Pro Gly Asn Ala Gly
                20                  25                  30

Gly Pro Gly Glu Ala Gly Ala Thr Gly Arg Gly Pro Arg Gly Ala
            35                  40                  45

Gly Ala Ala Arg Ala Ser Gly Pro Gly Gly Ala Pro Arg Gly Pro
        50                  55                  60

His Gly Gly Ala Ala Ser Gly Leu Asn Gly Cys Cys Arg Cys Gly Ala
65                  70                  75                  80

Arg Gly Pro Glu Ser Arg Leu Leu Glu Phe Tyr Leu Ala Met Pro Phe
                85                  90                  95

Ala Thr Pro Met Glu Ala Glu Leu Ala Arg Arg Ser Leu Ala Gln Asp
            100                 105                 110

Ala Pro Pro Leu Pro Val Pro Gly Val Leu Lys Glu Phe Thr Val
        115                 120                 125

Ser Gly Asn Ile Leu Thr Ile Arg Leu Thr Ala Ala Asp His Arg Gln
    130                 135                 140

Leu Gln Leu Ser Ile Ser Ser Cys Leu Gln Gln Leu Ser Leu Leu Met
145                 150                 155                 160

Trp Ile Thr Gln Cys Phe Leu Pro Val Phe Leu Ala Gln Pro Pro Ser
                165                 170                 175

Gly Gln Arg Arg
            180
```

<210> SEQ ID NO 114
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 114

```
Ser Leu Leu Asp Ile Ile Thr Asn Cys
1               5
```

<210> SEQ ID NO 115
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 115

```
Ser Leu Leu Met Ser Ile Leu Ala Leu
1               5
```

<210> SEQ ID NO 116

```
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 116

Leu Leu Thr Met His Ile Thr Gln Leu
1               5

<210> SEQ ID NO 117
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 117

Ser Leu Leu Thr Trp Ile Leu His Ile
1               5

<210> SEQ ID NO 118
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
<220> FEATURE:
<221> NAME/KEY: MOD_RES
<222> LOCATION: (2)..(2)
<223> OTHER INFORMATION: Any nonpolar amino acid
<220> FEATURE:
<221> NAME/KEY: VARIANT
<222> LOCATION: (3)..(3)
<223> OTHER INFORMATION: /replace="Tyr" or "Val" or "Ala"
<220> FEATURE:
<221> NAME/KEY: VARIANT
<222> LOCATION: (4)..(4)
<223> OTHER INFORMATION: /replace="Asn" or "Thr" or "Ser"
<220> FEATURE:
<221> NAME/KEY: VARIANT
<222> LOCATION: (5)..(5)
<223> OTHER INFORMATION: /replace="Ser" or "Glu" or "Ile" or "Gly" or
      "Met" or "Lys" or "Thr"
<220> FEATURE:
<221> NAME/KEY: VARIANT
<222> LOCATION: (6)..(6)
<223> OTHER INFORMATION: /replace=" "
<220> FEATURE:
<221> NAME/KEY: VARIANT
<222> LOCATION: (7)..(7)
<223> OTHER INFORMATION: /replace="Ala" or "Gly" or "Leu" or "Asn"
      or " "
<220> FEATURE:
<221> NAME/KEY: VARIANT
<222> LOCATION: (8)..(8)
<223> OTHER INFORMATION: /replace="Asn" or "Ala" or "Tyr" or "Thr"
<220> FEATURE:
<221> NAME/KEY: VARIANT
<222> LOCATION: (9)..(9)
<223> OTHER INFORMATION: /replace="Gly" or " "
<220> FEATURE:
<221> NAME/KEY: VARIANT
<222> LOCATION: (10)..(10)
<223> OTHER INFORMATION: /replace=" "
<220> FEATURE:
<221> NAME/KEY: VARIANT
<222> LOCATION: (11)..(11)
<223> OTHER INFORMATION: /replace="Ser" or " "
```

```
<220> FEATURE:
<221> NAME/KEY: VARIANT
<222> LOCATION: (12)..(12)
<223> OTHER INFORMATION: /replace="Gly" or "Ser" or "Gln" or "Ala" or
      "Pro" or " "
<220> FEATURE:
<221> NAME/KEY: VARIANT
<222> LOCATION: (13)..(13)
<223> OTHER INFORMATION: /replace="Tyr" or "Asn" or "Gln" or "Ser"
<220> FEATURE:
<221> NAME/KEY: VARIANT
<222> LOCATION: (14)..(14)
<223> OTHER INFORMATION: /replace="Ala" or "Asp" or "Ile" or "Asn"
<220> FEATURE:
<221> NAME/KEY: MOD_RES
<222> LOCATION: (15)..(15)
<223> OTHER INFORMATION: Any nonpolar amino acid
<220> FEATURE:
<221> NAME/KEY: VARIANT
<222> LOCATION: (16)..(16)
<223> OTHER INFORMATION: /replace="Asn" or "Arg" or "Thr" or "Val" or
      "Ile" or "Ser"
<220> FEATURE:
<221> NAME/KEY: SITE
<222> LOCATION: (1)..(17)
<223> OTHER INFORMATION: /note="Variant residues given in the sequence
      have no preference with respect to those in the annotations
      for variant positions"

<400> SEQUENCE: 118

Cys Xaa Leu Arg Pro Lys Asp Ser Ser Gly Gly Trp Gly Lys Xaa Gln
1               5                  10                  15

Phe

<210> SEQ ID NO 119
<211> LENGTH: 16
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
<220> FEATURE:
<221> NAME/KEY: VARIANT
<222> LOCATION: (2)..(2)
<223> OTHER INFORMATION: /replace="Ser"
<220> FEATURE:
<221> NAME/KEY: VARIANT
<222> LOCATION: (3)..(3)
<223> OTHER INFORMATION: /replace="Ser"
<220> FEATURE:
<221> NAME/KEY: VARIANT
<222> LOCATION: (4)..(4)
<223> OTHER INFORMATION: /replace="Met" or "Lys"
<220> FEATURE:
<221> NAME/KEY: VARIANT
<222> LOCATION: (5)..(5)
<223> OTHER INFORMATION: /replace="Trp" or "His" or "Leu" or "Thr" or
      "Glu" or "Gln"
<220> FEATURE:
<221> NAME/KEY: VARIANT
<222> LOCATION: (6)..(6)
<223> OTHER INFORMATION: /replace="Ala" or "Thr" or "Gly" or "Val" or
      "Arg"
<220> FEATURE:
<221> NAME/KEY: VARIANT
<222> LOCATION: (7)..(7)
<223> OTHER INFORMATION: /replace="His" or "Asp" or "Thr" or "Pro" or
      "Met" or "Ser" or " "
<220> FEATURE:
<221> NAME/KEY: VARIANT
<222> LOCATION: (8)..(8)
<223> OTHER INFORMATION: /replace="Tyr" or "Asn" or "Pro" or " "
<220> FEATURE:
<221> NAME/KEY: VARIANT
<222> LOCATION: (9)..(9)
```

```
<223> OTHER INFORMATION: /replace=" "
<220> FEATURE:
<221> NAME/KEY: VARIANT
<222> LOCATION: (10)..(10)
<223> OTHER INFORMATION: /replace=" "
<220> FEATURE:
<221> NAME/KEY: VARIANT
<222> LOCATION: (11)..(11)
<223> OTHER INFORMATION: Any polar amino acid or absent
<220> FEATURE:
<221> NAME/KEY: VARIANT
<222> LOCATION: (12)..(12)
<223> OTHER INFORMATION: /replace="Glu" or "Gly" or "Asp"
<220> FEATURE:
<221> NAME/KEY: VARIANT
<222> LOCATION: (13)..(13)
<223> OTHER INFORMATION: /replace=" "
<220> FEATURE:
<221> NAME/KEY: VARIANT
<222> LOCATION: (14)..(14)
<223> OTHER INFORMATION: /replace="Ala" or "Gln" or "Tyr"
<220> FEATURE:
<221> NAME/KEY: VARIANT
<222> LOCATION: (15)..(15)
<223> OTHER INFORMATION: replace="Phe" or "Thr"
<220> FEATURE:
<221> NAME/KEY: SITE
<222> LOCATION: (1)..(16)
<223> OTHER INFORMATION: /note="Variant residues given in the sequence
      have no preference with respect to those in the annotations
      for variant positions"

<400> SEQUENCE: 119

Cys Ala Ala Ser Tyr Ser Gly Gly Tyr Asn Xaa Pro Glu Leu His Phe
1               5                   10                  15

<210> SEQ ID NO 120
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 120

Leu Leu Leu Thr Val Leu Thr Val Val
1               5

<210> SEQ ID NO 121
<211> LENGTH: 15
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 121
atgaaccata actac                                                    15

<210> SEQ ID NO 122
<211> LENGTH: 18
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 122
tcagttggtg ctggtatc                                                 18
```

<210> SEQ ID NO 123
<211> LENGTH: 39
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 123
tgtgccagca gttactcggg gggttcaccc ctccactttt                          39

<210> SEQ ID NO 124
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 124
acaatcagtg gaactgatta c                                              21

<210> SEQ ID NO 125
<211> LENGTH: 15
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 125
ggtcttacaa gcaat                                                     15

<210> SEQ ID NO 126
<211> LENGTH: 39
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 126
tgcatcctgc ggcctgacag ctgggggaaa ttccagttt                           39

<210> SEQ ID NO 127
<211> LENGTH: 15
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 127
ctggggcata acgct                                                     15

<210> SEQ ID NO 128
<211> LENGTH: 18
<212> TYPE: DNA
<213> ORGANISM: Artificial Sequence
<220> FEATURE:
<221> NAME/KEY: source
<223> OTHER INFORMATION: /note="Description of Artificial Sequence:

Synthetic oligonucleotide"

<400> SEQUENCE: 128
tacaacttta aagaacag					18

<210> SEQ ID NO 129
<211> LENGTH: 39
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 129
tgtgccagca gccaagcaca ctacactgaa gctttcttt					39

<210> SEQ ID NO 130
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 130
accagtgaga gtgattatta t					21

<210> SEQ ID NO 131
<211> LENGTH: 24
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 131
caagaagctt ataagcaaca gaat					24

<210> SEQ ID NO 132
<211> LENGTH: 42
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 132
tgtgcttata ggagcgcaaa ttccgggtat gcactcaact tc					42

<210> SEQ ID NO 133
<211> LENGTH: 15
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 133
atgaaccata actac					15

<210> SEQ ID NO 134
<211> LENGTH: 39

```
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 134
tgtgccagca gctggacaga caatcagccc cagcatttt                         39

<210> SEQ ID NO 135
<211> LENGTH: 36
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 135
tgcatcctga gagagggaa caatgacatg cgcttt                             36

<210> SEQ ID NO 136
<211> LENGTH: 45
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 136
tgtgccagca gccatgggac aggttataac tatggctaca ccttc                  45

<210> SEQ ID NO 137
<211> LENGTH: 18
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 137
gaccgaggtt cccagtcc                                                18

<210> SEQ ID NO 138
<211> LENGTH: 18
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 138
atatactcca atggtgac                                                18

<210> SEQ ID NO 139
<211> LENGTH: 48
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 139
```
tgtgccgtga acatcctcgc atcaggagga agctacatac ctacattt            48

<210> SEQ ID NO 140
<211> LENGTH: 15
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 140
atgaaccatg aatac                                                15

<210> SEQ ID NO 141
<211> LENGTH: 42
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 141
tgtgccagca gttacgtggg gaacaccggg gagctgtttt tt                   42

<210> SEQ ID NO 142
<211> LENGTH: 15
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 142
atgaaccatg agtat                                                15

<210> SEQ ID NO 143
<211> LENGTH: 18
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 143
tcaatgaatg ttgaggtg                                             18

<210> SEQ ID NO 144
<211> LENGTH: 39
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 144
tgtgccagca gtttacgggg gccttatggc tacaccttc                      39

<210> SEQ ID NO 145
<211> LENGTH: 18
<212> TYPE: DNA
<213> ORGANISM: Artificial Sequence
<220> FEATURE:
<221> NAME/KEY: source

```
<223> OTHER INFORMATION: /note="Description of Artificial Sequence:
      Synthetic oligonucleotide"

<400> SEQUENCE: 145
gacagtgcct caaactac                                                   18

<210> SEQ ID NO 146
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 146
attcgttcaa atgtgggcga a                                               21

<210> SEQ ID NO 147
<211> LENGTH: 36
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 147
tgtgcagcaa cgggctatgg tcagaatttt gtcttt                               36

<210> SEQ ID NO 148
<211> LENGTH: 33
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 148
tgtgccagca gccaaggccc aggctacacc ttc                                  33

<210> SEQ ID NO 149
<211> LENGTH: 42
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 149
tgtgcagcaa gtatgaagga tagcagctat aaattgatct tc                        42

<210> SEQ ID NO 150
<211> LENGTH: 18
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 150
gactttcagg ccacaact                                                   18

<210> SEQ ID NO 151
```

```
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 151
tccaatgagg gctccaaggc c                                           21

<210> SEQ ID NO 152
<211> LENGTH: 39
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 152
tgcagtgcta tgacagtcat gaacactgaa gctttcttt                        39

<210> SEQ ID NO 153
<211> LENGTH: 15
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 153
tctgggcaca agagt                                                  15

<210> SEQ ID NO 154
<211> LENGTH: 18
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligoncleotide"

<400> SEQUENCE: 154
tattatgaga aagaagag                                               18

<210> SEQ ID NO 155
<211> LENGTH: 36
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 155
tgtgccagca gcttgggcag ctatgactac accttc                           36

<210> SEQ ID NO 156
<211> LENGTH: 18
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 156
```
aacagcatgt ttgattat                                              18

<210> SEQ ID NO 157
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 157
ataagttcca ttaaggataa a                                          21

<210> SEQ ID NO 158
<211> LENGTH: 48
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 158
tgtgcagcaa ggaagaatta tggaggaagc caaggaaatc tcatcttt             48

<210> SEQ ID NO 159
<211> LENGTH: 33
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 159
tgcagtgcta aggagggggac tgaagctttc ttt                            33

<210> SEQ ID NO 160
<211> LENGTH: 39
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 160
tgcatcctga ataccggcac tgccagtaaa ctcacctttt                      39

<210> SEQ ID NO 161
<211> LENGTH: 36
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 161
tgtgccgtga actcctcgcc ctacaagctc agcttt                          36

<210> SEQ ID NO 162
<211> LENGTH: 20
<212> TYPE: DNA
<213> ORGANISM: Artificial Sequence
<220> FEATURE:

```
<223> OTHER INFORMATION: Description of Artificial Sequence: Synthetic
      oligonucleotide

<400> SEQUENCE: 162
tctctcagct ggtacacggc                                              20

<210> SEQ ID NO 163
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 163
caaacacagc gacctcgggt                                              20

<210> SEQ ID NO 164
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 164

Ser Leu Leu Met Trp Ile Thr Cys
1               5

<210> SEQ ID NO 165
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic 6xHis tag"

<400> SEQUENCE: 165

His His His His His His
1               5
```